US006877297B2

(12) United States Patent
Armington et al.

(10) Patent No.: US 6,877,297 B2
(45) Date of Patent: Apr. 12, 2005

(54) CUSHIONING CONVERSION SYSTEM AND METHOD

(75) Inventors: Steven E. Armington, Gates Mills, OH (US); Richard O. Ratzel, Westlake, OH (US); Paul J. Guth, Beachwood, OH (US); MacDonald C. Booze, York, ME (US)

(73) Assignee: Ranpak Corp., Concord Township, OH (US)

( * ) Notice: Subject to any disclaimer, the term of this patent is extended or adjusted under 35 U.S.C. 154(b) by 774 days.

(21) Appl. No.: 09/096,123

(22) Filed: Jun. 11, 1998

(65) Prior Publication Data

US 2001/0017023 A1 Aug. 30, 2001

Related U.S. Application Data

(60) Provisional application No. 60/049,346, filed on Jun. 11, 1997.

(51) Int. Cl.[7] ................................................. B65B 1/36
(52) U.S. Cl. .............................. 53/502; 53/503; 53/504; 53/168
(58) Field of Search ........................... 53/168, 64, 502, 53/503, 504, 211, 396, 472, 507, 508; 700/99, 215, 219, 225, 227

(56) References Cited

U.S. PATENT DOCUMENTS

| | | | |
|---|---|---|---|
| 4,501,106 A | * | 2/1985 | Treiber et al. ................. 53/504 |
| 4,565,048 A | | 1/1986 | Lade |
| 4,922,687 A | * | 5/1990 | Chow et al. |
| 4,937,131 A | | 6/1990 | Baldacci et al. |
| 5,105,600 A | * | 4/1992 | DePoint, Jr. et al. ......... 53/168 |
| 5,311,438 A | | 5/1994 | Sellers et al. |
| 5,403,259 A | | 4/1995 | Parker |
| 5,430,831 A | | 7/1995 | Snellen |
| 5,479,756 A | * | 1/1996 | Haze et al. .................... 53/502 |
| 5,537,798 A | * | 7/1996 | Fukuda et al. ................. 53/168 |
| 5,655,356 A | * | 8/1997 | Ginestra et al. ............... 53/168 |
| 5,699,259 A | * | 12/1997 | Colman et al. ............... 700/99 |
| 5,999,920 A | * | 12/1999 | Sato et al. .................... 700/215 |

FOREIGN PATENT DOCUMENTS

| | | |
|---|---|---|
| DE | 37 09 015 A | 10/1988 |
| EP | 0 115 178 A | 8/1984 |
| EP | 0 517 197 A | 12/1992 |
| WO | WO 95/13914 | 5/1995 |

OTHER PUBLICATIONS

PCT International Search Report, PCT/US98/11598, 4 pp.
ALS Optipack, *Parcel Shipping & Distribution*, "Better Carton–To–Product Fit At Williams–Sonoma" by Dominic O'Leary, Mar./Apr., 1996, 5 pgs.

(Continued)

*Primary Examiner*—Eugene Kim
*Assistant Examiner*—Sameh Tawfik
(74) *Attorney, Agent, or Firm*—Renner, Otto, Boisselle & Sklar LLP

(57) ABSTRACT

A packaging system includes a cushioning conversion machine for converting stock material into relatively low density cushioning material or dunnage and a packaging system controller. The packaging system controller provides packaging instructions related to a part or parts to be packaged and instructs the cushioning conversion machine to produce the cushioning material. In one aspect of the present invention the packaging system controller provides packaging instructions by retrieving a predetermined set of packaging instructions associated with a particular part. In another aspect of the present invention the packaging system controller provides packaging instructions by determining an optimized packaging methodology using one or more characteristics of the part or parts to be packaged. The packaging system also provides for automated inventory control and productivity monitoring.

14 Claims, 38 Drawing Sheets

OTHER PUBLICATIONS

International Safe Transit Association, "Preshipment Test Procedures", Apr., 1996, 6 pgs.

The Dow Chemical Company, "A Guide to Protective Package Design with ETHAFOAM brand polyethylene foams", Nov., 1987, 13 pgs.

CAPE Systems, Inc., "CAPE PACK® '96 3DI" 3D Imaging Program, 5 pgs.

Advanced Logistics systems, Inc., "OPTIPACK™ Technical Abstract" Computer Aided Carton Loader, 1996, 20 pgs.

"TOPS® Total Optimization Packaging Software", The Ultimate Package Design Software, Tops Engineering Corporation.

Design Axis, Inc., "The Pkg. Design Advantage", *Boxboard Containers*, Sep., 1993, 5 pgs.

CAPE®, Computer Assisted Packaging Evaluation, CAPE PACK® '96, Pallet Loading and Packaging Design for the real world!, 1996, CAPE Systems.

Chapter 12, Steps Toward Computer Intelligence: Making Systems "Smarter", Author, Publisher and Date unknown, 18 pgs.

* cited by examiner

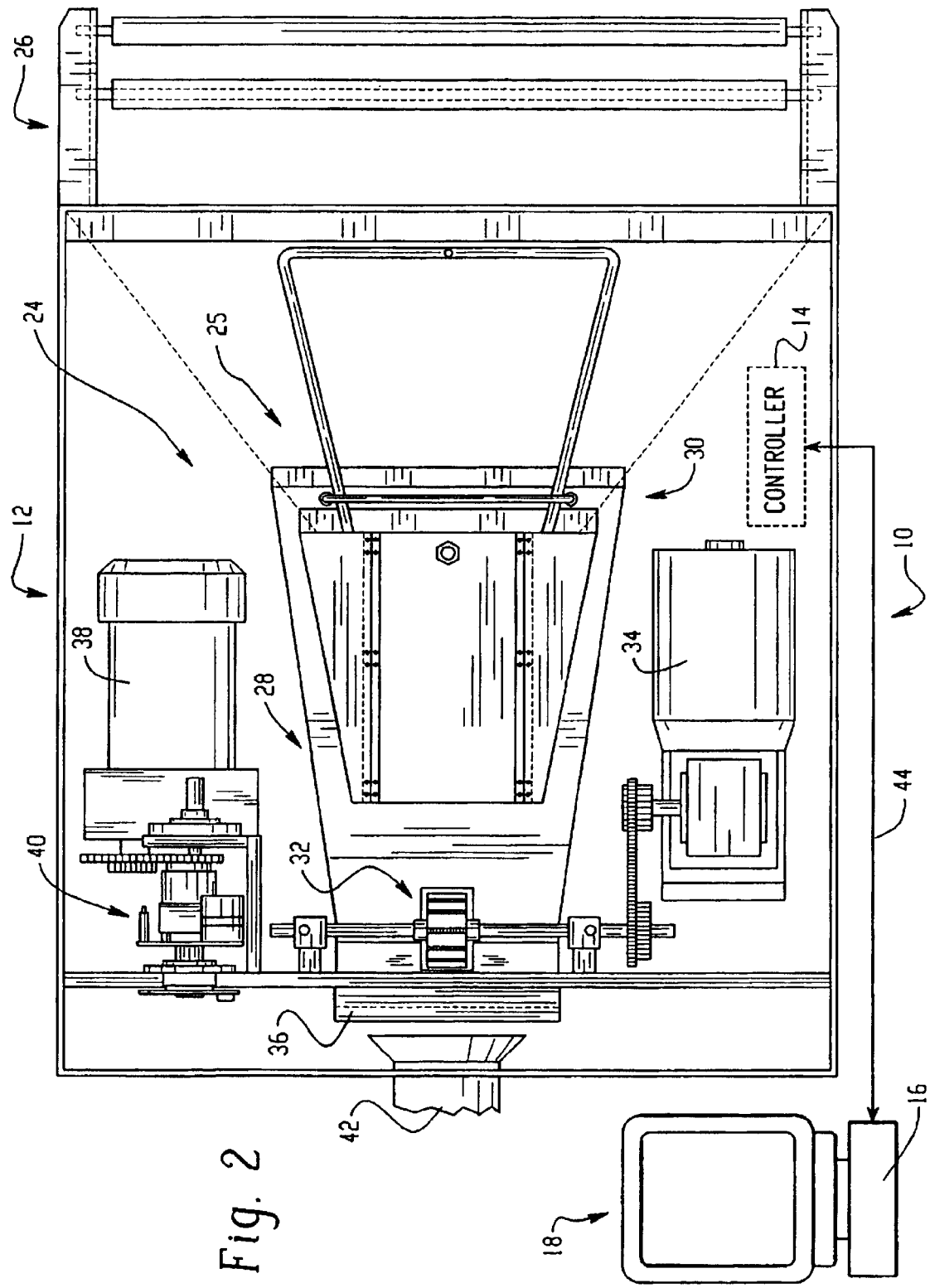

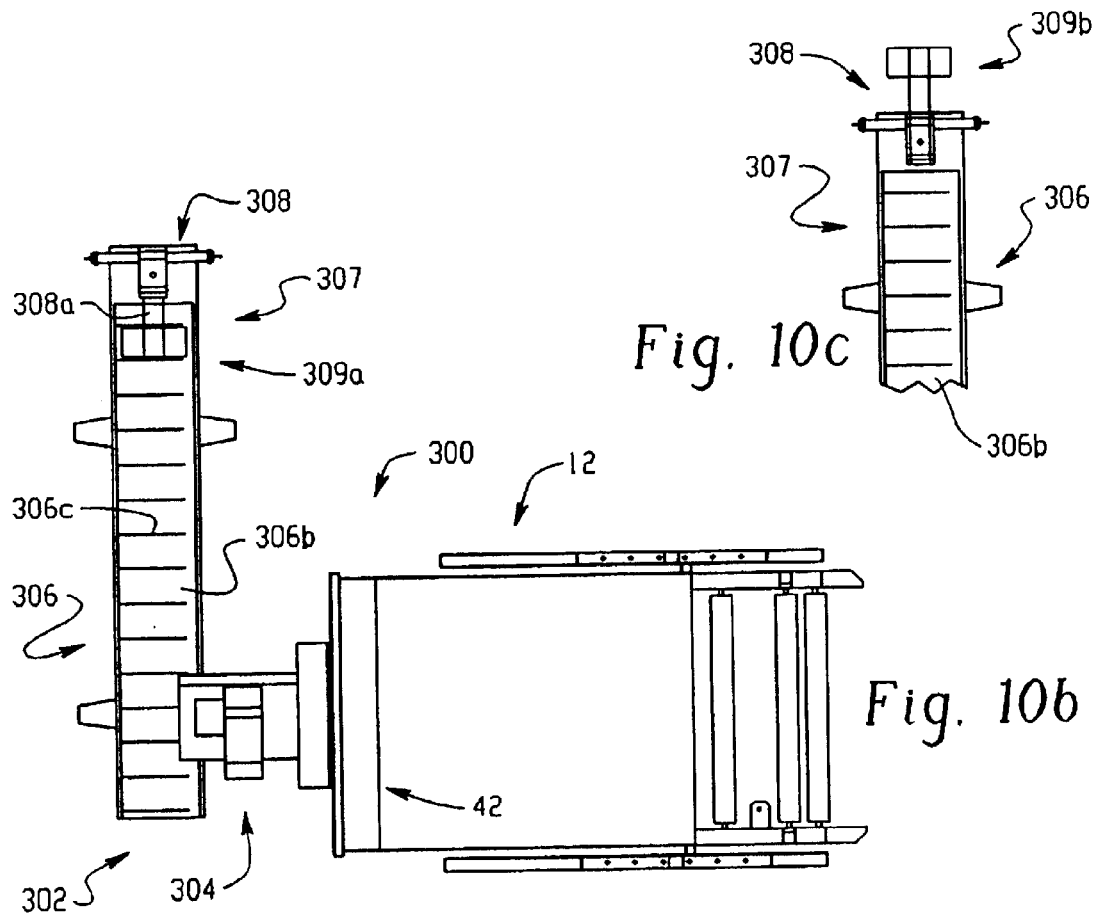
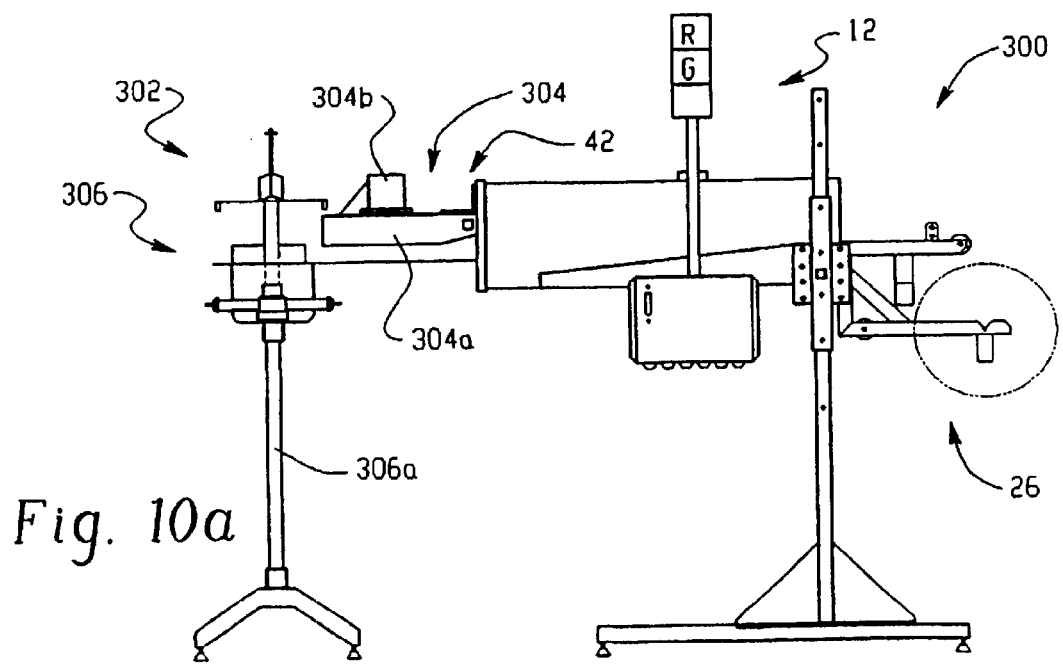
Fig. 10c
Fig. 10b
Fig. 10a

CUSHIONING CONVERSION SYSTEM AND METHOD

RELATED APPLICATION DATA

This application claims priority of U.S. Provisional Application No. 60/049,346 filed on Jun. 11, 1997.

FIELD OF THE INVENTION

The present invention relates to a cushioning conversion system which converts sheet stock material into cushioning material. More particularly, the present invention relates to a cushioning conversion system including a packaging controller, wherein the system is adapted to provide recommended packaging and/or packaging information to an operator based on the parts to be packaged, and further to provide for monitoring of packaging supply inventories. Features of the invention, however, have a more general application to packaging systems using various types of dunnage products and packaging supplies.

BACKGROUND OF THE INVENTION

In the process of shipping a part from one location to another, a protective packaging material is typically placed in the shipping container to fill any voids, provide blocking and bracing, and/or to cushion the part during the shipping process. Some commonly used protective packaging materials are plastic or cellulose foam peanuts, plastic bubble wrap, shredded paper or cardboard, and converted paper pads. Converted paper pads, being made from paper and particularly kraft paper, are biodegradable, recyclable and composed of a renewable resource. Consequently, converted paper pads have become increasingly important in light of many industries adopting more progressive policies in terms of environmental responsibility. The conversion of paper sheet stock material into relatively low density paper pads may be accomplished by a cushioning conversion machine, such as those disclosed in U.S. Pat. Nos. 4,026,198; 4,085,662; 4,109,040; 4,237,776; 4,557,716; 4,650,456; 4,717,613; 4,750,896; and 4,968,291. (These patents are all assigned to the assignee of the present invention and their entire disclosures are hereby incorporated herein by reference.)

By controlling the conversion machine, such as through the use of a controller that may be programmed, pads of a variety of lengths can be created. This feature allows a single machine to satisfy a wide range of cushioning needs. For example, relatively short pad lengths can be employed in conjunction with small and/or unbreakable articles, while longer pad lengths can be employed in connection with larger and/or fragile articles. Moreover, a set of pads (either of the same or different lengths and/or different configurations such as a star, a cross or a spiral/coil) can be employed in conjunction with uniquely shaped and/or delicate articles, such as electronic equipment.

In some instances, a manufacturer or shipping interest may ship a wide variety of parts wherein each of the parts has different packaging requirements. While a cushioning conversion system, such as that described above, can provide a wide variety of pads of different lengths at the request of the operator to meet the differing requirements, it is often a time consuming process to determine for each part presented the best way to package the part and then to instruct the cushioning conversion machine to produce the required number of pads having the appropriate lengths. Also, the reliability of the packaging operation is oftentimes dependent on the skill level of the operator, in particular the packer. In the case of complex packaging systems involving the packaging of many different types of product with different packaging requirements, the necessary skill level may preclude the use of low cost, low skill packers (or operators in general).

Another consequence of shipping a wide variety of parts having different packaging requirements is the variability of consumption of packaging materials used the pack the part or parts, such as dunnage stock material, tape, containers (cartons, boxes, etc.), etc. Heretofore, the monitoring of packaging material inventories was accomplished manually by a person checking the inventory levels and reordering additional supplies when needed. In the case of paper sheet stock rolls used in the aforesaid cushioning conversion machines to produce dunnage pads, typically an order for the stock rolls and/or other packaging materials would be placed with a distributor. The distributor would then fill the order from stock on hand or place an order with its supplier to directly ship the packaging materials to the end user. Like in the case of the end user, the monitoring of packaging material inventories at the distributor's facilities was accomplished manually by a person checking the inventory levels and reordering additional supplies when needed. These existing systems have been labor intensive and time consuming.

A need therefore exists for improvements in packaging systems, and particularly in the efficient and effective packaging of parts in containers and in the efficient and effective maintenance of packaging material inventories.

SUMMARY OF THE INVENTION

The present invention provides a packaging system, components thereof and associated method which enable, inter alia, a) more efficient and/or effective packaging of a part or parts, b) more efficient and/or effective maintenance of packaging material inventories, c) more efficient and/or effective usage of packaging material, d) more efficient and/or effective usage of low cost, low skill labor for packaging of parts, e) more efficient and/or effective monitoring and/or analyzing of packaging operations, and f) more efficient and/or effective handling and/or monitoring of the part or parts being packaged. Any one or more of these objectives are met by one or more of the various aspects and/or features of the invention which are hereinafter more particularly detailed.

A packaging system and methodology is disclosed which automatically provides packaging instructions to an operator as a function of the part or parts to be packaged. As a consequence, a packaging system, based on an identification of a part or parts to be packaged, produces pads of specified lengths to meet packaging requirements and instructs the operator as to the recommended technique of packaging the part or parts.

The present invention provides a packaging system and method including a packaging material generator and a packaging system controller adapted to produce packaging material in accordance with the packaging requirements of at least one part to be packaged. The packaging system controller provides packaging instructions for an optimized packaging of the part or parts. The system controller preferably includes a device or other means for identifying the part or parts (e.g., via a part number or a part identifier) to be packaged, a memory containing predetermined packaging instructions associated with the identified part or parts to be packaged and an output peripheral for communicating the appropriate packaging instructions to a system operator.

Provision is made for automatically supplying an operator or an automated packing system with a predetermined amount of packaging material along with detailed packaging instructions to provide for consistency in packaging known parts. Due to the provision of a predetermined amount of packaging material and detailed packaging instructions, high quality packaging can be provided without an operator possessing extensive packaging training. In addition, the packaging system ensures an improved packaging efficiency, thereby lowering packaging costs by eliminating waste while concurrently reducing shipping damage by ensuring an adequate amount and an effective utilization of the packaging material.

The packaging system according to a particular embodiment of the present invention relates to the packaging of a known item or a standard group of parts (e.g., a parts kit). The packaging system identifies the part or parts to be packaged and retrieves predetermined packaging instructions which are used to generate one or more pieces of packaging material of the proper length or amount (such as dunnage) and provide detailed operator packaging instructions which are displayed on a display monitor. By using the supplied packaging material along with the displayed detailed instructions, a consistent, highly efficient packaging process is effectuated independently of the experience level of the operator.

More particularly, such packaging system includes a cushioning conversion machine for converting stock material into cushioning pads which serve as packaging material, a packaging controller and a packaging terminal. A known part to be packaged is identified, for example, by entering the part's identification number into the system via either a keypad, a pull-down menu, a bar code reader, etc. Once the part is identified, the packaging controller retrieves a predetermined set of packaging instructions which are associated with the identified part to be packaged. The packaging instructions are then used to generate the appropriate lengths of cushioning pads in the appropriate sequence while simultaneously providing textual and graphical packaging instructions on the packaging terminal display which aid in the proper packaging of the part by the operator.

The retrieved predetermined set of packaging instructions may further include packaging material manipulation control information. For example, in addition to the appropriate lengths of cushioning pads being provided in the appropriate sequence, one or more of the generated pads may be coiled as necessary by a coiler to provide the packaging material in a proper coiled form for particular packaging methodologies. Alternatively, or additionally, packaging material manipulation control information may include control data for an automated manipulator such a pick-and-place control apparatus or a robotic insertion and placement device to automatically retrieve one or more of the produced pads and place it in a packaging container.

According to another embodiment of the present invention, a packaging system includes a packaging material consumption monitoring system and method which counts the number of packaging containers, the amount of packaging material generated, and the amount or number of other associated packaging supplies to thereby maintain an inventory control function by monitoring the consumption of the various packaging materials. The packaging system compares the amount of consumed packaging materials to one or more re-order thresholds and generates a re-order request for the appropriate materials if the re-order thresholds are either met or exceeded.

According to still another embodiment of the present invention, a packaging system includes a productivity monitoring system and method, wherein characteristics of the packaging process such as the time required to complete each step in the predetermined packaging procedures is monitored. The system then utilizes the collected data to generate a productivity report which provides packaging machine data, operator identification data and productivity data reflecting the time required to complete the various steps in the packaging process. The data may be further processed to provided normalized productivity data, trending analysis, etc.

According to another aspect of the present invention, a packaging system and method is disclosed which includes a packaging material generator and a packaging system controller adapted to produce packaging material in accordance with the packaging requirements of a part to be packaged. For an unknown part to be packaged, the packaging system evaluates one or more characteristics of the part and determines the packaging requirements and instructions for an optimized packaging of the part.

Such packaging system preferably includes a device or other means for identifying at least one of the characteristics of the part to be packaged. The packaging system also includes a database containing a set of rules and data for use in determining the appropriate packaging instructions based on the various characteristics of the part. The packaging system, upon determining the appropriate packaging requirements and techniques, communicates the instructions to the packaging material generator to automatically generate the proper amount of packaging material in the proper order. In addition, instructions are transmitted to an output peripheral such as a display which includes graphical and/or textual instructions to provide directions to the operator in packaging the part.

Thus, according to this aspect of the invention, the packaging system is capable of receiving an unknown part to be packaged and supplying an untrained operator with an appropriate amount of packaging material and detailed packaging instructions to provide an optimized packaging methodology, thereby providing high quality packaging which prevents product damage without incurring undesirable waste.

Such packaging system is well-suited for a private mailing company which ships various items for individuals. An operator brings in an item which is unknown to the packaging system (i.e., a predetermined set of packaging instructions uniquely associated with the item does not reside within the packaging system's memory). Instead, the packaging system acquires one or more characteristics of the item such as its size, shape, weight and fragility. The system then applies rules within the system's memory to the provided data and determines an optimized packaging methodology for the part.

The optimized packaging methodology is transmitted as control signals to a packaging material generator such as a cushioning conversion machine which dictates the appropriate container (e.g., size and type), the number of cushioning pads, their length and their generation sequence. Additionally, the determined optimized packaging methodology is communicated to the operator in the form of graphical and textual instructions to insure that the part is packaged in accordance with the optimized packaging methodology.

According to another embodiment of the present invention, a packaging methodology preview is provided to the operator which illustrates the materials to be used in the packaging process and provides both the costs which will be incurred for the packaging and the shipping of the part. The operator is then given an option to proceed with the packaging process, wherein the generation of the appropriate packaging material is commenced, or alternatively end the process.

According to yet another aspect of the present invention, a packaging system controller includes an "expert" system which automates the decision making in the packaging methodology design process. The packaging system controller preferably includes a memory containing a plurality of expert based rules and packaging data. The rules and packaging data are utilized in conjunction with the data provided by the operator regarding the part to be packaged to produce conclusions (i.e., an optimized packaging methodology).

The expert system may represent the system knowledge in the form of "if-then" rules, wherein "if" certain conditions are true, "then" certain conclusions should be drawn. In some cases, the expert system may use several approaches for determining whether certain conditions exist. The system may identify a condition within an internal, established data base or use data from the data base plus additional rules to establish the existence of a certain condition. In addition, the system may ask the operator for additional information in order to fill necessary gaps in order for the system to make further progress in establishing the optimized packaging methodology. In a preferred embodiment of the present invention, the expert system uses inputs such as the part's size, shape, weight and fragility to determine the appropriate container and an optimized packaging methodology. In addition, a method of shipment may also be utilized as well as an operator's preference for either a packaging optimization or a cost optimization in determining the packaging methodology.

According to yet another aspect of the present invention, a packaging system and method is disclosed which includes a packaging material generator and a packaging system controller adapted to produce packaging material in accordance with the packaging requirements of a plurality of parts to be packaged. For a plurality of known parts to be packaged, the packaging system evaluates a shipping order and obtains data relating to the parts to be packaged. The packaging system then determines the packaging techniques for an optimized packaging of the parts.

Such packaging system preferably includes a device or other means for analyzing a shipping order to thereby identify the plurality of parts to be packaged. The packaging system includes an internal database and/or access to an external database containing a list of the parts which may be packaged along with data related to the parts, such as their weight, size, shape and fragility. The packaging system also includes another database containing a set of rules and data associated with the packaging material for use in determining the appropriate packaging techniques to optimize the packaging methodology. The packaging system, upon determining the packaging techniques, communicates the instructions to the packaging material generator to automatically generate the proper amount of packaging material in the proper order. In addition, the instructions are transmitted to an output peripheral such as a display which includes graphical and/or textual instructions to provide an explanation and directions to the operator in properly packaging the plurality of parts.

Such packaging system of the present invention is well-suited for a mail-order company or warehouse distributor which retrieves multiple parts (products) and packages the parts together for shipment to a customer. A packer (i.e., the operator) or the packaging system receives a shipping order which is read by the packaging system. The packaging system, using the order number, identifies each of the parts to be packaged and retrieves additional data associated with each part in the order from a warehouse management database or an internal database. The packaging system of the present invention then determines an optimized packaging methodology based on the retrieved data which includes the determination of the appropriate container (e.g., box, carton, etc.) to package the order. In addition, the packaging system determines the position and orientation (and thus the packing sequence) of the parts to be packaged within the container and generates the proper amount of packaging material in the proper sequence to package the parts in accordance with the determined packaging methodology.

According to another particular embodiment of the present invention, the packaging system may include a pick list verification system. In cases where parts are picked by one individual and packaged by another, it is often required that the packer confirm that the picked items are consistent with the shipping order. The packaging system identifies all the parts that should be in the shipping order and evaluates each part, preferably with a reading device, to verify that the retrieved items match the items in the shipping order before the packaging system determines an optimized packaging methodology, thus saving time and money.

According to yet another particular embodiment of the present invention, the packaging system controller includes an expert system which automates the decision making in the packaging methodology design process. The packaging system controller includes an associated memory containing a plurality of expert rules and packaging data which relates to the packaging material. The rules and packaging data are used in conjunction with the data associated with the parts to be packaged to produce conclusions (i.e., an optimized packaging methodology).

The expert system may represent the system knowledge in the form of if-then rules. Alternatively, the expert system may employ a cubing concept, wherein each part to be packaged occupies (when packaged) a cubic volume in the container. The expert system then analyzes the various cubes corresponding to the parts to be packaged and determines an optimized arrangement of cubes (i.e., parts) within the specified container, thus reducing an amount of necessary void fill, extra boxes, etc.

The foregoing and other features of the invention are hereinafter fully described and particularly pointed out in the claims, the following description and the annexed drawings setting forth in detail illustrative embodiments of the invention. These embodiments, however, are but a few of the various ways in which the principles of the invention may be employed. Other objects, advantages and features of the invention will become apparent from the following detailed description of the invention when considered in conjunction with the drawings.

BRIEF DESCRIPTION OF THE DRAWINGS

FIG. 2 is an illustration of a packaging system according to the present invention including a cushioning conversion machine and a packaging system controller;

FIG. 10a is a side view of a cushioning conversion machine employing a cushioning pad handling system such as a pick-and-place apparatus according to the present invention;

FIG. 10b is a top view of the cushioning conversion machine and cushioning pad handling system of FIG. 10a, wherein generated cushioning pads are placed on a conveyor belt for conveying the generated pads to a pick-and-place apparatus;

FIG. 10c is an isolated top view of the pick-and-place apparatus of FIG. 10b according to the present invention;

DETAILED DESCRIPTION OF THE INVENTION

Figure 1:
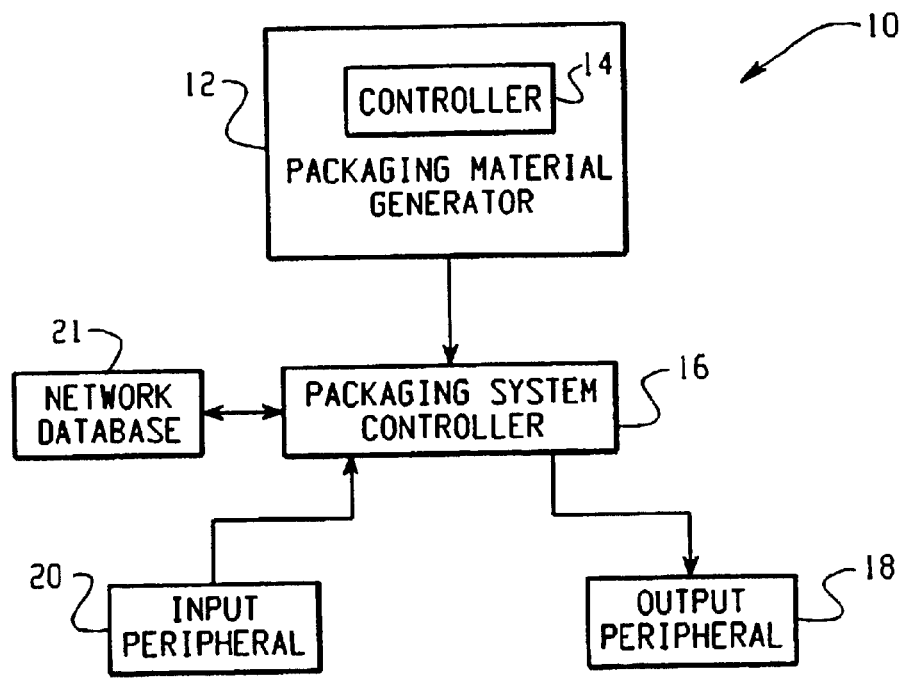
FIG. 1 is a block diagram illustrating a packaging system according to the present invention.

The present invention will now be described with reference to the drawings wherein reference numerals are used to refer to like elements throughout. In one embodiment of the present invention, an automated packaging system and method is disclosed which includes a packaging material generator such as a cushioning conversion machine and a packaging system controller. An operator, wishing to efficiently package a known, identified part, interacts with the packaging system to produce an appropriate amount of packaging material in an appropriate sequence for packaging the part within an identified container. In addition, the packaging system and method provides detailed packaging instructions to the operator in either a textual and/or pictorial format, thereby providing packaging efficiency and consistency which results in reduced part damage and reduced packaging costs.

According to a preferred embodiment of the present invention, a known part to be packaged is identified by, for example, reading or entering its part identification number. Once the part to be packaged is identified, the packaging system retrieves a predetermined set of packaging instructions which uniquely correspond to the identified part. The packaging instructions preferably indicate the recommended packaging container, generate the necessary packaging material and provide step by step instructions to aid the operator in the packaging of the part. Preferably, each instruction step is provided to the operator via a computer display terminal in conjunction with a length (or amount) of packaging material generated by the packaging material generator. The packaging system reduces packaging costs by dictating the proper container and the proper amounts of packaging material. Consequently, excess, wasteful packaging voids are eliminated. In addition, the detailed packaging instructions reduce the need for highly experienced operators since the container, amounts of packaging material, the sequence with which the packaging material are generated and the manner in which the packaging material is to be used for efficient packaging is dictated and explained by the packaging system.

In accordance with another aspect of the present invention, there is provided an inventory monitoring system in which the materials consumed in the packaging of parts are monitored. For example, for a particular part to be packaged, a predetermined container and a predetermined amount of packaging material will be used. While the packaging materials are being consumed during the packaging of a part, the inventory monitoring system, for example, decrements an internal inventory list and compares the updated list to one or more re-order thresholds. If one or more items on the updated inventory list (i.e., a consumption list) satisfies a re-order criteria (e.g., falls below a minimum threshold), the inventory monitoring system automatically generates a re-order request to ensure that packaging inventories are not unduly depleted. In addition to the monitoring of containers and packaging material, the inventory monitoring system may also monitor other packaging supplies such as product literature associated with the identified part, warranty cards, packaging tape, etc.

According to another aspect of the present invention, a packaging system may include a productivity monitoring system. The productivity monitoring system is operable to time the packaging of each part for an identified operator and monitor the time required to complete each step within the prescribed packaging routine. The productivity monitoring system then creates a productivity report in which the operator's productivity is provided in an easy to evaluate format. The productivity report preferably includes an average time required to perform one or more packaging steps, but may also include normalized productivity data and trending information, as may be desired, which may be stored in a database.

Referring now to the drawings in detail, and initially to FIGS. 1–4, a packaging system and method according to the present invention is shown. In FIG. 1, the packaging system 10 includes a packaging material generator 12 for generating packaging material to be used in packaging identified parts. According to the present invention, the term "parts" is broadly used to include a single part, a kit including a known arrangement of parts, and various items requiring shipment, regardless of the nature of the part, be it an article, product, component, piece, etc. The packaging material generator 12 includes a controller 14 for controlling the various operational components (not shown) within the generator 12 as will be discussed in greater detail infra. A packaging system controller 16 is coupled to the packaging material generator 12 and communicates to the packaging material generator 12 via the controller 14. The packaging system controller 16 is also coupled to an output peripheral 18 and an input peripheral 20, respectively, and is operable to retrieve a predetermined set of packaging instructions in response to the identification of a part to be packaged, which is preferably identified via the input peripheral 20.

The predetermined packaging instructions are preferably retrieved from a memory (not shown) associated with the packaging system controller 16 or a communication network and are selectively sent to the controller 14 and the output peripheral 18. The packaging instructions sent to the controller 14 preferably relate to the generation of particular lengths (or amounts) of packaging material in a particular sequence. In addition, as will be described in greater detail infra, the packaging instructions may further include post-generation packaging material manipulation control signals for manipulating the generated packaging material for particular packaging options such as coiling or the implementation of a pick-and-place functionality.

The packaging instructions which are sent to the output peripheral 18 (e.g., a computer display monitor) are preferably detailed explanatory type instructions which aid the operator in the efficient packaging of the identified part. The explanatory instructions include, for example, explanatory text accompanying graphical pictures of the part to be packaged, the packaging material, the container, etc. Preferably, the instructions provided via the output peripheral 18 clearly illustrate the manner in which the packaging material engages the parts to be packaged and how the packaging material engages the packaging container to properly and efficiently secure the part within the container. Such instructions may further include video type instructions including audio data, as may be desired. The packaging instructions may also include pre and/or post packaging information such as instructions for selecting and erecting a particular container, inserting a liner, taping instructions, shipping instructions, etc.

Turning now to FIG. 2, the packaging system 10 of FIG. 1 according to a preferred embodiment of the present invention is illustrated. The packaging system 10 includes a cushioning conversion machine 12 as the packaging material generator and a personal computer 16 constitutes the packaging system controller of FIG. 1. The personal computer 16 is coupled to an input peripheral 20 (not shown) such as a keyboard, a bar code reader, a mouse, etc. for entering data or commands. The personal computer 16 is also coupled to a display monitor 18 which corresponds to the output peripheral 18 of FIG. 1 and may also be connected to a computer network. The input peripheral 20 and the display monitor 18 are used for operator interaction with the cushioning conversion machine 12.

The cushioning conversion machine 12 preferably includes a frame 24 upon which the various components of a conversion assembly 25 are mounted and a machine controller 14 (which is illustrated schematically) for controlling the cushioning conversion machine 12 including the components of the conversion assembly 25. The frame 24 has mounted thereto or included therein a stock supply assembly 26 including a web separating assembly and stock support bar (not shown) which holds a roll of stock (e.g., paper) for conversion by the conversion assembly 25 into a cushioning material (not shown). The illustrated conversion assembly 25 is composed of plural conversion assemblies including a forming assembly 30, a feeding/connecting assembly 32 powered by a feed motor 34, and a severing or cutting assembly 36 powered by, for example, a cut motor 38 selectively engaged with the cutting assembly 36 by a clutch 40. Also provided is a post-cutting constraining assembly or outlet 42 for guiding the cushioning material from the cutting assembly.

During the conversion process, the forming assembly 30 causes the lateral edges of the stock material (not shown) to turn inwardly to form a continuous strip having two lateral pillow-like portions and a central band therebetween as such stock material is advanced through the forming assembly. The feeding/connecting assembly 32, including a pair of meshed gear-like members (gears) in the illustrated cushioning conversion machine, performs a feeding, e.g., pulling, function by drawing the continuous strip through the nip of the two cooperating and opposing gears of the feeding/connecting assembly 32 by drawing the stock material through the forming assembly 30 for a duration which is determined by the length of time that the feed motor 34 rotates the opposed gears. The feeding/connecting assembly 32 additionally performs a "connecting" function as the two opposed gears coin the central band of the continuous strip as it passes therethrough to form a coined strip. As the coined strip travels downstream through the feeding/connecting assembly 32, the cutting assembly 36 cuts the strip into sections of a desired length. These cut sections exit from the post-cutting constraining assembly 42 and are then available for use in the packaging of the part.

The machine controller 14 is preferably a microprocessor based programmable controller such as that described in co-owned U.S. patent application Ser. Nos. 08/482,015 and 08/279,149, filed Jun. 7, 1995 and Jul. 22, 1994, respectively, both entitled "Cushioning Conversion Machine" which are incorporated herein by reference. The machine controller 14 controls the operation of the various components of the cushioning conversion machine 12 (e.g., the feeding/connecting assembly 32, or more specifically the feed motor 34, and the cutting assembly 36, or more specifically the cut motor, etc.) to form one or more pads of particular lengths in accordance with a number of control signal inputs. Such control signal inputs may include inputs from machine sensors, such as maybe employed to detect jams or accurately measure pad length formation, for example, and inputs from the personal computer 16 (i.e., the packaging system controller) via a control line 44. Specifically, when it is desired that an appropriate length of pad be formed, the machine controller 14 causes power to be supplied to the feed motor 34 for a duration which is sufficient for the conversion assembly 25 to produce the desired length of pad. Power to the feed motor 34 is then disabled and the machine controller 14 causes the cut motor clutch 40 to engage the cut motor 38 with the cutting assembly 36 to sever the pad at the desired length.

Figure 3:
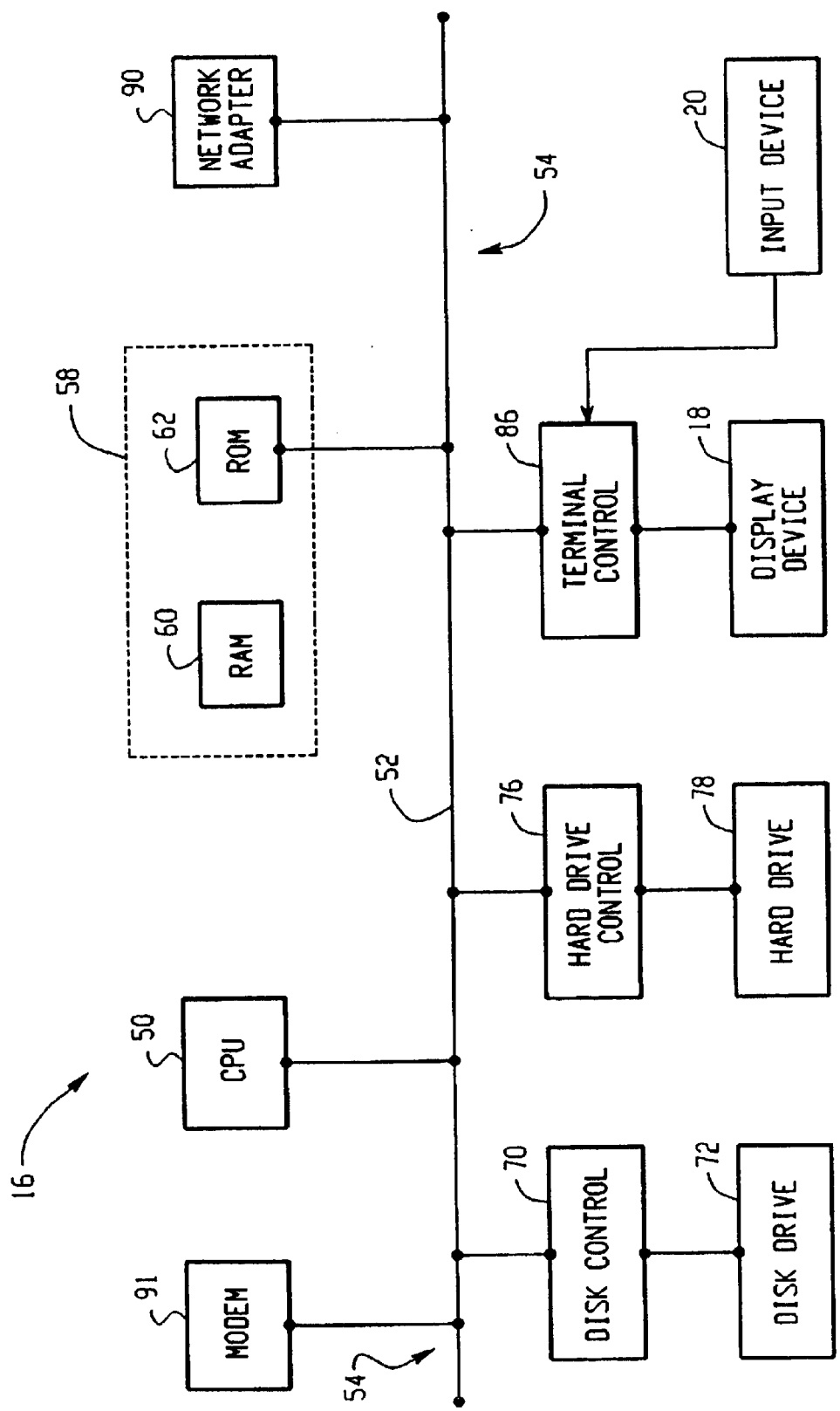
FIG. 3 is a block diagram illustrating a portion of the packaging system controller according to the present invention.

Referring now to FIG. 3, a detailed block diagram of the packaging system controller 16 of FIG. 1 is shown in accordance with a preferred embodiment of the present invention. The packaging system controller 16 preferably includes a central processing unit (CPU) 50 which is coupled to a bus 52. The CPU or processor 50 can be any of a plurality of processors, such as a Pentium™, a Power PC™, Sparc™, or any other similar and compatible processor. The CPU 50 functions to perform various operations described herein as well as carries out other operations related to the packaging system controller 16. The manner in which the CPU 50 can be programmed to carry out the functions relating to the present invention will be readily apparent to those having ordinary skill in the art based on the description provided herein. The bus 52 includes a plurality of signal lines 54 for conveying addresses, data and control between the CPU 50 and a number of system bus components. The other system bus components include a memory 58 (including a random access memory (RAM) 60 and a read only memory (ROM) 62) and a plurality of ports for connection to a variety of input/output (I/O) devices which collectively comprise the output peripheral 18 and the input peripheral 20, respectively. The memory 58 serves as data storage and may store appropriate operating code to be executed by the CPU 50 for carrying out the functions described herein.

The RAM 60, hard drive 78 or other type storage medium provides program instruction storage, working memory for the CPU 50 and the predetermined packaging instructions associated with the particular parts to be packaged. Preferably, the packaging instructions correspond to the parts to be packaged through a look-up table, however, other storage and retrieval techniques such as an algorithmic search engine are contemplated as falling within the scope of the present invention. For example, the predetermined packaging instructions may be stored on the hard drive 78 or other data storage medium (e.g., a CD ROM) and be accessed by the CPU 50 according to program instructions within the RAM 60.

The ROM 62 contains software instructions known as the basic input/output system (BIOS) for performing interface operations with the I/O devices. Also stored in the ROM 62 is a software routine which operates to load a boot program. The boot program will typically be executed when the packaging system controller 16 is powered on or when initialization of the packaging system controller 16 is needed.

The I/O devices include basic devices such as data storage devices (e.g., floppy discs, tape drives, CD ROMs, hard discs, etc.). Typically, the I/O devices communicate with the CPU 50 by generating interrupts. The CPU 50 distinguishes interrupts from among the I/O devices through individual interrupt codes assigned thereto. Response of the CPU 50 to the I/O device interrupts differ, among other things, on the devices generating the interrupts. Interrupt vectors may also be provided to direct the CPU 50 to different interrupt handling routines.

The interrupt vectors are generated during initialization (i.e., boot up) of the packaging system controller 16 by execution of the BIOS. Because responses of the CPU 50 to device interrupts may need to be changed from time to time, the interrupt vectors may need to be modified from time to time in order to direct the CPU 50 to different interrupt handling routines. To allow for the modification of the interrupt vectors, they are stored in the RAM 60 during operation of the packaging system controller 16.

A disk control subsystem 70 bi-directionally couples one or more disk drives 72 (e.g., floppy disk drives, CD ROM drives, etc.) to the system bus 52. The disc drive 72 works in conjunction with a removable storage medium such as a floppy diskette or CD ROM. A hard drive control subsystem 76 bi-directionally couples a rotating fixed disk or hard drive 78 to the system bus 52. The hard drive control subsystem 76 and hard drive 78 provide mass storage for CPU instruction data, for example.

The disk drive 72 and disk control subsystem 70 may be utilized to download one or more pieces of data to the RAM 60 or system hard drive 78. For each part or collection of parts, for example, data relating to the proper container to be used for packaging, the part identification number, the packaging material generation control requirements (both the amount and sequencing) and user packaging instructions (including text, graphics, digital photos and/or video data) may be provided. Therefore as the packaging requirements change or additional parts are required to be packaged, the packaging system controller 16 can by dynamically updated.

A terminal control subsystem 86 is also coupled to the bus 52 and provides output to the output peripheral 18, typically a CRT monitor, and receives inputs from a manual input device 20 such as a keyboard. Manual input may also be provided by a pointing device such as a mouse or other type input peripherals such as a bar code reader. In addition, the input device 20 may include a microphone for receiving voice instructions and be processed by the CPU 50 according to voice recognition techniques as is well known by those skilled in the art. Further, the input peripheral 20 may include a touch activated display such as a capacitive touch screen. Any type of data input device is contemplated as falling within the scope of the present invention.

A network adapter 90 is provided for coupling the packaging controller 16 to a network. Such a network adapter 90 is coupled to the system bus 52 and allows for providing communication linkage to other systems either local or remote to the packaging system 10. In addition, other types of computer hardware may also be connected to the bus 52. For example, a modem 91 may be provided for transmitting, according to instructions provided by the CPU 50, various pieces of information such as re-order requests to inventory distributors for updating inventories in the event that re-order thresholds are satisfied.

Figure 4:
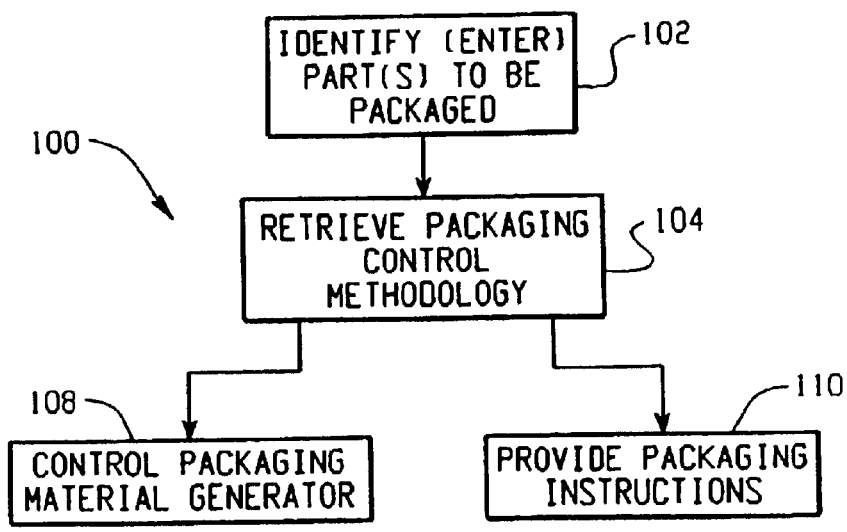
FIG. 4 is a flow chart illustrating an operational flow diagram of the packaging system according to the present invention.

Turning now to FIGS. 3 and 4, a method 100 is provided in which the packaging system 10 of FIG. 1 provides packaging material and packaging instructions to a user. The method 100 preferably begins with the entry of an identification number of a known part to be packaged at step 102. The identification step 102 may be carried out in a number of ways. For example, the part may have a part identification number on it which may be manually input to the packaging system controller 16 via the input peripheral 20 such as by typing the part number into the system using a keyboard or keypad. Alternatively, a pull-down menu illustrated on the output peripheral 18 (e.g., the computer display) may be accessed using a mouse as the input peripheral 20. The pull-down menu may include a list of all the known parts which have associated sets of predetermined packaging instructions in the packaging system 10. By selecting the part number in the pull-down menu using the mouse, the part to be packaging is identified.

In yet another alternative method of entering the part to be packaged, step 102 may include reading the part identification number from the part (or its associated packaging request paperwork) using a pattern recognition device such as a bar code reader or a video monitor with optical character recognition. In still another alternative method, the input peripheral 20 may include a microphone for receiving audio signals and the part may be entered by reading aloud the part number into the microphone of the packaging system 10. In such a case, the microphone receives the acoustic sounds and transmits the data to the CPU 50 which identifies the part using voice recognition techniques. For example, the microphone may receive the acoustic sounds and convert the sounds into analog signals and then transmit the data to the CPU 50 which converts the audio data into digital data using, for example, an A/D converter. Lastly, although a few methods of identifying the part 102 are described above, it should be understood that other methods exist for identifying the part and each is contemplated as falling within the scope of the present invention.

Once the part is entered, the CPU 50, according to the programmed instructions within the RAM 60, retrieves a packaging control methodology which includes a predetermined set of packaging instructions which are associated with the identified part as step 104. The data used is retrieved from an associated memory such as the hard drive 78 or a data recording medium in the disk drive 72 or the network drive. For example, the instructions may be stored on the hard drive 78 or on a CD ROM in the disk drive 72. Upon identifying the part to be packaged, the CPU 50 retrieves the packaging instructions associated with the part at step 104.

In a preferred method of the present invention, the CPU 50 uses a look-up table or an algorithmic search engine to retrieve the predetermined packaging instructions. In such a method, each part number is tied to an address space which contains the packaging instructions associated with the part number. The CPU 50, using the addresses corresponding to the address space, retrieves the instructions and discriminates which instructions pertain to packaging material generator control instructions and which are directed toward operator packaging instructions. According to the present invention the term "operator" is used to broadly mean anyone interfacing with the packaging system and may include, for example, a packer, a customer, a user, a supervisor, etc.

The CPU 50 sends the instructions directed to packaging material generator control to the controller 14 of the packaging material generator 12 to initiate the generation of the appropriate amount of packaging material in the proper sequence. For example, in the preferred embodiment of the present invention, the packaging material generator 12 is a cushioning conversion machine. In such a case, the control instructions to the controller 14 will dictate how many cushioning pads to produce to properly package the part, the proper length for each pad and the order or sequence in which the pads will be produced. Therefore the retrieved packaging instructions from the CPU 50 will provide for the control of the packaging material generator at step 108 of FIG. 4.

The CPU 50 also sends the instructions directed to the operator to the output peripheral 18 (preferably a computer display) to provide step by step explanatory instructions at step 110 to ensure that the packaging material generated by the generator 12 is properly used in packaging the part and that the part is being packaged in the proper container. Preferably, the instructions consist of text and graphics data which are used by the CPU 50 to drive the output peripheral 18 and thereby provide pictorial outputs with accompanying textual instructions. In addition, the instructions are preferably provided in a sequence which correspond to the order in which the packaging material is generated. Although the preferred embodiment of the present invention provides the packaging instructions at step 110 using graphics and text, the packaging instructions may also further include video and/or audio data for the packaging instructions. Any form of packaging instructions is contemplated as falling within the scope of the present invention.

Therefore if the identified part to be packaged requires three pieces of cushioning pads to be generated in lengths of 12", 18" and 15", respectively, the packaging instructions which are retrieved by the CPU 50 will result in a generation of a 12" cushioning pad while a graphical illustration with an accompanying textual explanation of how to use the 12" pad to properly package the part will be provided on the display 18. Once the operator takes the 12" pad, the cushioning conversion machine 12 detects the condition (preferably through use of a sensor) and then automatically generates the next pad (the 18" pad) according to the predetermined packaging instructions, while a graphical illustration with accompanying text is provided on the display 18 to illustrate how to properly utilize the generated pad. Lastly, after the second pad is taken by the operator, the last pad is produced by the cushioning conversion machine 12 with its associated instructions on the display to illustrate how to complete the packaging process. Consequently, the present invention ensures that the proper packaging container and the proper amount of packaging material is used in the packaging of an identified part. In addition, the packaging system 10 provides the proper amount of packaging material in the proper sequence and provides guidance in the packaging of a part within the proper container to ensure that the part is efficiently packaged independently of the experienced level of the operator. Furthermore, the present invention results in the elimination of waste packaging material, enables packaging consistency and reduces packaging damage.

In the above example, a cushioning conversion machine was used as the packaging material generator 12. Although a cushioning conversion machine is used in the preferred embodiment of the present invention, the packaging system 10 may also be used in conjunction with other types of packaging material generators or dispensers, such as styrofoam peanut generators and/or dispensers, bubble-wrap generators and/or dispensers, air pad machines, void fill generators (e.g., material shredders), etc. Any type of packaging material generator and/or dispenser is contemplated as falling within the scope of the present invention. In addition, in the above example, the packaging instructions of step 110 were limited to identifying the proper packaging container and how to utilize the generated packaging material to pack the identified part. The packaging instructions may, however, include additional instructions such as specifying which type of packaging tape or sealer to use in closing the container, how to seal the container using the tape, whether documentation is to be included within the container and what type of mailing label to use. In addition, the packaging instructions may include pre-packaging instructions such as instructions relating to the selection and erection of the proper container, etc.

Figure 5:
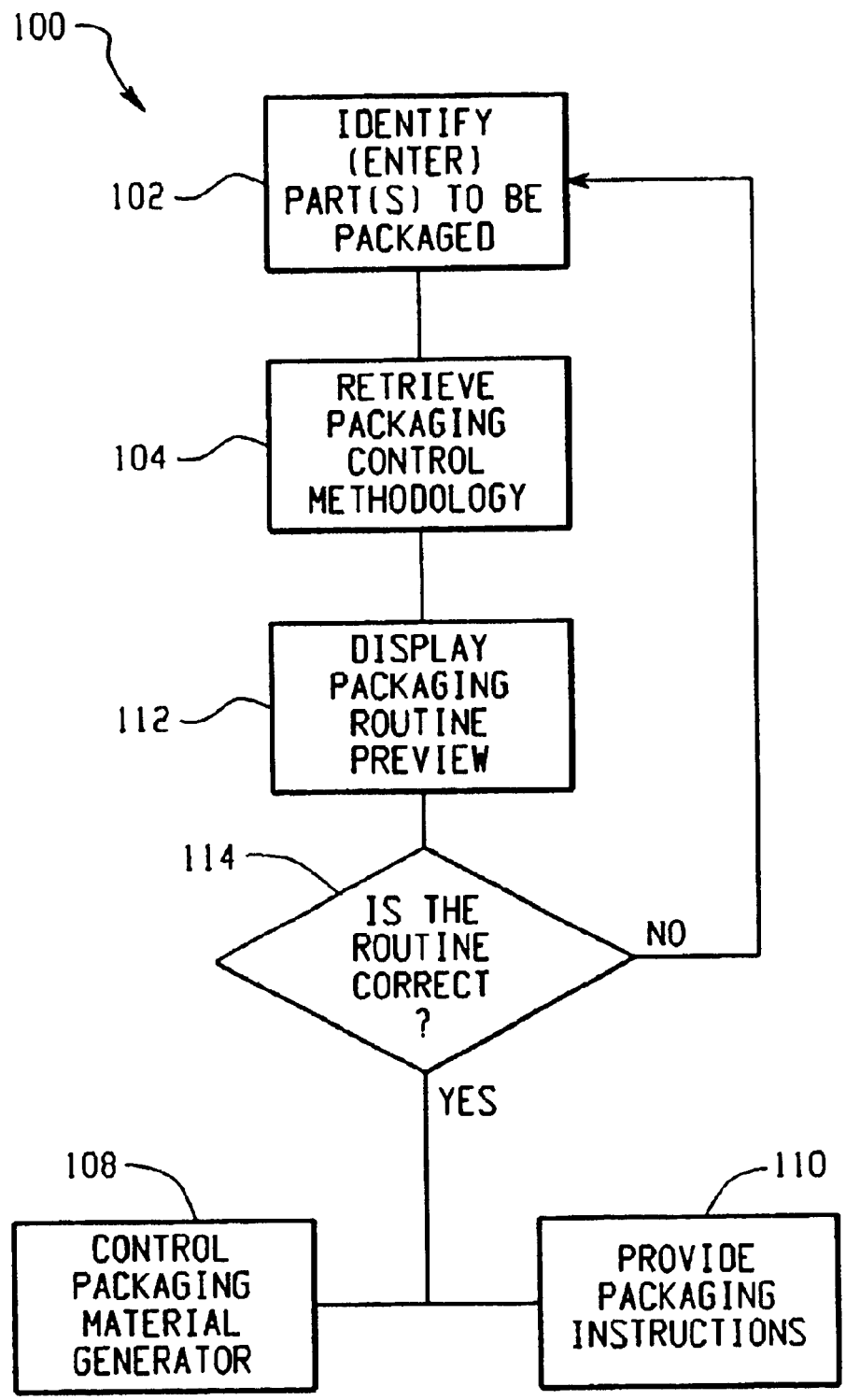
FIG. 5 is a flow chart illustrating a packaging routine preview feature which allows a packer to verify whether the appropriate packaging routine has been retrieved for the identified part to be packaged.

In addition to the features of FIG. 4, the method 100 may also include a preview feature, as illustrated in FIG. 5. Once the known part to be packaged is identified (step 102) and the CPU 50 retrieves the packaging control methodology (i.e., the packaging instructions, step 104), the CPU 50 sends the packaging preview data to the output peripheral 18 which allows the operator to view the identified part and all the steps involved in the packaging process at step 112. The preview feature allows the operator to verify whether or not the proper part has been identified at step 114. For example, if after reviewing the display packaging preview at step 112 the operator determines that the wrong part has been identified (i.e., the part identification number was incorrectly entered, etc.), the operator can return to the beginning of the method 100 and repeat the step of identifying the part to be packaged at step 102 (i.e., re-enter the part identification number) prior to generating any packaging material, thereby avoiding potential waste. If, however, the operator verifies through use of the preview screen that the identified part is the correct part at step 114, the method 100 continues and the CPU 50 sends the predetermined instructions to the controller 14 and display 18 (steps 108 and 110) for the packaging of the identified part.

Figure 6A:
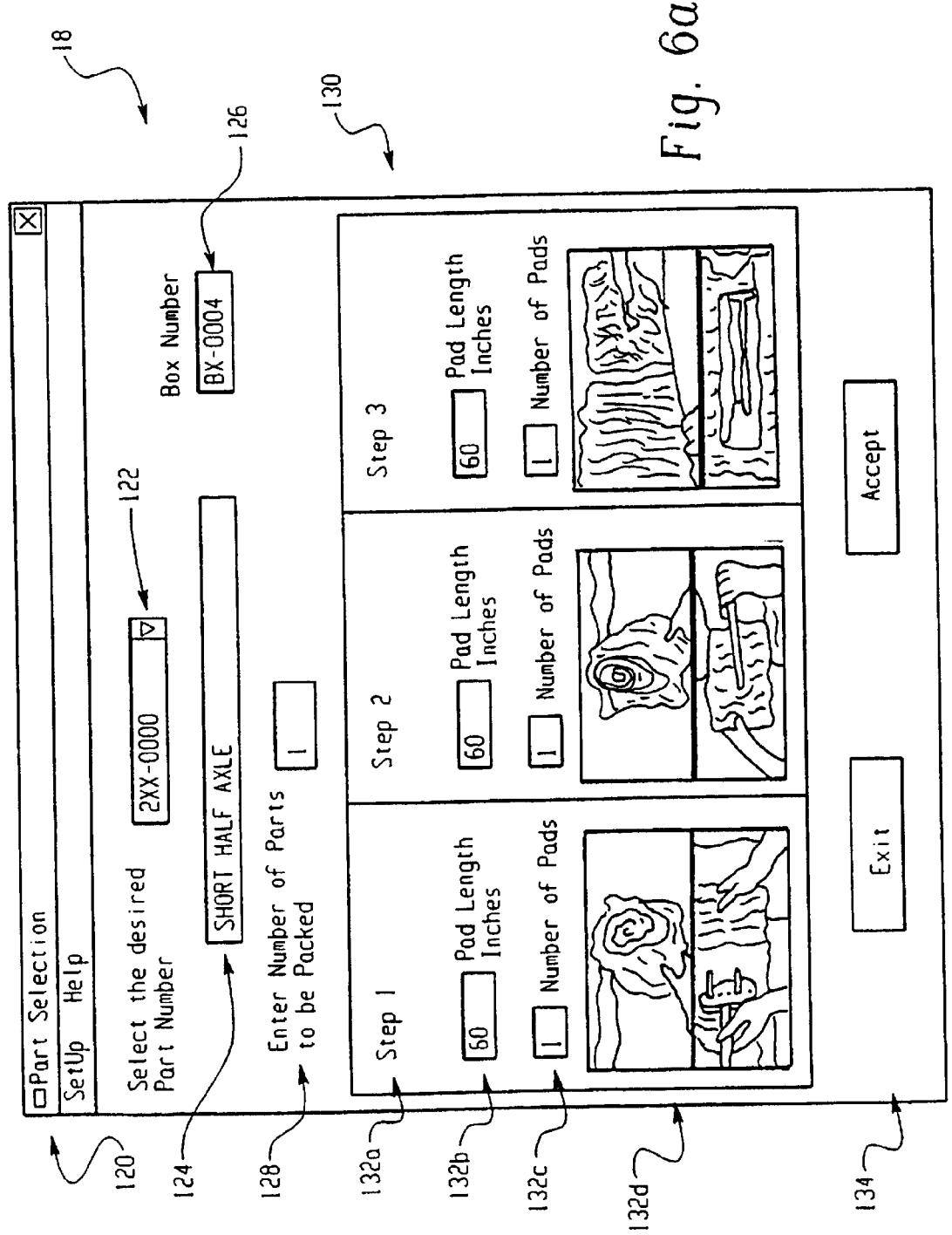
FIG. 6a is an output peripheral display and user interface illustrating a predetermined set of retrieved packaging instructions for an identified part to be packaged.
Figure 6B:
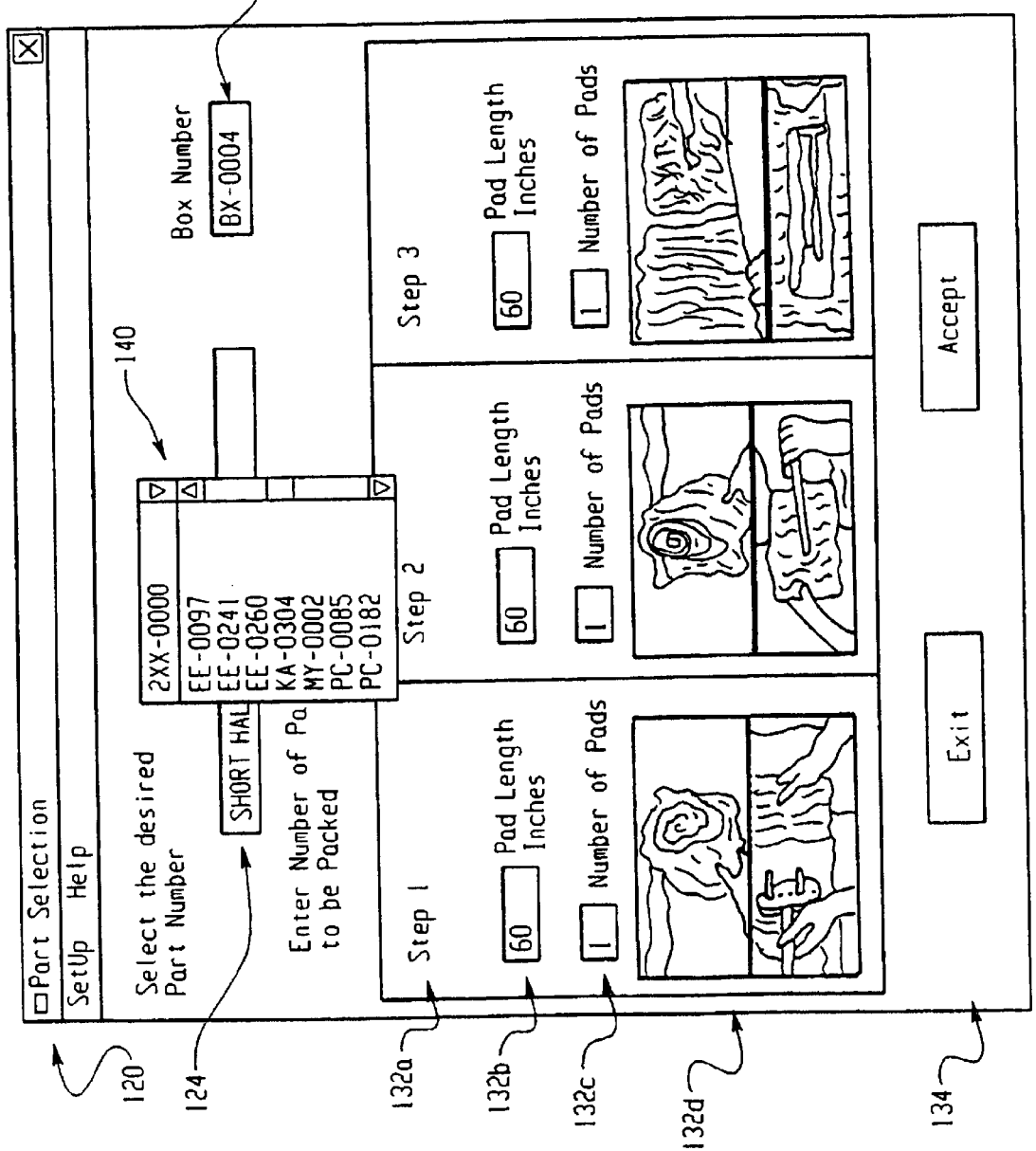
FIG. 6b is an output peripheral display and user interface which highlights a method of identifying or entering the parts to be packaged according to one aspect of the present invention.
Figure 6C:
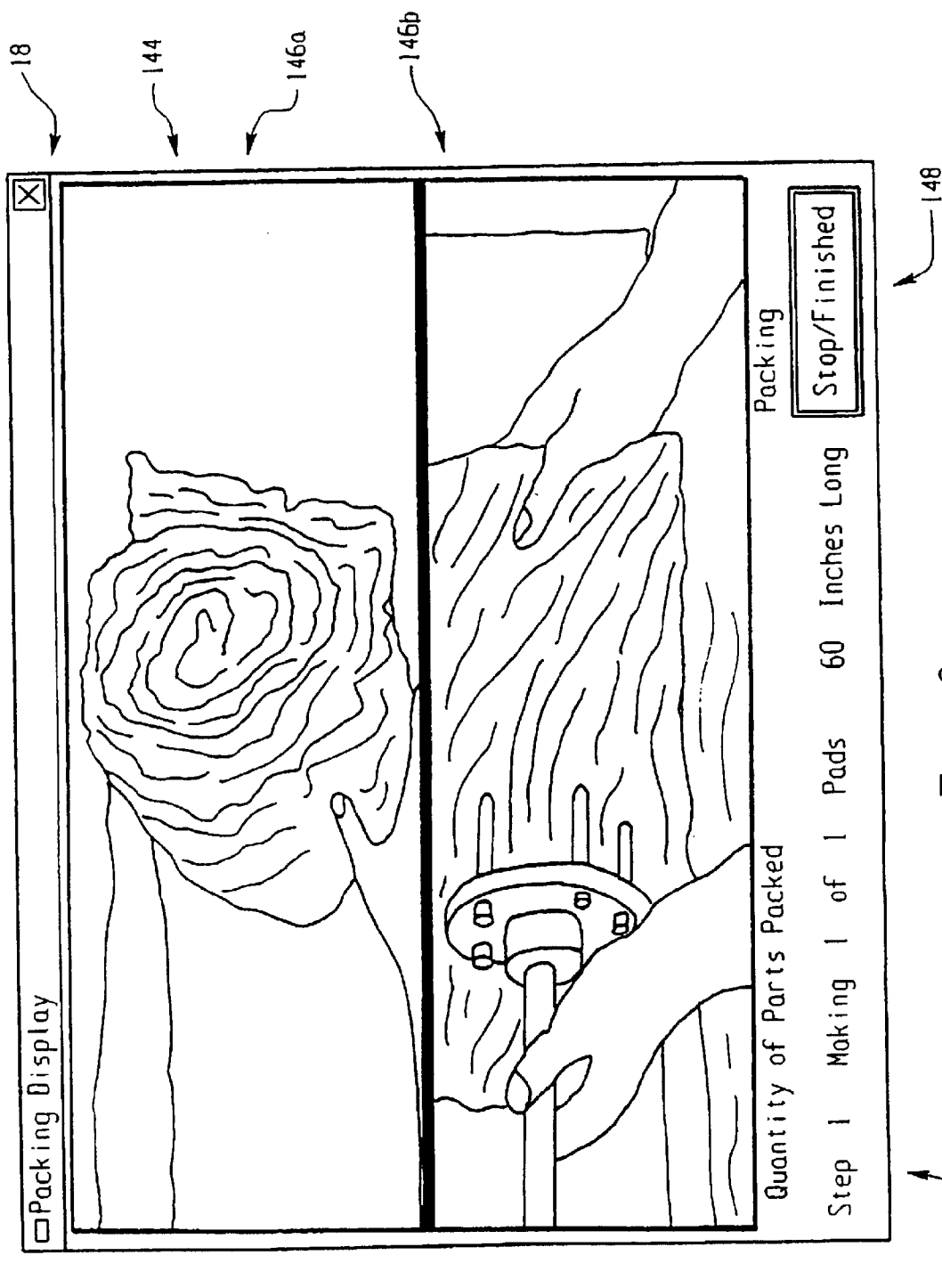
FIG. 6c is an output peripheral display illustrating in greater detail a particular step of a predetermined set of retrieved packaging instructions for the packaging of the identified part.
Figure 7:
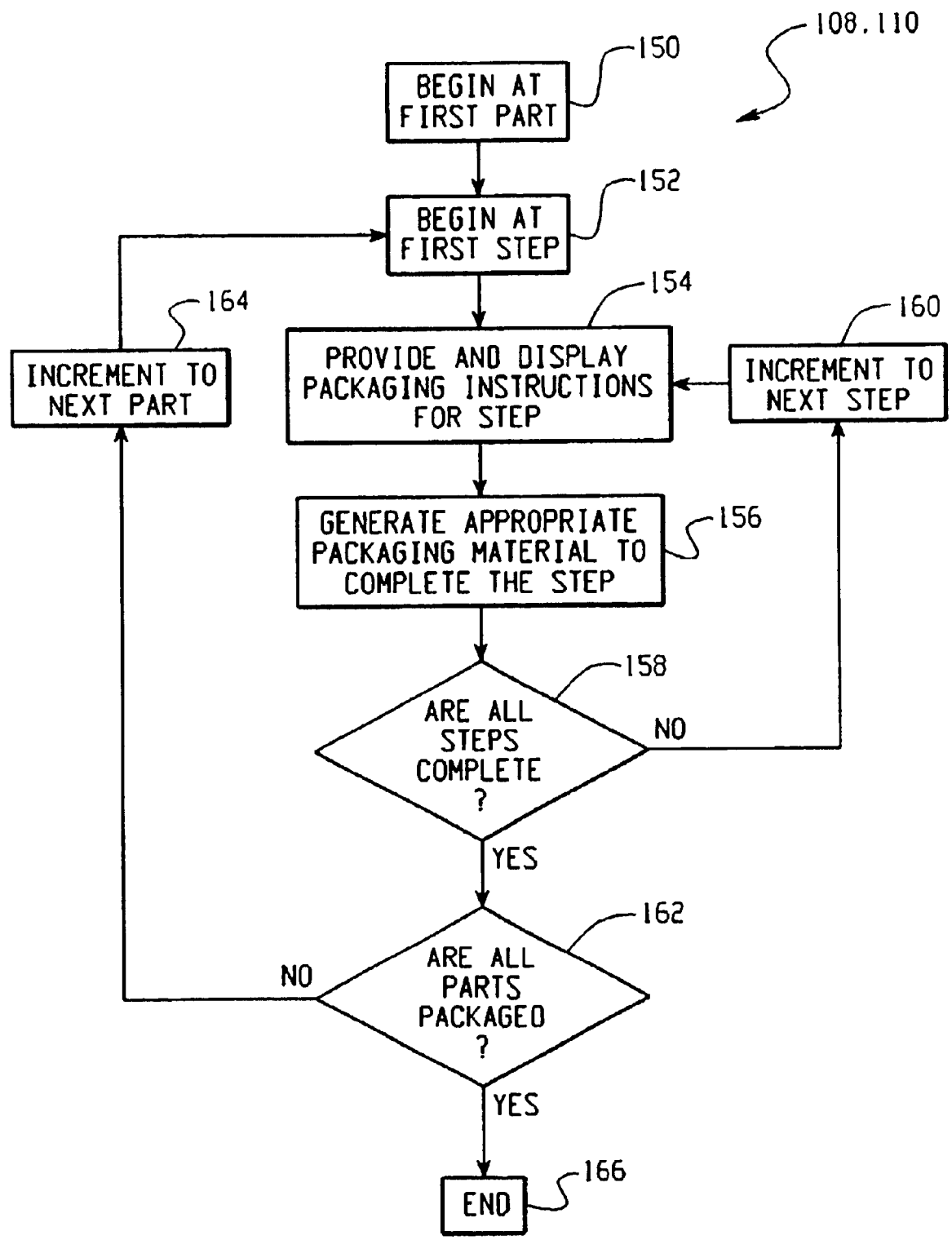
FIG. 7 is a flow chart illustrating an operational flow diagram for the generation of packaging material and the provision of packaging instructions to an operator for the packaging of one or more parts.

The method 100 of FIG. 5 is illustrated in greater detail according to an exemplary embodiment of the preview display feature shown in FIGS. 6a–6c and in the flow chart of FIG. 7. FIG. 6a is an exemplary display screen on the output peripheral 18. FIG. 6a preferably includes a windows-type display interface 120 having a part identification window 122, a part title box 124 and a box number window 126 for displaying the proper packaging container which corresponds to the identified part. The interface 120 further includes a window 128 which allows a user to indicate how many of the identified parts are to be packaged and a preview window 130 which illustrates a preview of the packaging process associated with the identified part. The preview window 130 includes, for each step in the packaging process, a step identifier 132a, a packaging material amount identifier 132b, a window 132c which indicates the number of pads required to complete the identified step, and a packaging illustration box 132d. Lastly, the interface 120 includes a preview acceptance window 134 which allows a user, after reviewing the preview window 130, to verify that the packaging instructions are correct ("Accept") or exit the process ("Exit").

Once the part to be packaged is entered, however, the CPU 50 retrieves the packaging instructions and inputs the various pieces of data onto the screen as shown in FIG. 6a such as the identification of the packaging container and the box number window 126 and the name of the part in the part title box 124. Preferably, the number of parts to be packaged is manually input into the box 128, however, the present invention may automatically receive such data when reading the part identification number or, alternatively, an order, job or lot number. In addition, the preview of the packaging methodology for the identified part is displayed by the CPU 50 in the window 130 for verification by the user.

One manner of identifying the part to be packaged is simply entering the part identification number into the window 122. Alternatively, one may also use a pull-down menu using a mouse, as illustrated in FIG. 6b, by scrolling up and down within the pull-down menu. A user may then select the proper part from all the known parts which are listed within the system 10. Once selected, the CPU 50 retrieves the predetermined packaging functions associated with the identified part from the memory (e.g., hard drive 78 or external drive 72) and populates the windows 124, 126 and 130. The user may then verify the instructions by evaluating the preview window 130 and selecting the proper option in the preview acceptance window 134.

If the packer selects "Accept" in the preview acceptance window 134, the packaging system 10 begins the packaging process by using the retrieved packaging instructions to control the packaging material generator 12 and provide the display instructions such as providing pre-packaging instructions such as the selection of the proper container, instructions regarding how to utilize the generated packaging material, and post-packaging instructions such as how to properly seal the container and where to send the completed package (steps 108 and 110, respectively). One exemplary display instruction corresponding to step 110 is illustrated in FIG. 6c. In FIG. 6c, the output peripheral 18 displays an enlarged packaging display window 144 having, for example, two graphical display regions 146a and 146b and a text explanation region 146c. The graphical regions 146a and 146b may consist of one or more pictures and/or textual annotations which illustrate how the packaging material which is produced by the packaging material generator 12 is used to secure the identified part within the selected container. The text explanation window 146c preferably identifies which step within the packaging process is being executed, which pad for the step is being illustrated (when multiple pads are being used for a single step), and the length of the pad being produced. In addition, the window 146c may include further text instructions to further aid the operator in the packaging of the identified part. Lastly, the packaging display window 144 includes a stop/finish function region 148 which allows the user to stop the process or indicate that the packaging step is completed.

Preferably, the packaging display window 144 uses text and graphics to communicate and explain the packaging step to the operator. Alternatively, the packaging instructions may further include video and/or audio data and therefore the display window 144 may include a video illustrating the packaging procedure with accompanying audio instructions. Once the operator clicks or otherwise activates the stop/finish region 148, the CPU 50 returns the operator to a display window 120 similar to FIG. 6a.

A detailed flow chart illustrating the steps involved in providing the retrieved packaging instructions (steps 108 and 110) to the packaging material generator 12 and to the output peripheral 18 is provided in FIG. 7. The CPU 50 begins at the first part to be packaged at step 150. In some cases, instead of simply packaging a single part, a plurality of identical parts will need to be packaged (see window 128 of FIG. 6a). The present invention contemplates providing instructions for either a single or multiple parts to be packaged, as may be desired. The CPU 50 then begins at the first step of the packaging process (step 152) where it begins providing the packaging instructions for the first step in the packaging process at step 154. As illustrated in FIG. 6a, for example, the first step may include the forming of a single pad having a length of 60" into a coil and placing the coil in the packaging container so that it underlies the part to be packaged within the container. In conjunction with providing the packaging instructions on the output peripheral 18 to the operator, the CPU 50 transmits the appropriate control signals to the controller 14 at step 156 to generate the appropriate packaging material to complete the first step, that is, generating a pad having a length of 60". After completing the first step, the CPU 50 determines whether all the steps are complete at step 158. Since the packaging process for the part in this particular example includes three separate packaging steps, the method proceeds to step 160 where the CPU 50 increments to the next step of the packaging process (i.e., step 2).

In the second step of the packaging process, the CPU 50 provides the packaging instructions for the second step at step 154. As illustrated in FIG. 6a, the second step may include the forming of a single pad having a length of 60" into a coil and placing the coil in the box so that it also underlies another portion of the part to be packaged within the container. In conjunction with sending the packaging instructions to the output peripheral 18, the CPU 50 transmits the appropriate control signals to the controller 14 in step 156 in accordance with the packaging instructions to generate the appropriate packaging material to complete the second step. After completing the second step, the CPU 50 again determines whether all the steps are completed at step 158. Since the packaging process is still not complete, the method continues to step 160 and again provides packaging instructions at steps 154 and 156, respectively.

After the completion of all three steps, the CPU 50 determines that the steps are completed at step 158 and then the packaging process for that particular part is completed and the method continues to step 162, wherein the CPU 50 queries whether all the parts that need to be packaged are complete. If additional parts still remain to be packaged, the method continues to step 164 and the CPU 50 increments to the next part and again begins the packaging process step at step 152. If all the parts to be packaged are completed at step 162, the CPU 50 continues to step 166 and the packaging process is completed.

As stated above, the CPU 50 retrieves packaging instructions which constitute a packaging control methodology which is associated with the identified part to be packaged. The packaging instructions which are retrieved by the CPU 50 in response to the identification of the part to be packaged include both control instructions to control the operation of the packaging material generator 12 and operator instructions to help the operator properly use the generated packing material so as to efficiently package the part within the specified container.

In addition to the above packaging instructions, the packaging instructions may further include packaging material manipulation instructions which provide control functions in addition to the generation of the packaging material. For example, the packaging material manipulation instructions may include instructions to activate a coiler to take a cushioning pad which has been produced by the packaging material generator 12 and form a coil with the pad for use in packaging the part within the packaging container.

Alternatively, the manipulation instructions may activate a pick-and-place apparatus to effectuate an automated system to take a generated pad and place it into a packaging container without the need of an operator. In yet another alternative arrangement, an automated packing mechanism such as a pick-and-place apparatus, a robot or a pad insertion system may be used in conjunction with an operator to improve the productivity of the packing station. Although a coiling operation and a pick-and-place control functionality are provided as two examples for the packaging material manipulation instructions, additional packaging material manipulation instructions may also be included and are contemplated as falling within the scope of the present invention. Like the packaging instructions, the packaging material manipulation instructions are predetermined and are associated with the particular part to be packaged and therefore are retrieved by the CPU 50 after the part has been properly entered.

Figure 8:
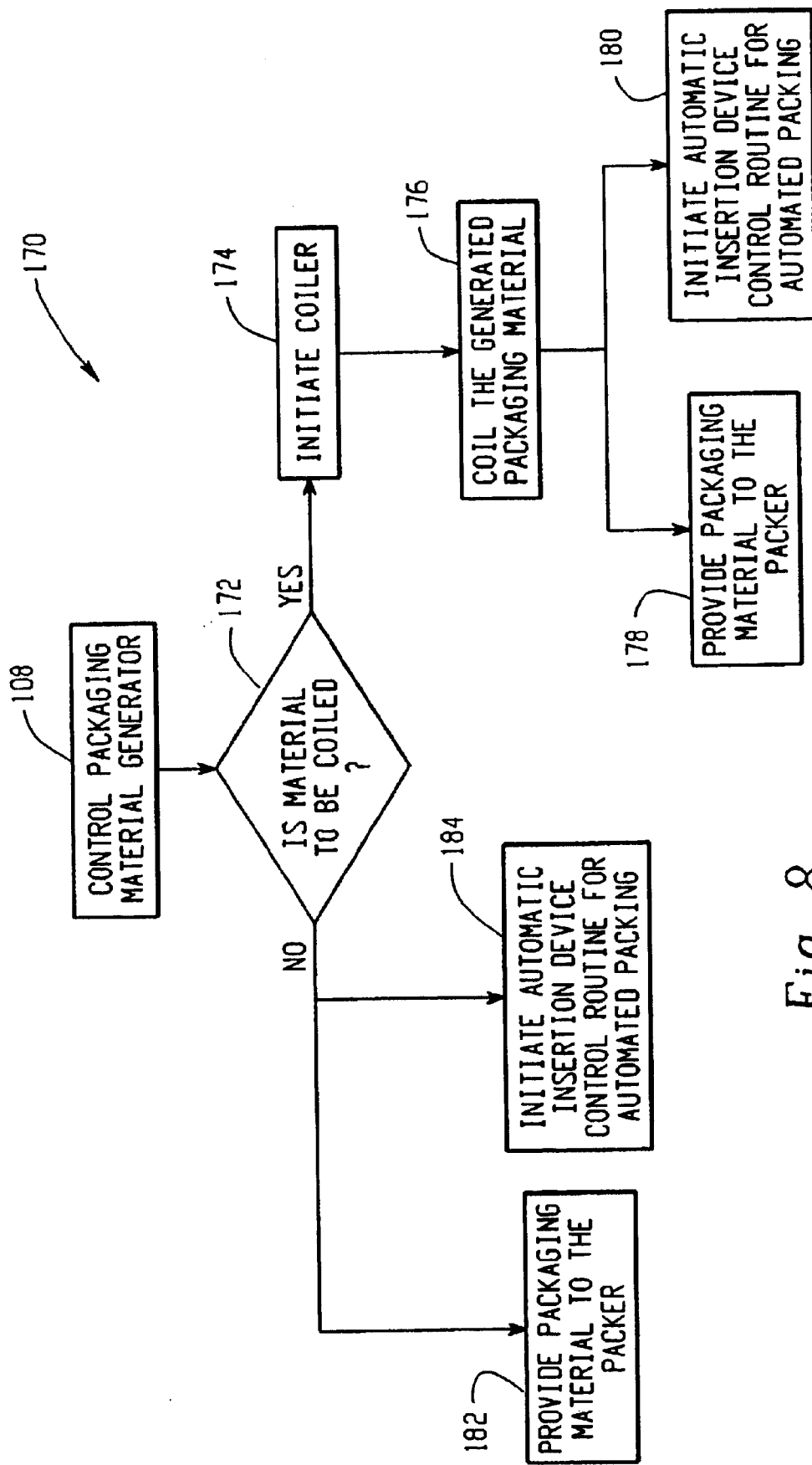
FIG. 8 is a flow chart illustrating the operation of the packaging system including a packaging material manipulation apparatus for either coiling generated packaging material and/or initiating a pick-and-place control routine for automated packaging.

Turning now to FIG. 8, a flow chart is disclosed which illustrates an exemplary flow diagram by which the CPU 50 retrieves the packaging instructions which include the packaging material manipulation instructions and how the packaging material manipulation instructions are utilized by the system in providing additional control functionality. FIG. 8 illustrates a method 170 by which additional control functionality is provided using the retrieved packaging instructions from the CPU 50. As discussed, the CPU 50 retrieves the packaging instructions which correspond to the part to be packaged and sends the control instructions to the packaging material generator 12 at step 108. The packaging instructions also include the packaging material manipulation instructions. At step 172, the CPU 50 queries whether the material which is being generated by the packaging material generator 12 is to be coiled. If the packaging instructions indicate that the packaging material is to be coiled (YES), a coiler, which is functionally coupled to the packaging material generator 12, is activated at step 174 and the generated packaging material, having a length in accordance with the packaging instructions, is coiled at step 176 using the coiler apparatus which is functionally coupled to the packaging material generator. After being coiled at step 176, two options exist, which depend upon the control instructions. In one case, the coiled packaging material is simply made available to the operator to manually take and utilize the coil in the packaging of the part at step 178. In another case, the packaging instructions further include control instructions which initiate a pick-and-place control apparatus, for example, at step 180. The control instructions dictate a control routine which allows the pick-and-place apparatus to take the coiled packaging material and automatically place it within the packaging container.

Alternatively, if at step 172 the packaging instructions do not contain any control signals requiring the generated packaging material to be coiled (NO), the generated packaging material may simply be made available to the operator for use in packaging the identified part at step 182. Alternatively, however, the packaging instructions may include control instructions for the initiation of a pick-and-place apparatus for use in an automated packaging routine at step 184. An exemplary coiler and pick-and-place apparatus are illustrated and described in greater detail below.

Figure 9A:
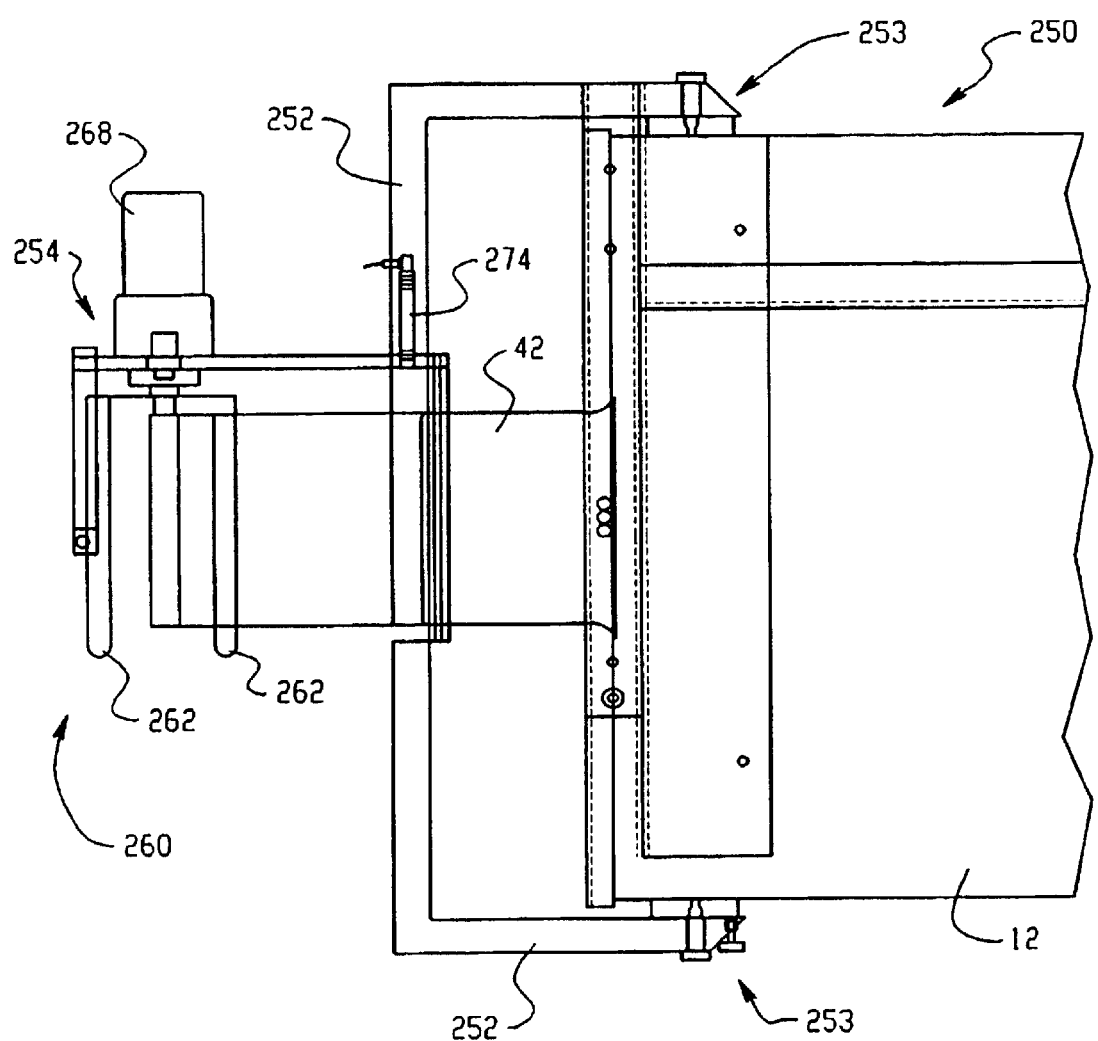
FIG. 9a is a partial top view of the cushioning conversion system of FIG. 2 employing a coiler attachment mechanism for taking a length of generated packaging material and coiling it in accordance with retrieved packaging instructions.
Figure 9B:
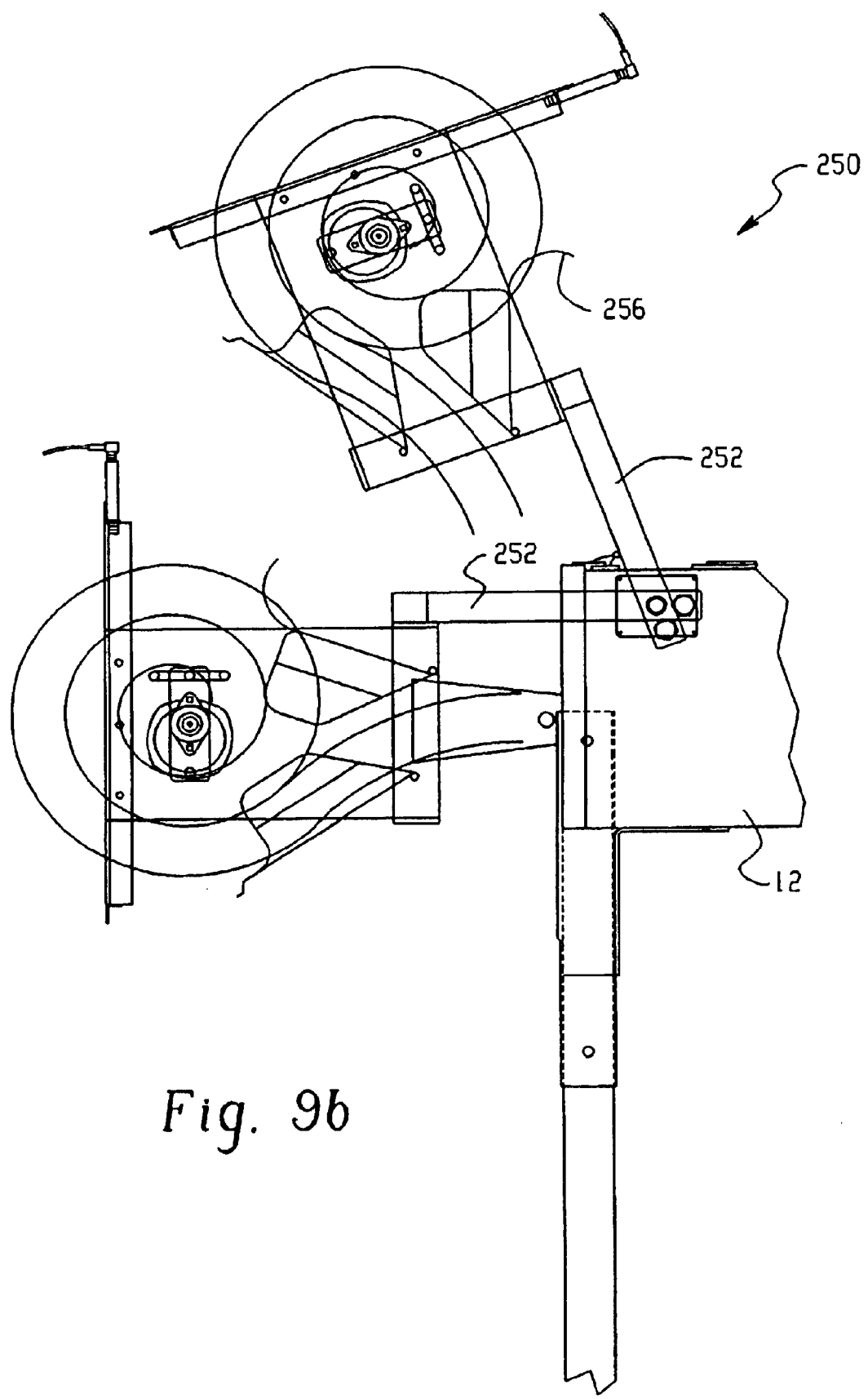
FIG. 9b is an enlarged partial side view of the cushioning conversion system of FIG. 2 employing the coiler attachment of FIG. 9a, wherein the coiler attachment is operable to be rotated into and out of the outlet flow path of the cushioning conversion machine.

FIG. 9a illustrates an exemplary coiling apparatus 250 according to the present invention. The coiler 250 may be physically attached to the cushioning conversion machine 12 near its outlet 42, as illustrated in FIG. 9b. The coiler 250 includes a U-shaped frame 252 securely attached to the cushioning conversion machine 12 via a bolt assembly 253. Preferably, the coiler 250 is pivotally mounted to the cushioning conversion machine 12, as illustrated in FIG. 9b, to allow the coiler 250 to be moved into an out of the outlet pad flow path as maybe desired. A rotating mechanism 254 is rotatably mounted to the frame 252 in the outlet pad feed path in a first position, and when the frame 252 is moved from this operating position, the rotating mechanism 254 is no longer aligned with the outlet 42, and the cushioning conversion machine 12 may be used without the coiler 250.

The rotating mechanism 254 is rotatably mounted to the frame 252 and includes a rotating shaft which forms the center of rotation for the coiler 250. A capture device 260 is attached to and rotates with the shaft, and a power source 268 is provided for rotating the shaft. The rotating shaft extends through an opening in a support panel and projects in a direction which is transverse to the outlet pad feed path.

The capture device 260 is fixably attached to the projecting ends of the shaft, whereby it is aligned with the outlet 42 of the cushioning conversion machine 12. The capture device 260 is designed to capture the leading end of the strip of cushioning when the coiler 250 is in a ready-to-coil condition. The illustrated capture device 260 includes a connecting hub and at least two capture members 262 projecting therefrom. The hub is an elongated rod or bar attached to, and rotatably driven by, the shaft. The capture members 262 are symmetrically positioned to extend from the hub into the outlet pad feed path. The capture members 262 are sized and spaced so that they have a length which is approximately as wide as the strip of cushioning product (i.e., the pad produced by the cushioning conversion machine). When the coiler 250 is in a ready-to-coil condition, the capture members 262 of the capture device 260 are aligned in a plane which is perpendicular to a travel path of the strip of cushioning material as it is emitted from the cushioning conversion machine 12 so that the leading end of the strip of cushioning product will pass between the capture members 262. When the shaft, and thus the capture members 262, are rotated, the capture members 262 will capture the end of the strip so that the remaining portions of the strip may be coiled therearound.

The power source 268 for driving or rotating the shaft is mounted on the support panel on the side facing away from the outlet 42 of the cushioning conversion machine 12. The power source 268 is preferably a motor, more preferably an electric motor, and even more preferably a low speed DC torque motor. The power source 268 having an adjustable current limit is preferable because the motor torque is proportional to motor current, whereby the current limit is actually an adjustable torque setting to control the tightness of the spiral/coil. Note that the adjustable torque setting may also be placed under control of the packaging system controller 16 and thus may produce spiral/coil configurations with different cushioning characteristics in accordance with the packaging instructions. Alternatively, a fluid-power source with a pressure regulator for torque adjustment may also be utilized. Another option is to incorporate a slip clutch into the drive to maintain a constant coiling tension on the strip of the cushioning product.

The coiler 250 may additionally include a taping device (not shown) for supplying tape to secure the trailing end of the strip of cushioning product to the coil. The taping device may be designed for manual dispensing of the tape and manual placement of the tape on the coil, however, an automatic taping device is possible with, and is contemplated by, the present invention.

When the coil of cushioning product has been completely formed and possibly taped, it may be removed from the coiler 250 by pulling the coil in a transverse direction away from the support panel. This pulling is easily accomplished, especially if the capture members 262 of the capture device 260 are in the ready-to-coil position where they are aligned in a plane perpendicular to the travel path of the strip of cushioning material as it is emitted from the cushioning conversion machine. Alternatively, an automatic ejection system (controlled, for example, by the controller 14) is possible with and is contemplated by the present invention.

As previously discussed, the cushioning conversion machine 12 includes a controller 14 which controls the operation of the cushioning conversion machine 12. In addition, the controller 14 also controls the coiler 250 based on the packaging instructions provided by the packaging system controller 16 of FIG. 1. In one aspect of the present invention, the controller 14 operates in conjunction with a strip-production indicator which preferably includes a strip sensing mechanism which senses whether a strip of cushioning product is being emitted from the outlet 42 of the cushioning conversion machine 12. In this embodiment, the strip product indicator includes a upstream strip sensor (not shown) on the cushioning conversion machine which senses whether the strip is present at an upstream location at the outlet 42 and a downstream strip sensor 274 which senses whether the strip is present at a downstream location. The upstream strip sensor is mounted at an upstream portion of the support panel or on the cushioning conversion machine 12 itself. The downstream strip sensor 274 is preferably mounted on the coiler frame 252 and in this manner, the downstream location is positioned to ensure that the leading end of the strip of the cushioning product is correctly positioned relative to the capture device 260.

The controller 14 activates the coiler 250 (i.e., energizes the motor 268 of the rotating mechanism 254) when both the sensors (the upstream and downstream sensors) sense that the strip of cushioning product is present at both the upstream location and the downstream location. This ensures that the leading end of the strip of the cushioning product is correctly positioned relative to the capture device 260 and that the strip of cushioning product is long enough to coil. The controller 14 deactivates the coiler 250 when the upstream sensor senses that the strip of the cushioning product is no longer present (i.e., its trailing end has passed the upstream location) after a period of time corresponding to a time period necessary to ensure that the trailing end portion of the strip of cushioning product is coiled and a capture device is properly aligned.

In this manner, the coiling apparatus 250 may operate in conjunction with the cushioning conversion machine 12 to provide additional manipulation control to the packaging material in accordance with the retrieved packaging instructions by the CPU 50. The operation of a coiling apparatus is also described in U.S. patent application Ser. No. 60/071,164 entitled "Cushioning Conversion System and Method for Making a Coil of Cushioning Product", which is incorporated by reference herein in its entirety.

As discussed supra, an alternative packaging material manipulation apparatus may include a packaging material pick-and-place system 300, as illustrated in FIG. 10a. The pick-and-place system 300, according to one exemplary embodiment, includes the cushioning conversion machine 12 of FIG. 2 and a pick-and-place assembly 302 having an outfeed drive unit 304 which feeds a generated cushioning pad to an indexing conveyor system 306. The outfeed drive unit 304 contacts a produced pad at the outlet 42 and pulls the pad away from the machine outlet 42 and onto the conveyor system 306.

The conveyor system 306 preferably includes a supporting frame 306a and a conveyor belt 306b which receives a produced pad from the outfeed drive unit 304 and transfers the pad along the conveyor belt 306b to a loading station 307 where a pick-and-place unit 308 is located, as illustrated in FIG. 10b. The pick-and-place unit 308 has an arm 308a which grabs the produced pad in a first position 309a as (illustrated in FIG. 10b) and rotates the arm 308a 180° to a second position 309b (as illustrated in FIG. 10c) and releases the pad, thus placing the pad in a container (not shown). In addition, the conveyor belt 306b preferably includes a chain belt with 306c which create a pocket to align and hold the cushioning pads on the belt 306b during transport to the pick-and-place staging area 307. The conveyor belt 306b also allows multiple cushioning pads to accumulate between the machine 12 and the staging area 307.

Alternatively, the pick-and-place system 300 may include a pick-and-place unit 308 directly at the machine outlet 42. In such a case, the pick-and-place unit 307 grabs the produced pad at the machine outlet 42 and rotates the pad 90° and places the pad into an appropriate packaging container. The pick-and-place system 300 is controlled by the packaging instructions which are retrieved by the CPU 50 of the packaging system controller 16 and transmitted to the controller 14 of the cushioning conversion machine 12. The controller 14 also controls the motor 304b of the outfeed drive unit 304, the conveyor belt 306b of the conveyor system 306 and the pick-and-place unit 308, respectively.

Other types of pick and place type systems are also contemplated by the present invention such as the one described in U.S. Pat. No. 5,749,821 entitled "Cushioning Conversion System for Converting Paper Stock into Cushioning Material with a Staging Area and a Pick and Place Assembly", which is incorporated by reference herein in its entirety.

The packaging material manipulation control feature of the present invention has been discussed in conjunction with the coilers 200 and 250 and the pick-and-place control system 300 of FIGS. 9a–9c and FIGS. 10a–10c, respectively. These packaging material manipulation control features, however, are merely exemplary and this feature extends to other manipulation control functions such as robotic control functionality for automated packaging. Other types of dunnage manipulators and manipulation techniques include the pad discharge and insertion apparatus shown and described in U.S. patent application No. 60/059,290 filed on Sep. 18, 1997, which is hereby incorporated herein by reference in its entirety. In addition, although the discussion of the packaging material manipulation control feature was disclosed in conjunction with the cushioning conversion machine 12 of FIG. 2, this feature extends to other types of packaging material generators and/or dispensers which are contemplated as falling within the scope of the present invention.

Figure 11:
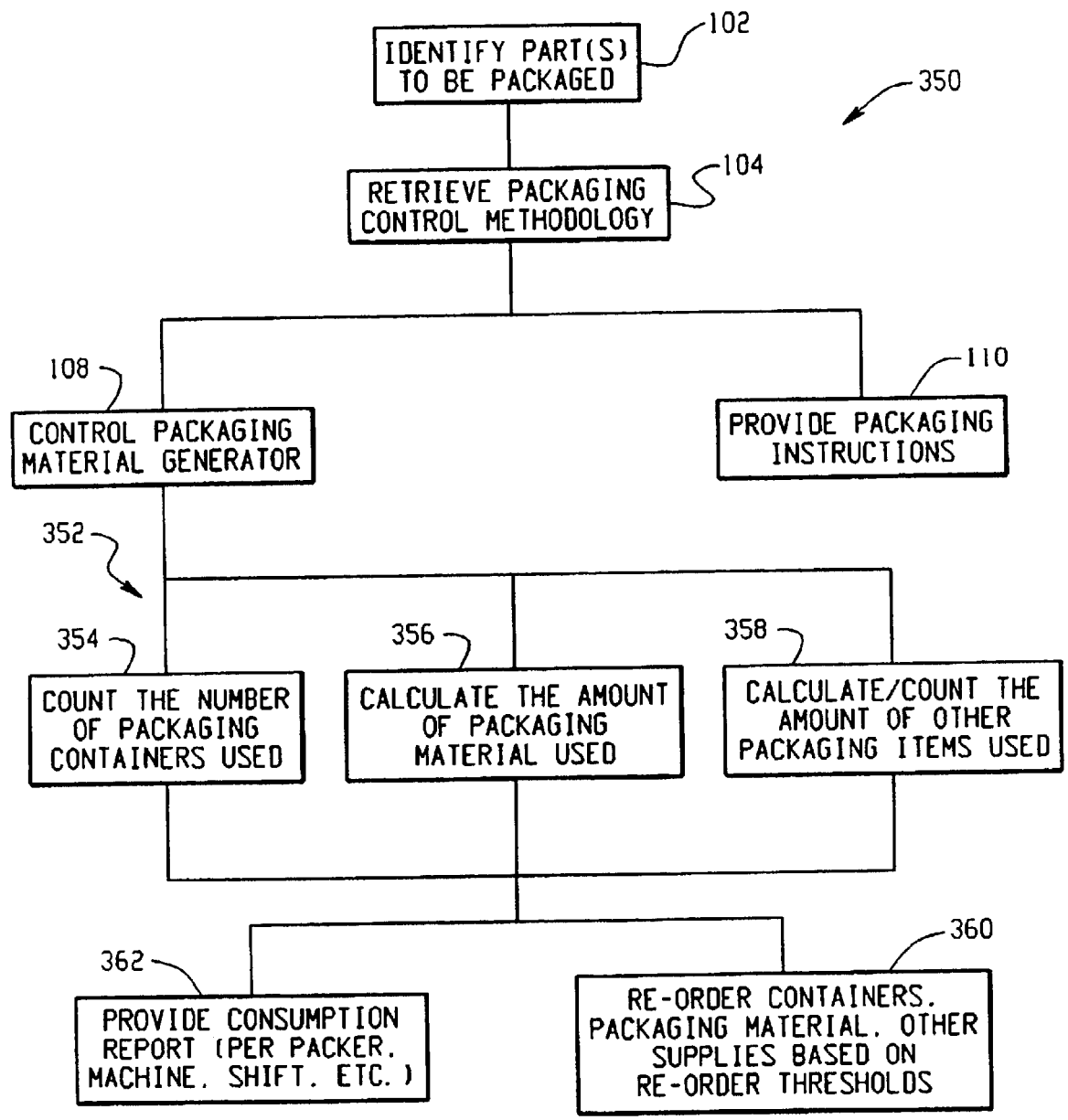
FIG. 11 is a flow chart illustrating a method for providing inventory control, inventory monitoring and automatic re-ordering for packaging materials according to predetermined consumption thresholds.

The packaging system 10 of FIG. 1 may also be utilized to provide an inventory control feature which tracks the consumption of various packaging items or materials in conjunction with its automated generation and supply of packaging material. One exemplary method 350 of providing such inventory control (which may alternatively be considered a monitoring of consumption) is illustrated in FIG. 11. As discussed previously in conjunction with FIG. 4, the packaging system 10 identifies the part to be packaged at step 102 and the CPU 50 retrieves the packaging control methodology consisting of packaging instructions at step 104. Using the packaging instructions, the packaging material generator is controlled at step 108 while an operator is concurrently receiving graphical and textual packaging instructions on an output peripheral 18, such as a CRT display, at step 110.

As each part is packaged, various items associated with the packaging process are consumed. For example, each part is packaged within a particular packaging container or box and each part uses a specified amount of packaging material. In addition, the packaging of the part also includes the use of a specified amount of packaging tape depending on the specified container size as well as other materials such as the insertion of warranty cards, manufacturer's documentation, etc. into the packaging container. As these various packaging materials are consumed during the packaging process, inventories of these items are depleted. The present invention monitors the consumption of these packaging items and automatically generates re-order requests when the inventory control level of the packaging material has dropped below a pre-set value, thus ensuring that inventories are not fully depleted at inopportune times.

The method 350 monitors the amount of packaging materials consumed by the packaging material generator 12 at step 352, wherein, for example, the packaging system controller 16 keeps track of the number of each type of packaging container used at step 354, calculates the amount of packaging material used by the machine 12 at step 356, and keeps track of the other various packaging items at step 358, respectively.

In one example of the present invention, step 354 is performed when the packaging instructions have been retrieved by the CPU 50 and confirmed by the operator. Since the packaging instructions preferably identify the appropriate packaging container, the CPU 50 updates a list within a memory such as an inventory database to indicate that one of the identified containers has been used. Similarly, since the packaging instructions will dictate the amount of packaging material to be generated and used for the packaging of the identified part (e.g., three pads each having a length of 60" in FIG. 6*a*) the CPU 50 calculates the total amount of packaging material that will be used and updates the list within the memory. Lastly, for each identified part, the packaging instructions will preferably dictate the amount of packaging tape to be used as well as which additional items such as warranty cards and documentation are to be packaged within the container. The CPU 50, using the retrieved packaging instructions, then updates a list within the memory. As the list within the memory is continuously updated, the CPU 50 takes each item within the list and compares them with predetermined re-order thresholds either continuously or periodically, as may be desired. If an item in the updated list satisfies its associated re-order criteria or threshold, the CPU 50 generates a re-order request at step 360 (FIG. 11). In addition, the CPU 50 may generate a consumption report using the updated list at step 362 for review as may be desired. Preferably, the re-order thresholds may be adjusted as may be desired. Therefore if, for example, procurement procedures change so that re-ordering may be made at lower inventory levels, the re-order threshold may be adjusted, thereby making the packaging system dynamic.

The re-order thresholds may also be dynamic in the sense that the threshold is a function of the packaging rate. For example, if the packaging system controller 16 via the CPU 50 identifies that the rate of consumption of the various packaging materials is above a certain rate, the packaging system controller 16 may increase one or more thresholds to ensure that a re-order request is generated soon enough to ensure that inventories are not unduly depleted. Likewise, if a consumption rate falls below a predetermined rate, the packaging system controller 16 may decrease one or more thresholds to ensure that a re-order request be generated at a later time since the time required to consume the remaining inventory will be greater and thus prevent excess inventories from being generated.

According to the present invention, the method 350 may provide a re-order request in various ways. For example, when the CPU 50 determines that a packaging item such as packaging tape must be re-ordered (e.g., the amount of remaining packaging tape falls below the associated re-order threshold), the CPU 50 may send the re-order message requesting that packaging tape be ordered to the output peripheral 18 (e.g., the display) so that the operator can communicate the re-order request to personnel in an inventory control department. Alternatively, the CPU 50 may, using the network adaptor 90 of FIG. 3 transmit the re-order request directly to inventory control or the purchasing department over a local network. In yet another alternative aspect of the present invention, the CPU 50 may, using a modem, for example, transmit the re-order request directly to the appropriate inventory distributor or to a packaging materials manufacturer for production planning purposes. In any event, the present invention provides an automated inventory control system and method to continuously monitor the consumption of one or more packaging materials and re-order the materials prior to their complete depletion.

Preferably, the CPU 50 updates the packaging materials at various times instead of continuously. For example, instead of the CPU 50 decrementing an amount paper each time a cushioning conversion machine produces a length of dunnage, the CPU 50 may alternatively, decrement the amount of paper each time a roll of paper is completely consumed and is being replaced by a new roll. Such a function can be effectuated by a sensor which identifies the end of a roll. Similarly, the CPU 50 can update the packaging materials list each time a roll of tape is completely consumed, etc.

In yet another aspect of the present invention, the method 350 of FIG. 11 may operate in conjunction with multiple packaging material generators 12. In such a case, the memory containing the updated list is shared over a computer network linking the packaging system controllers 16 of each packaging system 10. As each packaging system 10 consumes various packaging items, the global list is then continuously updated.

Figure 12A:
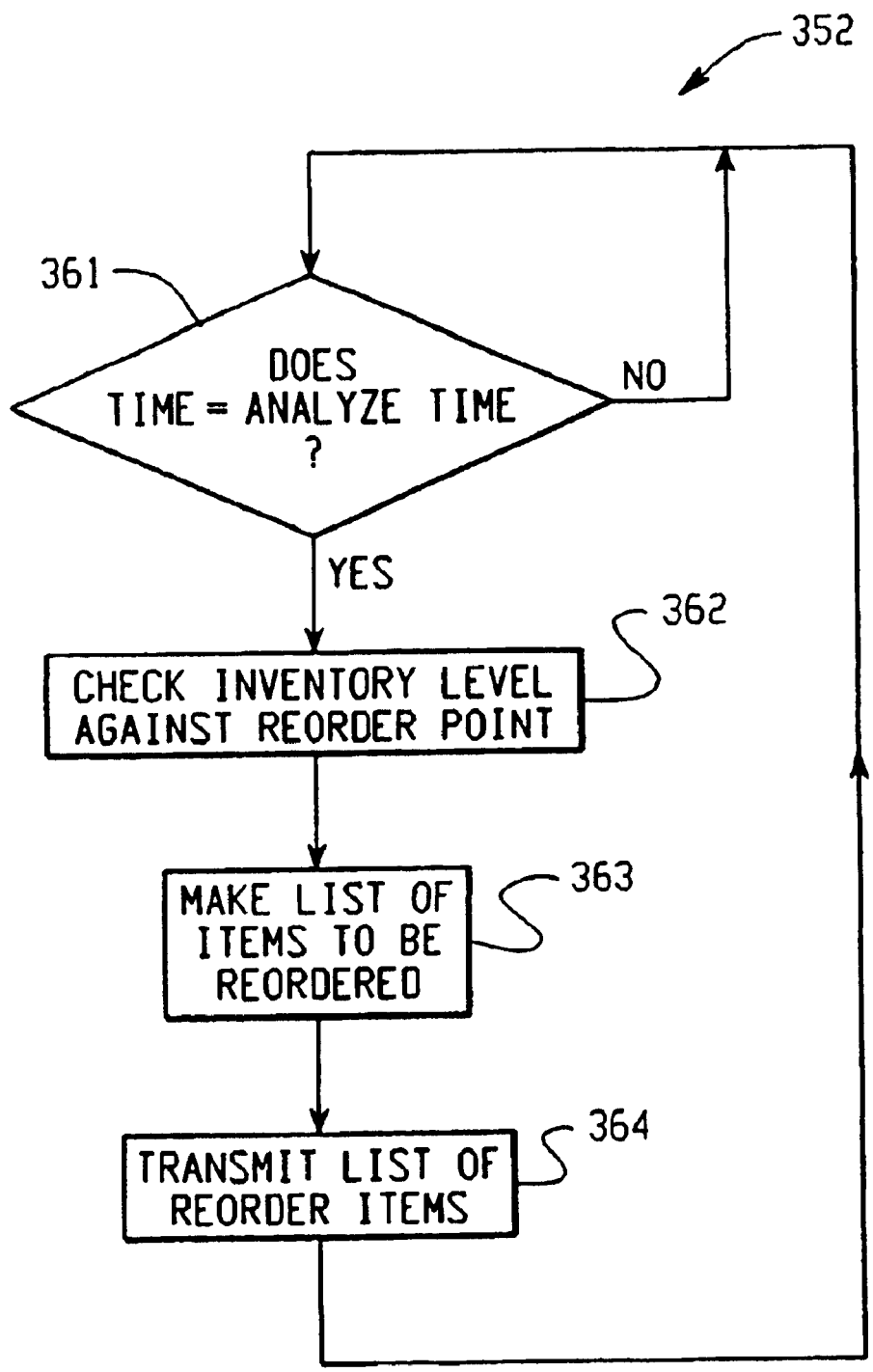
FIG. 12a is a flow chart illustrating in greater detail an exemplary method of providing the inventory control method of FIG. 11.

An exemplary method for monitoring the packaging materials (step 352 of FIG. 11) and implementing re-order control is illustrated in FIG. 12*a*. According to this method, the packaging system 10 via the CPU 50 stores a value representing an initial amount of inventory for various packaging materials in memory, representing the amount of materials available. As the various packaging materials are consumed, the CPU 50 updates a consumption list by decrementing the number associated with the item in memory. For example, if fifty (50) type-1 packaging containers are in inventory ("50" stored in a memory location associated with type-1 containers) and the packaging system 10 dictates that one of the type-1 packaging containers be utilized, the CPU 50 decrements the inventory number of type-1 packaging containers in memory to forty-nine (49). The CPU 50, then either constantly or periodically checks to see whether the updated inventory list satisfies a re-order criteria (e.g., falls below a predetermined re-order threshold) and generates a re-order request if appropriate.

At step 361, the CPU 50 determines whether it is time to analyze whether a re-order criteria is satisfied. As stated earlier, the analysis time may be constant (i.e., each time one or more packaging materials are consumed) or may be periodic (e.g., each hour, each shift, each day, etc.). If the CPU 50 determines according to programmed instructions in the memory, that it is time to analyze the inventory, the CPU 50 checks one or more inventory levels in the inventory list against a re-order point (i.e., a re-order threshold) at step 362. If none of the items on the inventory list meet or fall below their associated re-order threshold, the CPU 50 does not take any action. If, however, one or more of the re-order criteria are met, the CPU 50 makes a list of items to be re-ordered which may include specified re-order quantities at step 363 and transmits the re-order list at step 364 via, for example, the modem 91, the Internet, facsimile, etc. The re-order request may be sent directly to the operator, to inventory personnel, to a packaging materials distributor or to the packaging materials manufacturer for production planning purposes.

According to a preferred embodiment of the present invention, the CPU 50 allows for the operator to manually adjust one or more parameters within the inventory list in the event, for example, that one of the materials is inadvertently destroyed and cannot be utilized in the packaging process. In addition, the CPU 50 decrements the inventory list each time one or more packaging materials are consumed, however, the inventory monitoring may be provided in a variety of different ways that are each contemplated as falling within the scope of the present invention.

Figure 12B:
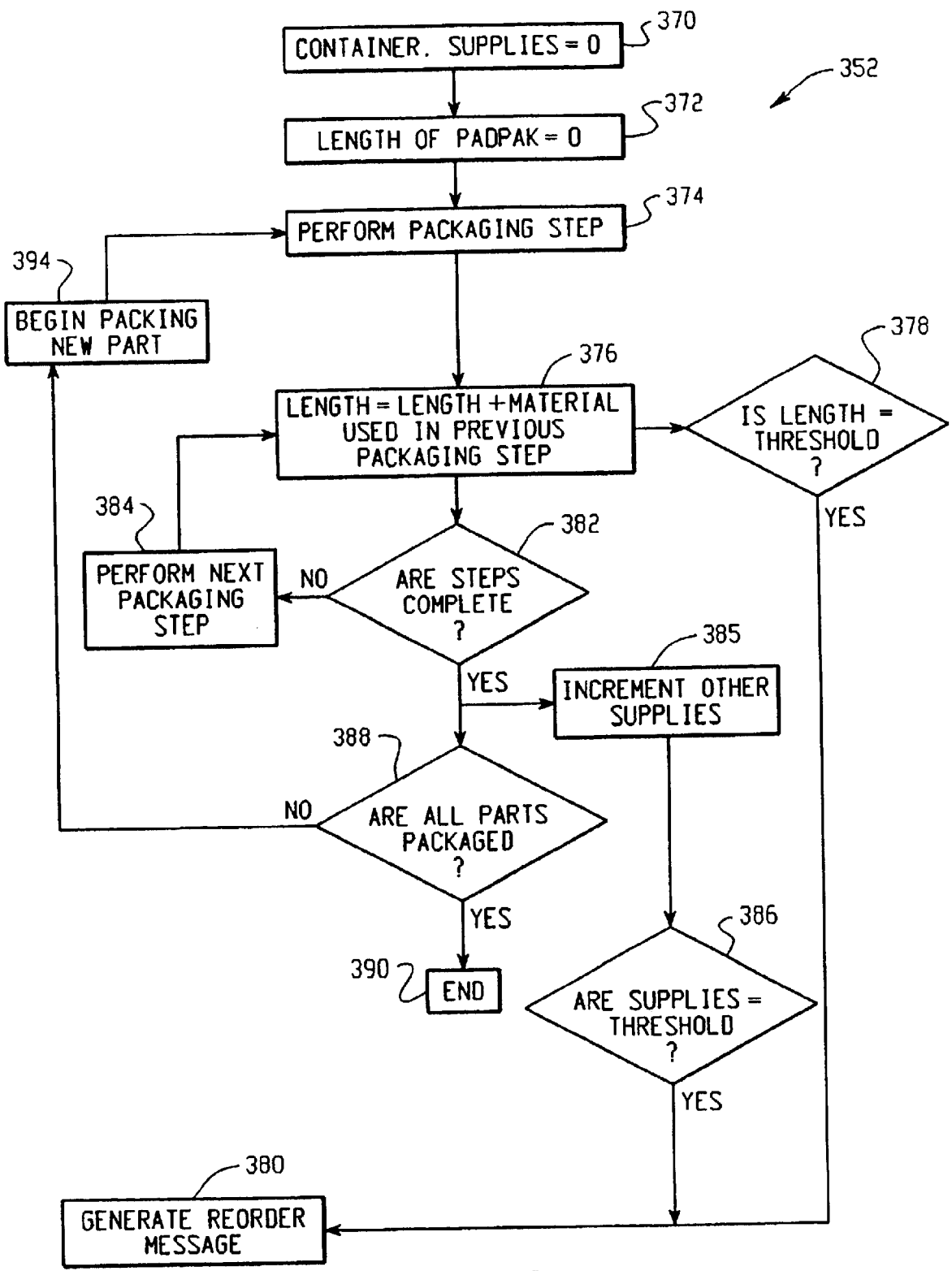
FIG. 12b is a flow chart illustrating in greater detail an exemplary method of providing the inventory control method of FIG. 11.

Another alternative, exemplary method for monitoring the packaging materials (step 352 of FIG. 11) is illustrated in greater detail in FIG. 12b. At step 370, the CPU 50 initializes the list to be updated within the memory to zero so that the number of containers as well as the various associated supplies indicate that none of the supplies have yet been consumed. Likewise, the CPU 50 at step 372 initializes the length of packaging material (e.g., cushioning conversion products such as Padpak® dunnage material) so that the updated list within the memory indicates that no packaging material has yet been consumed. At step 374, a packaging step is performed in accordance with the retrieved packaging instructions by the CPU 50. As has already been previously discussed, the packaging step includes the consumption of a particular amount of packaging material. At step 376, the CPU 50 updates the amount of packaging material consumed by taking the present amount within the memory (at this particular time equal to 0) and adds to that amount the amount of packaging material used in the packaging step. For example, if the packaging step involves the consumption of a 60" piece of cushioning conversion product, the length within the updated list would be updated to 60" at step 376. Once the length is updated at step 376, the CPU 50 compares the amount of material consumed to a re-order threshold at step 370. If the re-order threshold is met or exceeded, a re-order message is generated at step 380. Alternatively, the comparison function can be performed periodically, as may be desired.

Once the packaging step is completed, the CPU 50 at step 382 queries whether the packaging process is complete. If the packaging process is not complete (NO), the CPU 50 goes to the next packaging step at step 384 and again updates the list within the memory in accordance with the amount of packaging material used in the next packaging step. Steps 376, 378, 382 and 384 are repeated until all the packaging steps are completed. The method 352 then continues to step 385 in which the CPU 50 increments each of the supplies which were utilized in the packaging in the previous part. For example, the specified packaging container for packaging the part to be packaged is incremented so that the updated list indicates that one of the selected containers has been consumed. Likewise, the various packaging supplies such as packaging tape, warranty cards, etc. utilized in the packaging of the identified part are also updated in the list at step 385. Each time the supplies are incremented at step 385, the CPU 50, at step 386, performs a compare function in which the various supplies in the updated list within the memory are compared to predetermined re-order thresholds. If the various updated supplies do not meet or exceed the re-order thresholds, the CPU 50 does not take any additional action, and the method precedes. If, however, one or more supplies in the updated list meet or exceed an associated re-order threshold, the CPU 50 generates a re-order request message at step 380.

In addition to incrementing the supplies (step 385) after the completion of all the steps at step 382 (YES), the CPU 50 also queries at step 388 whether all the parts to be packaged have been packaged. If all the parts have been packaged (YES), the method 352 ends at step 390. If, however, it is determined by the CPU 50 that additional parts remain to be packaged (NO), the CPU 50 begins the packaging of a new part via step 394. Therefore the packaging steps for the next part to be packaging are performed and the monitoring function continues as was previously discussed. In this manner the method 352 provides an inventory monitoring and automatic re-ordering function.

Figure 13:
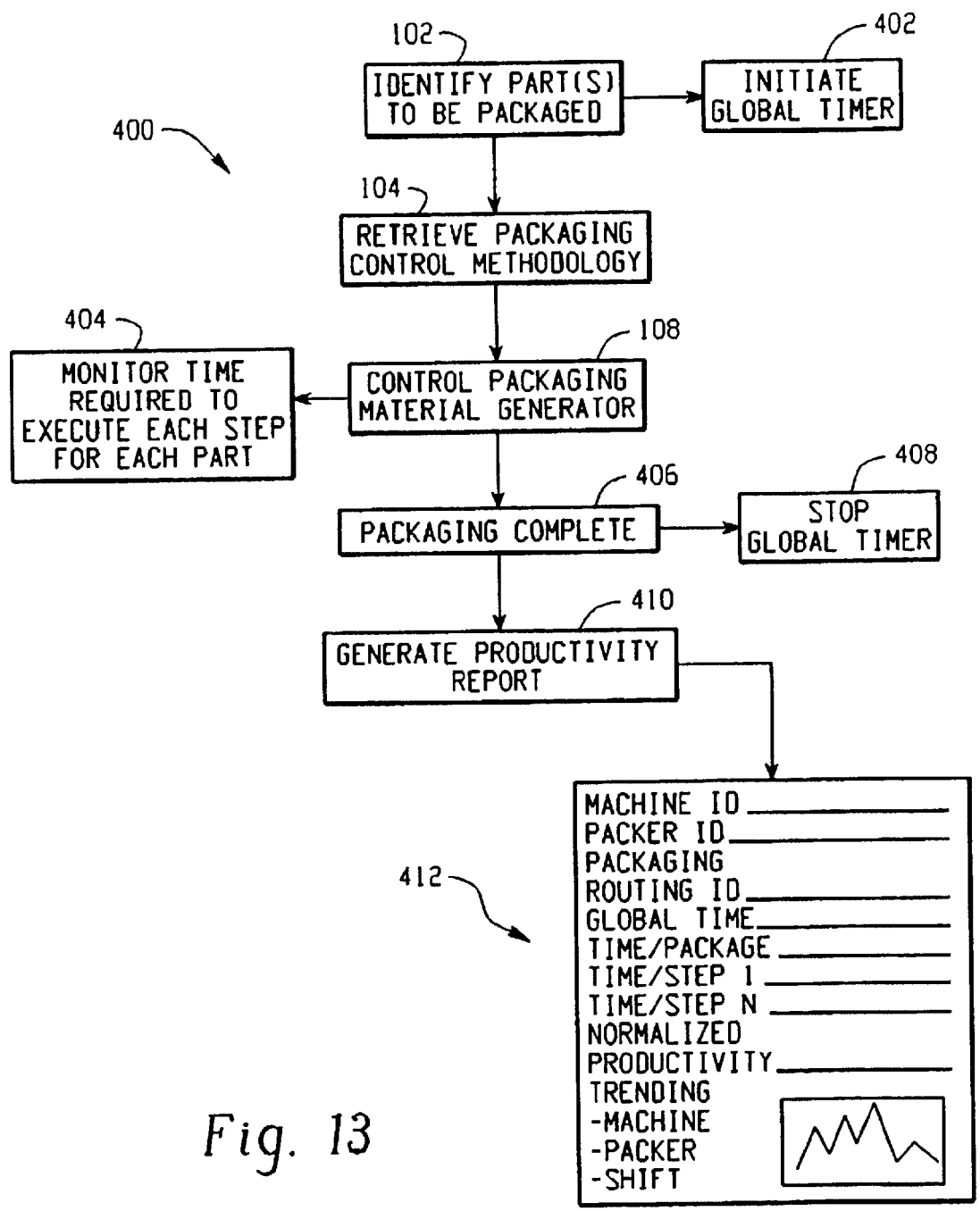
FIG. 13 is a flow chart illustrating a method for monitoring operator packaging productivity and providing a productivity report according to the present invention.

According to yet another aspect of the present invention, a packaging productivity monitoring system may also be incorporated in the packaging system of FIG. 1. A method 400 for providing such a productivity monitoring capability as illustrated in FIG. 13. As discussed previously, the packaging system 10 of the present invention identifies a part to be packaged at step 102 and retrieves a packaging control methodology via a predetermined set of packaging instructions associated with the identified part at step 104. The CPU 50 then transmits the retrieved packaging instructions to the controller 14 to provide appropriate control of the packaging material generator at step 108. As may be appreciated, the time required to package and the part consists of the time required to complete each of the necessary packaging steps. The present invention provides a timing mechanism for determining the time required to package each identified part and the time taken to execute each of the steps in the packaging process. According to the present invention, each piece of collected time data is saved in a memory associated with the CPU 50 and used to generate a productivity report for productivity analysis purposes.

In FIG. 13, when the packaging system 10 identifies a part to be packaged, the method 400 initiates, via the CPU 50, a global packaging timer at step 402, which is used to determine the amount of time required to package each part. In one embodiment of the present invention, a timer 50a associated with the CPU 50 is utilized. In addition, once the packaging instructions initiate control of the packaging material generator (step 108), the method 400 initiates via the CPU 50 one or more timers for determining the amount of time required to complete each of the steps of the predetermined packaging process for the identified part at step 404.

Once the packaging of the identified part is complete at step 406, the global timer is stopped at step 408. The global timer thus indicates the amount of time required to package a single part. After the packaging of each part is completed, the CPU 50 takes the time data for each packaging part and saves it in a memory such as the hard drive 78 of FIG. 3. In addition to the time data, the CPU 50 also records other pertinent information such as the packaging material generator identification number, an operator identifier, and a code which indicates which predetermined set of packaging instructions are associated with the time data. The CPU 50 may then utilize the saved data in generating the productivity report at step 410. Alternatively, the CPU 50 may be programmed to time-stamp and date stamp each step and further programmed to process the various time-stamps to determine the time data.

The productivity report generated at step 410 may appear as a report 412 as illustrated in FIG. 13. In generating such a report 412, the CPU 50 performs mathematical operations on some of the data in accordance with programmed instructions to generate additional productivity characteristics which are helpful in evaluating greater productivity. For example, for the packaging of a plurality of identical parts, an average global time may be calculated according to known techniques to gauge the average time it takes for a given operator to complete the packaging of a particular part. In addition, an average time for each step of the packaging process may be calculated. Therefore the report 412 allows one to analyze which packaging steps need to be addressed to best improve the packaging productivity. Lastly, the productivity data may be used for the documentation of various processes and procedures such as ISO 9001 certification, etc.

In addition, the collected time can be normalized in several ways. For example, the time data may be normalized with respect to the particular packaging process uniquely associated with the identified part to allow for productivity comparisons across various packaging processes. Using such data one can focus on the particular packaging processes that need the most improvement. Also, the time data may be normalized across all the various operators to allow for direct comparisons between various operators who perform different packaging processes. In such a normalization, for example, a 1.0 would indicate an average packaging productivity while numbers greater than 1.0 would indicate a productivity less than average and numbers less than 1.0 would indicate a productivity greater than average.

Lastly, the collected time data may be dated and used to generate productivity trending information to monitor changes in packaging productivity over time. Although the above example discussed various steps within the process which may be measured with regard to time, the present invention also contemplates measuring various other characteristics which may be associated with productivity. Each such characteristic is contemplated as falling within the scope of the present invention. In addition, while several exemplary mathematical operations are disclosed (and performed by the CPU 50) to generate productivity characteristics, it is understood that other types of statistical techniques and mathematical operations may also be employed to provide other types of productivity measurement criteria. Each such form of productivity measurement and data manipulation are contemplated as falling within the scope of the present invention.

Figure 14:
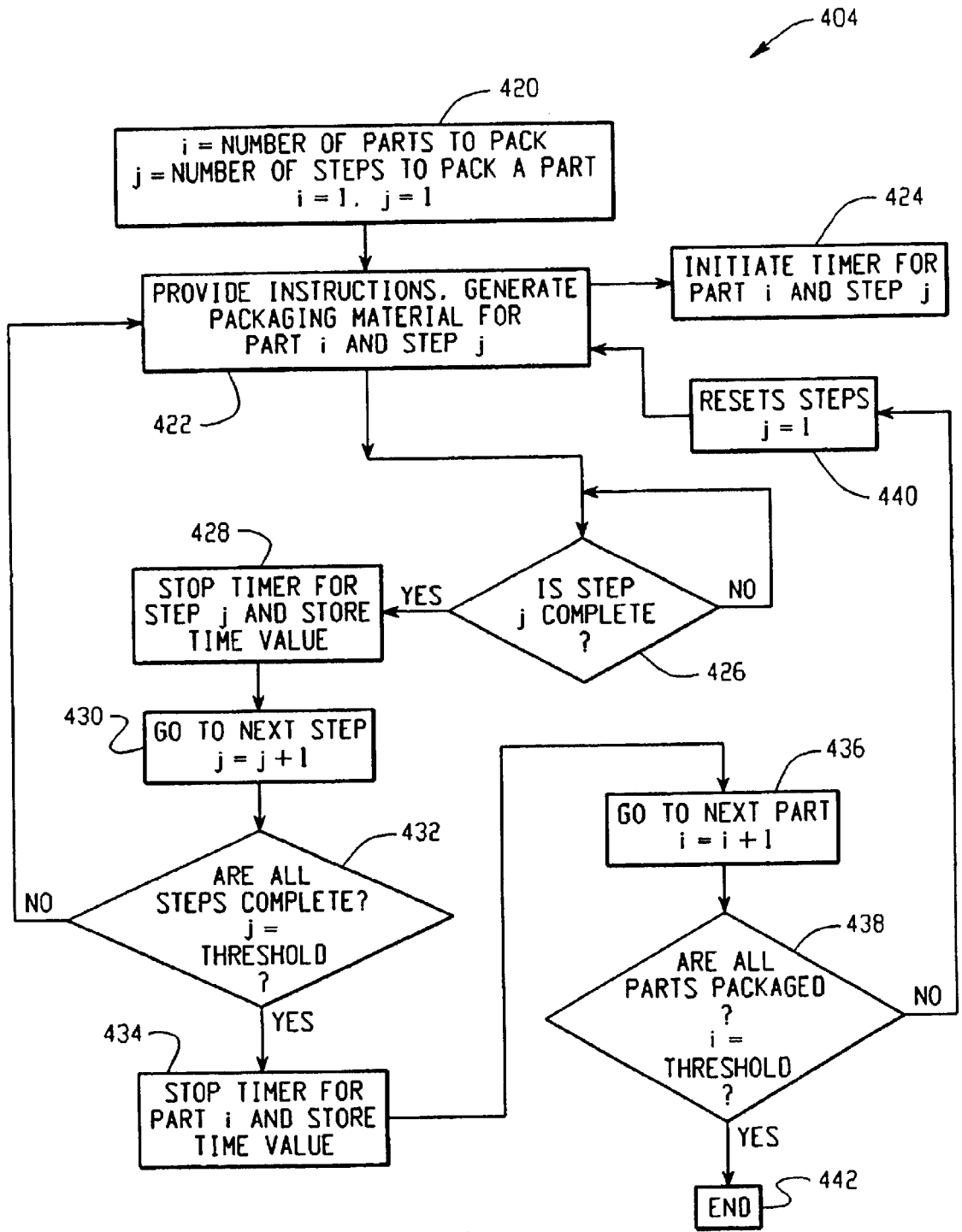
FIG. 14 is a flow chart illustrating in greater detail an exemplary method of monitoring productivity and generating the productivity report of FIG. 13.

An exemplary method by which the packaging system 10 may monitor the time required to execute each step for each part of the packaging process (step 404 of FIG. 13) is illustrated in greater detail in FIG. 14. Once the CPU 50 has retrieved the packaging instructions associated with the identified part at step 104 of FIG. 13, the CPU 50 initializes two counting variables ("i" which represents the number of parts which need to be packaged and "j" which represents the number of steps required to package each part) at step 420. At step 422, the CPU 50 transmits the retrieved packaging instructions to the controller 14 of the packaging material generator 12 which begins generating the packaging material for the first part (i=1) using the first step in that packaging process (j=1). As the first step is initiated, the CPU 50 initiates a timer at step 424 for part i=1 and step j=1. The CPU 50 then monitors whether the first step (step j=1) is complete at step 426.

When it is indicated that the first step (step j=1) is complete, (YES) the CPU 50 stops the timer which is measuring the time duration of the first step (step j=1) at step 428 and store the time value in memory. The controller 14 of the packaging material generator 12 then continues to the next packaging step at step 430 (j=j+1; j=2). The CPU 50 then inquires at step 432 whether all the steps of the packaging process are complete by comparing the incremented variable j (in this case, j=2) to a threshold value which when met indicates the maximum number of steps in the particular packaging process has been exceeded. If all the steps are not complete, the variable j will not be equal to the threshold value, and the method 404 will return to step 422 and the controller will generate packaging material for the second step (j=2) of the first part (i=1). Likewise, steps 424, 426, 428, 430 and 432 will continue until all the steps in the packaging of the first part are completed (YES at step 432), at which point the CPU 50 stops the timer which measures the total time required to package the part at step 434. The data regarding the amount of time required to package the first part is then stored in the appropriate memory for later analysis. The controller 14 then continues to the packaging of the next part at step 436 (i=i+1; i=2) and the CPU 50 inquires at step 438 whether all the parts to be packaged have been completed (i.e., whether i is equal to a threshold). If all the parts to be packaged are not completed (NO) the method 404 continues to step 440, wherein the CPU 50 resets the step counter variable j back to j=1 and begins the timing process for a second part at step 422, wherein i=2 and j=1.

The timing of the various steps for the second part (i=2) then continues with steps 424–432. After the times are measured for the various steps of part i=2, steps 434 through 438 are again repeated until all of the parts to be packaged are complete (i=the threshold value at step 438) and the method 404 ends at step 442. The CPU 50 then takes all the data which has been saved for each step j and each part i and saves the data in the appropriate memory for use in generating the productivity report at step 410 which may have a display output similar to the report 412 of FIG. 13.

As discussed above in conjunction with FIGS. 1–14, the packaging system 10 of the present invention provides for the efficient, optimized packaging of various parts by identifying a part to be packaged, retrieving predetermined packaging instructions associated with the identified package and using the retrieved packaging instructions to provide control of the packaging material generator and provide graphical/textual packaging instructions to the operator via a display.

Yet another embodiment in which such functionality may be provided is discussed below in conjunction with FIGS. 15a–15d. The operation of the packaging system 10 generally, and specifically the functions executed by the packaging system controller 16, is described below in detail with reference to the flow charts illustrated in the FIGS. 15a–15d.

Initially, during execution of the programmed instructions within the packaging system controller 16, a display is provided on the output peripheral 18 such as a CRT monitor in step 500, prompting the operator to identify the part to be packaged, such as by providing a part number as well as a number of such parts to be packaged. (As used herein, solid lines in the flow chart represent generally the flow of the program steps and dashed lines indicate the flow of data or messages. Moreover, while the program flow is represented as linear or serial for the purposes of description simplicity, it is recognized that the program is preferably executed in an event driven manner with steps being executed in a time-slice fashion.)

Upon initialization of program operation, a database 501 of the part and the corresponding packaging information is made accessible at step 502, part information is provided to the program in an accessible format 504 and initialization of flags, pointers, counters and/or other program control variables is performed in step 506. The operator can then indicate to the packaging system 10 the part number of the part or parts to be packaged and the number of parts to be packaged at step 508. Based on the identification of the part to be packaged, the program will retrieve from the information for a packaging process from the database 501 and provide to the operator, as a confirmation, a description of the part which the operator identified for packaging at step 510. A description may be in the form of the name of the part or preferably an image of the part to be packaged. The operator then confirms that the program has identified the correct part to be packaged at step 512 and the program begins the process of producing pads (in the case where the packaging material generator is a cushioning conversion machine) and instructing the operator in the proper or recommended packaging the part.

Figure 15A:
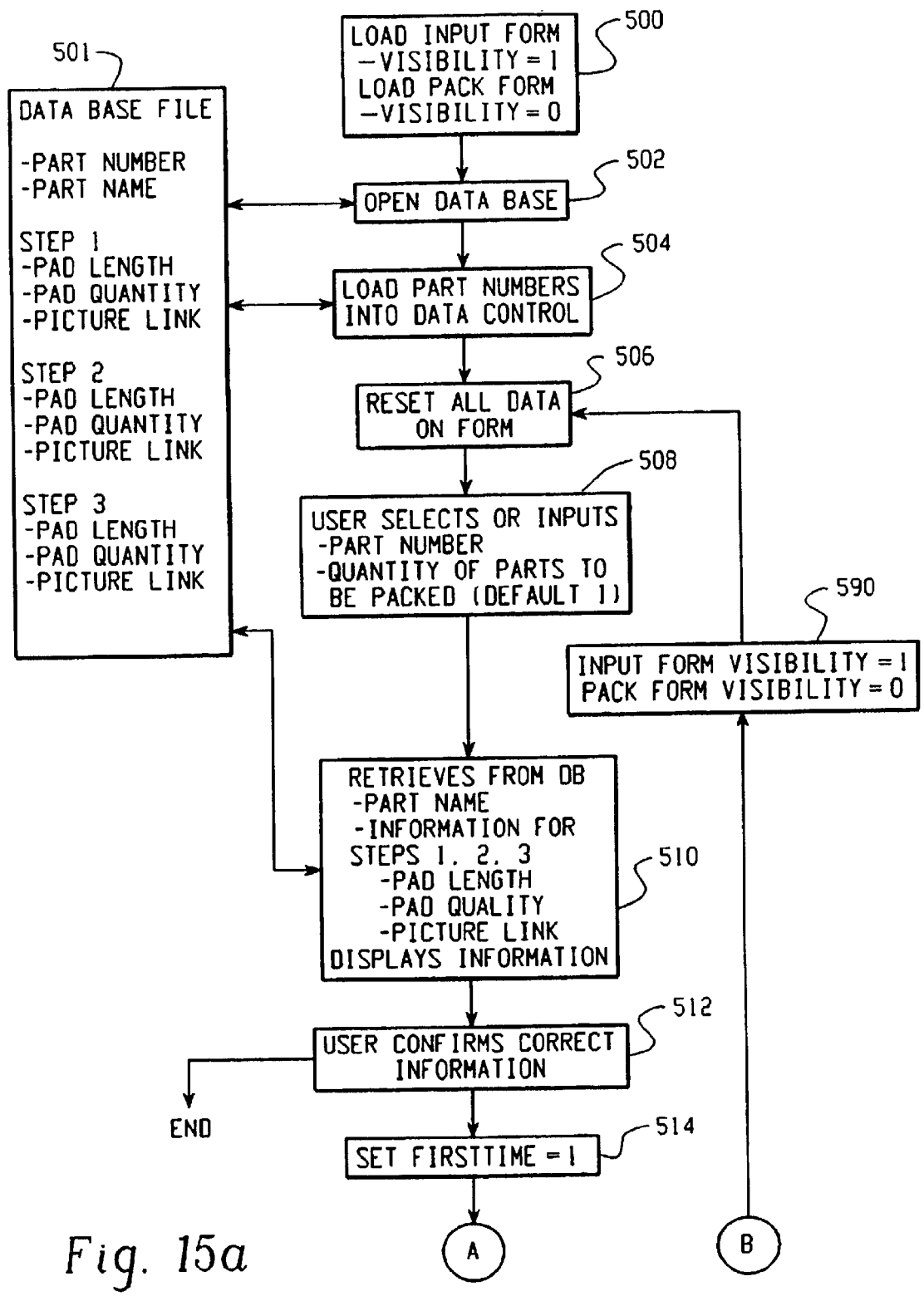
FIGS. 15a–15d are flow charts illustrating in detail the operation of the packaging system of FIG. 2 according to one embodiment of the present invention.
Figure 15B:
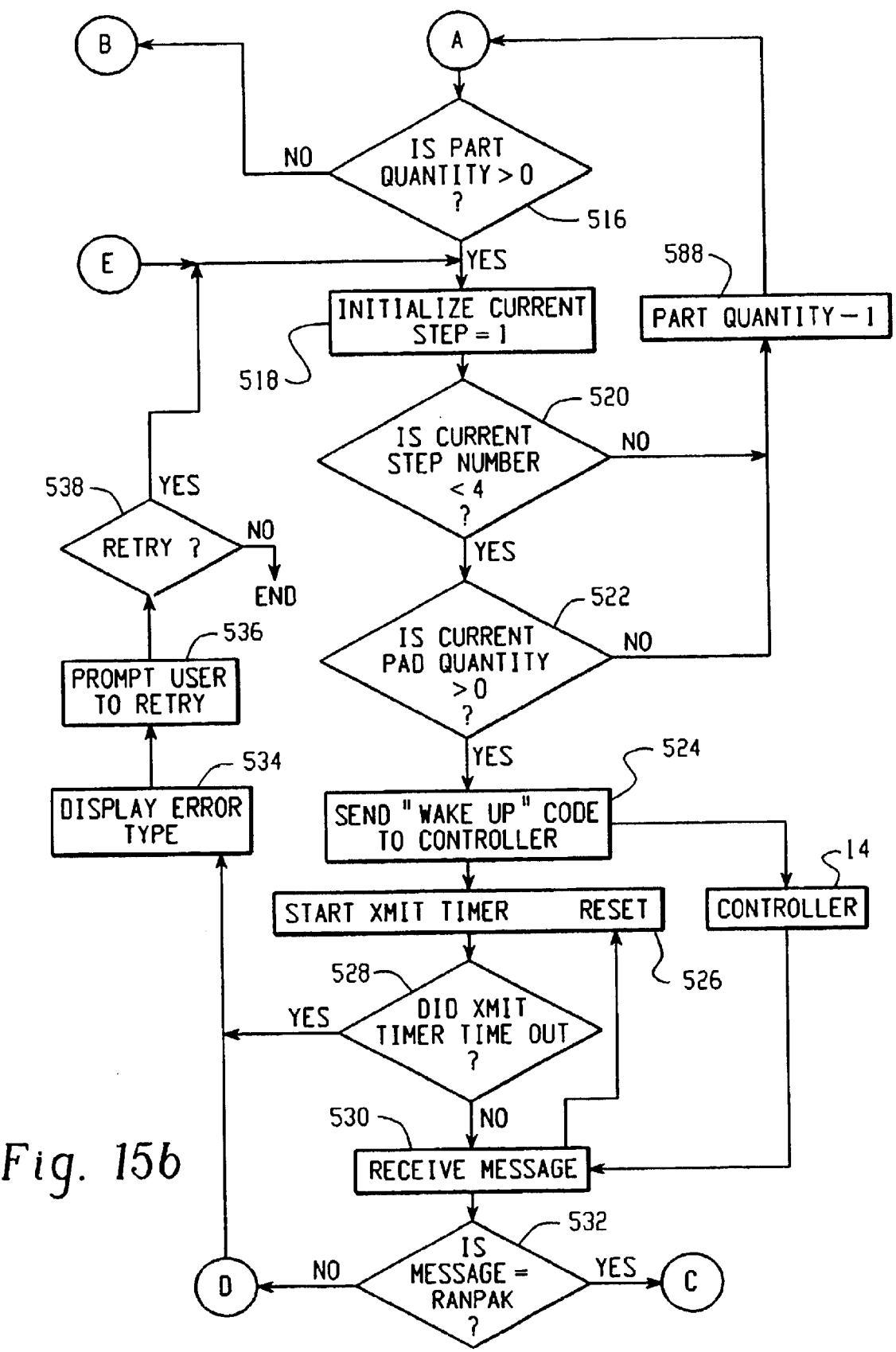

First, a monitor flag is set to one (1) to indicate that the display on the monitor 18 has not been then updated to reflect the beginning of the packaging sequence at step 514. The program then checks, as shown in FIG. 15b, that the required number of parts have not yet been packaged at step 516. Assuming that the required number of parts have not yet been packaged, and, as in this example, this is the first time through the program, the program will initialize the current step counter equal to one at step 518, meaning that the correct number of pads of the correct lengths are to be produced for the first step in the process of packaging the identified part. The number of steps having been executed in the packaging process is then examined at step 520 and if the current step is less than 4 (for a part packaging process having three packaging steps) and the quantity of pads to be produced is greater than 0 at step 522, a wake-up code is provided to the machine controller 14 at step 524.

The purpose of the wake-up code is to inform the machine controller 14 to begin looking for the appropriate instructions from the packaging system controller 16. Previous to receiving the wake-up code, the machine controller 14 will ignore any codes, such as those randomly generated by noise in the input port of the machine controller 14 so as not to take any unintended action in the event that noise on the line would match one of the instructional codes to the machine controller at step 524. Once the wake-up code has been sent to the machine controller at step 524, a timed handshake function is implemented through steps 526 to 532 which ensures that the packaging system controller 16 and the machine controller 14 are communicating correctly.

The handshake function includes starting a timer at step 526, waiting to receive a message at step 530 from the machine controller 14 and checking any received message to determine whether the received message is the intended message, for example, the word "Ranpak" at step 532. In the event the message is not received from the machine controller 14 within the appropriate time, the timer will time out at step 528, an error code will be displayed at step 534 and the packaging controller 16 will inquire to the operator whether it should try to reestablish communication with the machine controller 14 at steps 536 and 538. If the operator does not reestablish control of the machine controller 14, the program is terminated, otherwise the program will cycle again starting with step 520.

Figure 15C:
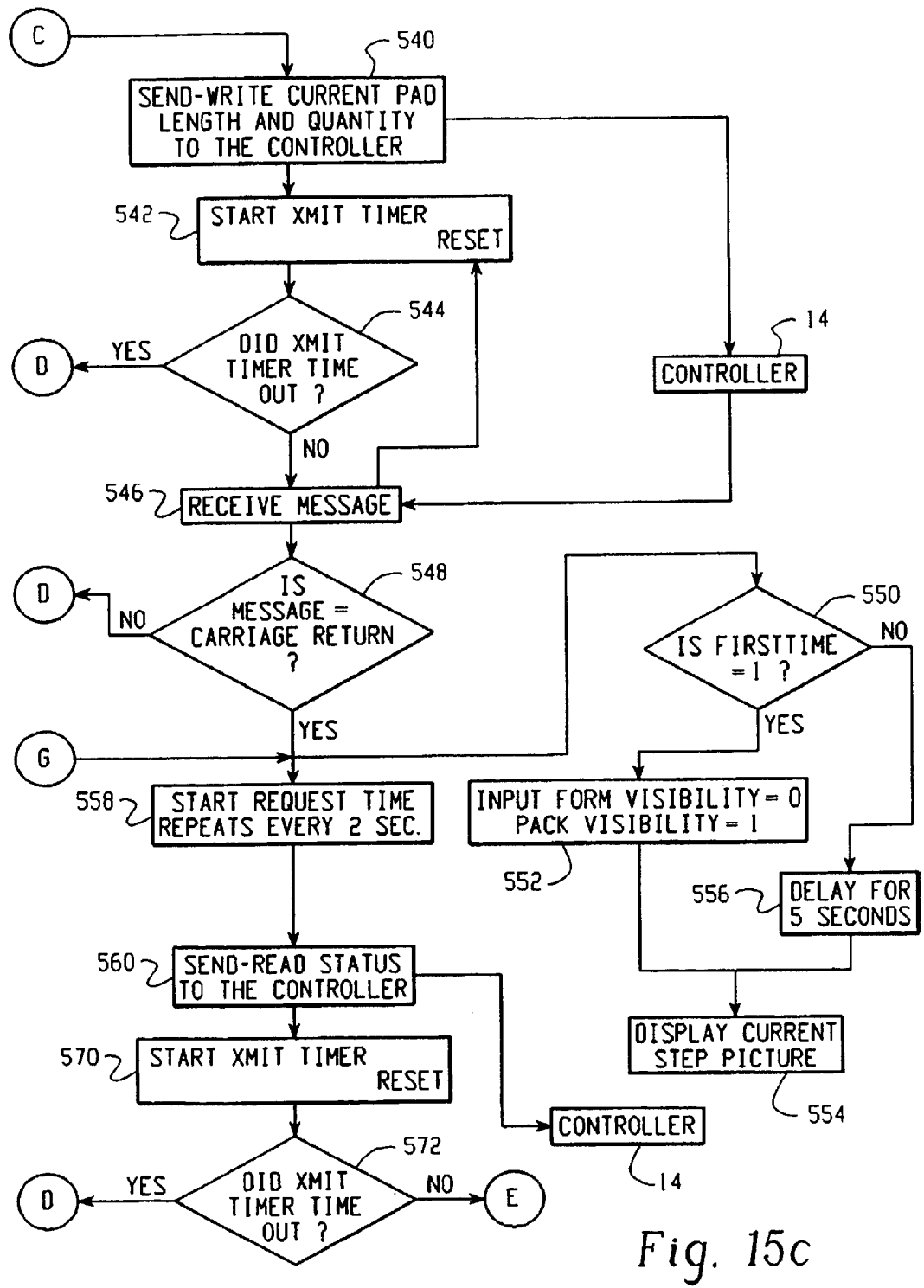
Figure 15D:
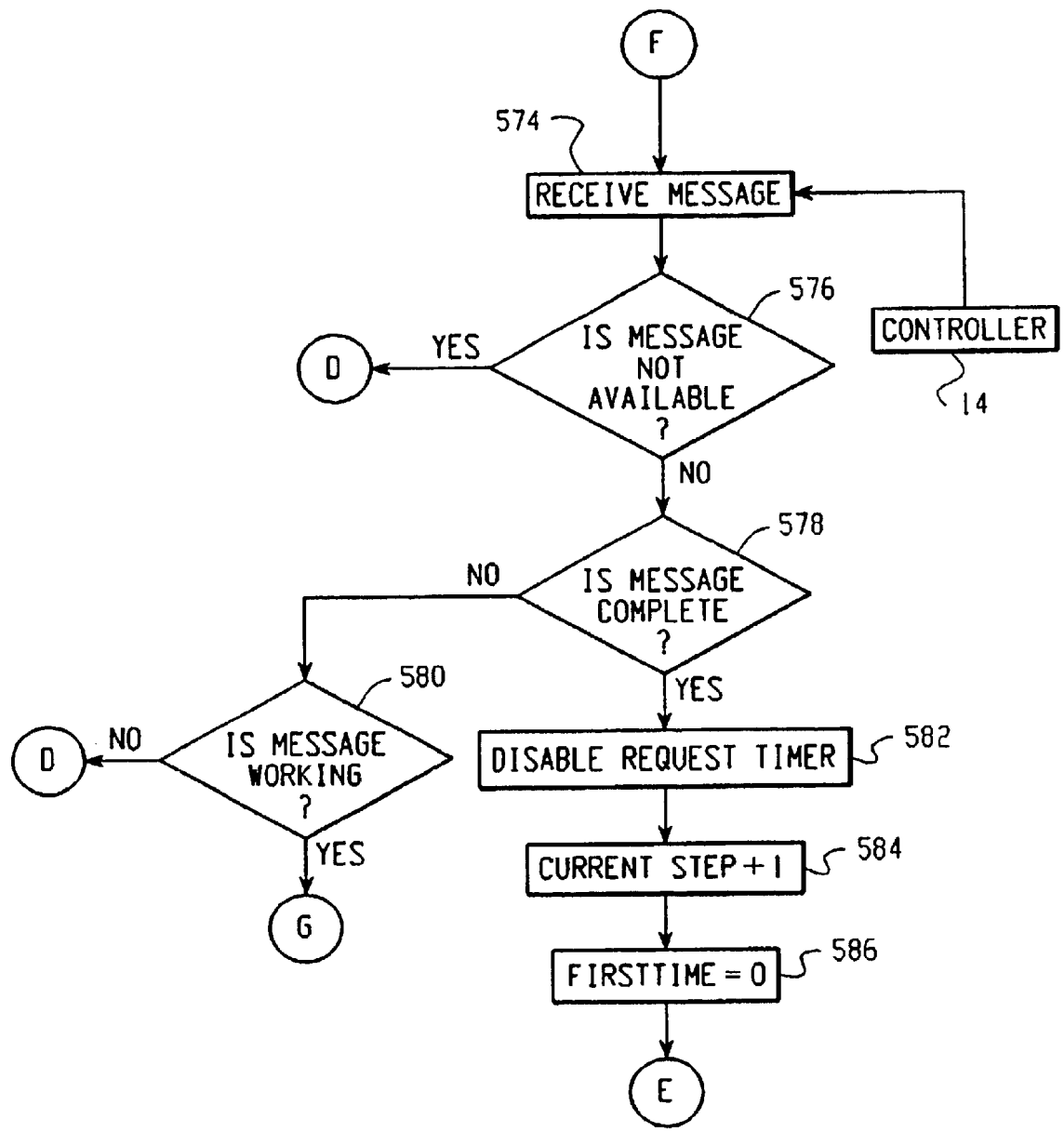

Assuming that a message was received from the machine controller 14 at steps 530 and 532 before the timer timed out and the message was the appropriate message, the packaging system controller 16 will instruct the machine controller 14 as to the number of pads to be produced and their order of generation (step 540 of FIG. 15c). Alternatively, instead of providing the pad length and the number of pads to be produced to the machine controller 14 in one step, the section of program code can be executed through a loop in which the machine controller 14 is instructed to produce one pad of the appropriate length as many times as needed to produce the correct number of pads. Communication between the packaging system controller 16 and the machine controller 14 is again coordinated through a timed handshake function through steps 542 through 548, similar to the handshake function described above relative to steps 524 through 532 to confirm that the machine controller 14 received the length and the number of pads to be produced.

Accordingly, after the machine controller 14 has been instructed to produce a pad of the appropriate length at step 540, a timer is started at step 542 and the program will monitor whether a message is received at step 546 before the timer times out at step 544. If a message is received, the message will be checked to determine whether it was the intended message. In this case, the intended message may be a carriage return 548, for example. If the timer timed out before a message was received or the incorrect message was received, an error code will be displayed at step 534 of FIG. 15b and the operator will be prompted as to whether the packaging system controller 16 should attempt to re-establish communication with the machine controller 14 at step 536.

Assuming the appropriate message was received from the machine controller 14, and the packaging system controller 16 is executing the first packaging step for the part to be packaged at step 550, the appropriate display will be presented on the monitor 18 at step 552 and a picture of the part being packaged according to the first step will be displayed at step 554. If this is not the first time in the program for this part to be packaged (NO at step 550), a five second delay is instituted at step 556 before the picture of the part being packaged in accordance with the next step in the packaging process is displayed at step 554. The purpose of this five second delay is so that the operator has time to examine the display of the first step in packaging the part before the display is replaced by the display corresponding to the second step of packaging the part.

Concurrently with displaying the picture of the part being packaged, the packaging system controller 16 will begin requesting the machine controller 14 at a set time interval to provide it with the status of producing the requested pad or pads (steps 558, 560) and again begin the timed handshake function (steps 570–76), as discussed above. If the message has been received from the machine controller 14, the message is examined to determine if an error has occurred in producing the pad at steps 578 and 580 of FIG. 15d. If no error has occurred, the message will either indicate that the cushioning conversion machine is still in the process of producing a pad or pads (steps 578 and 580), and the packaging system controller 16 will again inquire as to the status of the pad production (steps 558–576) until it has been determined that the required pads have been produced. The timer is then disabled at step 582 and the packaging system controller 16 will continue to the next step in the packaging process by incrementing the packaging step counter at step 584 and setting the display flag to indicate that a picture of the part being packaged is currently being displayed at step 586. The machine controller 14 will then begin the process of producing the pads for the next packaging step in providing the packaging recommendation to the operator (steps 520–586).

If the three packaging steps have been completed for the identified part, as indicated by the step counter being equal to 4 at step 520 of FIG. 15b, the part quantity counter is decremented at step 588 and the packaging system controller 16 will determine whether all of the same parts have been packaged or not (step 516). If not, the machine controller 14 will again produce the necessary pads and instruct the operator with recommendations. If all like parts have been packaged, the display on the output peripheral 18 is returned to the display prompting the operator for an indication of the next part type to be packaged (step 590, FIG. 15a) and the process is repeated for the next part.

In the first embodiment of the present invention, the packaging system is utilized in conjunction with one or more known parts. A predetermined set of packaging instructions is associated with each of the part numbers or identifiers and is retrieved from a memory in response to the notification of the part to be packaged. In another embodiment of the present invention, a packaging system is disclosed in which the part to be packaged is unknown. In this context, an unknown part means that the part, along with predetermined packaging instructions associated with the part, do not reside within an associated memory. Instead, the packaging system, according to the alternative embodiment of the present invention, identifies one or more characteristics of the part to be packaged and uses the identified characteristics to determine (rather than retrieve) an optimized packaging methodology for packaging the part. According to the alternative embodiment of the present invention, an operator who does not possess packaging experience can employ an optimized packaging of the part which insures the prevention of packaging damage while simultaneously avoiding the use of excess packaging material, thus minimizing the packaging costs for a given part.

In accordance with another aspect of the present invention, once the optimized packaging methodology is determined, a packaging preview is provided on an output peripheral such as a display. The packaging preview allows the operator (i.e., a user or customer) to view the determined packaging process to verify that the determined packaging methodology is appropriate. In addition, once the optimized packaging methodology is determined, the packaging system displays the costs associated with both the packaging and the shipping of the part and allows the operator to accept the packaging and shipping costs or alternatively discontinue the process.

In yet another aspect of the present invention, the packaging system provides packaging instructions associated with the determined optimized packaging methodology to both the packaging material generator and the operator via an output peripheral. The packaging instructions are used to generate an appropriate amount of packaging material in a specified sequence for use in packaging the part. Concurrently, the packaging instructions are used to provide step by step explanatory instructions to the operator, preferably via a display, in a graphical and textual format. The explanatory instructions illustrate how to properly utilize the generated packaging material in securing the part in the properly identified container, thereby insuring that the part is properly packaged in accordance with the determined optimized packaging process.

According to one aspect of the present invention, the packaging system controller which determines an optimized packaging methodology includes an expert system. The expert system includes a knowledge base which consists of a plurality of rules and data related to packaging which are applied to data supplied by the operator which relate to the part to be packaged to form a conclusion (i.e., the optimized packaging methodology). Preferably, the rules consist of "if-then" rules, although alternative rule schemes such as the use of "frames" may be used instead of, or in conjunction with, the "if-then" rules to generate conclusions using both internal data and the one or more characteristics associated with the part. Such characteristics may include, but are not limited to, the following: the size, shape, weight and fragility of the part, the method of shipping and a preference of whether the packaging methodology is to be optimized with respect to packaging or cost.

According to still another aspect of the present invention, the packaging system includes an inventory monitoring system which maintains a list of packaging materials. As various packaging materials are utilized in accordance with the determined packaging methodology for various parts, the inventory monitoring system updates the inventory list and compares the updated amounts to one or more re-order thresholds. If any of the re-order threshold conditions are satisfied (e.g., equal to less than a threshold or alternatively greater than or equal to a threshold), the packaging system automatically generates a re-order request to prevent the packaging material inventory from becoming unduly depleted.

Figure 16A:
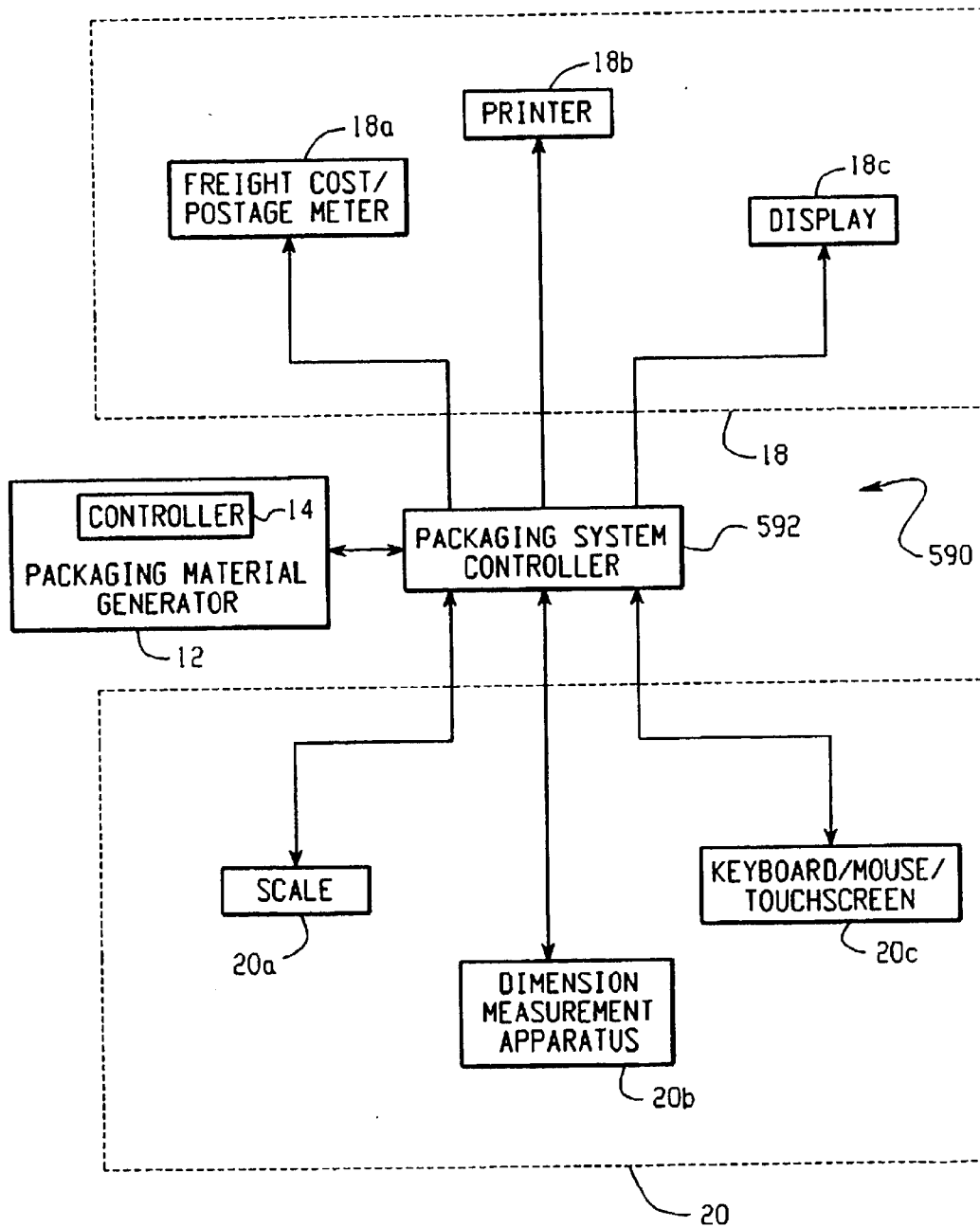
FIG. 16a is a block diagram illustrating a packaging system according to an alternative embodiment to the present invention.

A packaging system 590 according to the alternative embodiment of the present invention is illustrated in FIG. 16a. The packaging system 590 includes a packaging system controller 592 which is coupled to the packaging material generator 12, which in the preferred embodiment of the present invention is a cushioning conversion machine, as illustrated in FIG. 2. An output peripheral 18 is coupled to the packaging system controller 592. The output peripheral 18 may include one or more components and preferably includes a freight cost or postage meter 18a for generating the proper shipping cost or postage in response to the identified shipping destination and the weight of the shipment (including the part, the packaging container and the packaging material). In addition, the output peripheral 18 preferably includes a printer 18b for printing a mailing label in accordance with instructions provided by the operator. Lastly, the input peripheral also preferably includes a display 18c such as a CRT for providing step by step graphical and textual instructions in parallel with the generation of the packaging material to aid in the proper packaging of the part.

The packaging system 590 of FIG. 16a also includes an input peripheral 20 which is coupled to the packaging system controller 592. The input peripheral 20 may include one or more components and preferably includes a scale 20a for measuring the weight of the article or part to be packaged. In addition, a dimension measurement apparatus 20b is preferably included to identify the size and shape of the part to be packaged. The dimension measurement apparatus 20b may be a simple device such as a ruler which measures the part's height, length and width, respectively. Since many parts, however, have more detailed three-dimensional shapes than a cube, a more complex dimension measurement apparatus 20b may be utilized. For example, the apparatus 20b may include one or more robotic arms which contact a plurality of parts about the part and record the locations of the various contact parts in three-dimensional space (x, y, z). The apparatus 20b, in conjunction with the CPU 50 of the packaging system controller 592 (or using its own processor) identifies the shape and size of the part. In yet another alternative, the dimension measurement apparatus 20b may include a Cubiscan™ measuring system provided by Quantronix, P.O. Box 929, Farmington, Utah 84025, U.S.A.

The input peripheral 20 may also include a keyboard/mouse type input device 20c or touch screen type display, as is commonly used with personal computers or a microphone. The keyboard and mouse may be used to input various characteristics of the part to be packaged and/or may be used to access various pull-down menus to identify the part or indicate items within a database which are similar to the part. In addition, the keyboard/mouse 20c may be used to identify the shipping destination, method of shipment (e.g., truck, ship, air or rail) and other types of shipping and/or packaging preferences. Collectively, the scale 20a, the dimension measurement apparatus 20b and the keyboard/mouse 20c collect various pieces of data which serve to characterize the part; the pieces of data including, for example, the weight, size, shape and fragility.

Figure 16B:
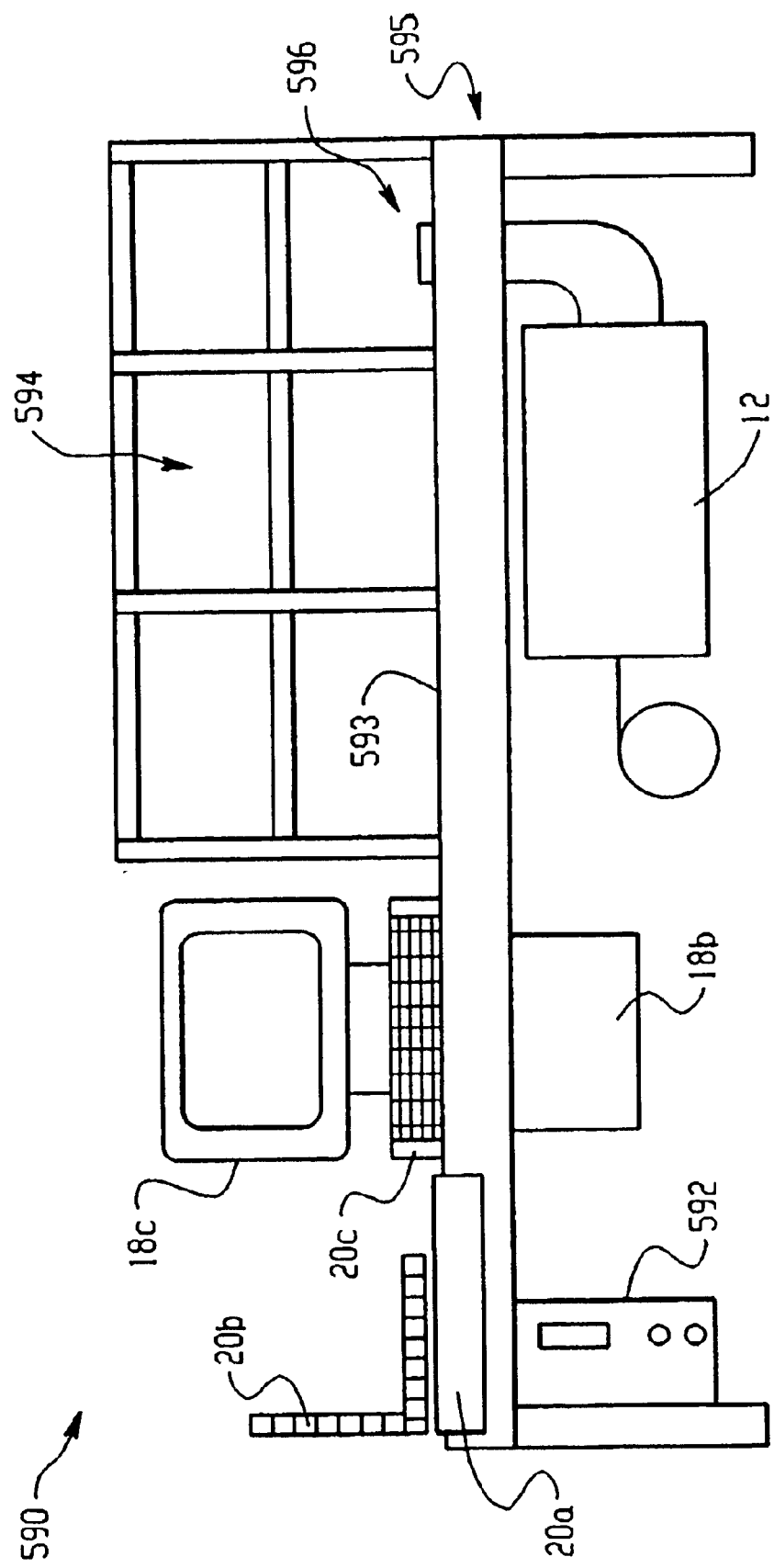
FIG. 16b is an idealized side view of the packaging system according to the present invention.

FIG. 16b is an idealized side view of the packaging system 590 of FIG. 16a. the packaging system 590 includes a Windows personal computer as the packaging system controller 592 which underlies a desktop work area 593 for packaging. Also under the work area 593 is the printer 18b and the cushioning conversion machine 12. On top of the work area 593 is the scale 20a, the dimension measurement apparatus 20b, the display 18c and the keyboard/mouse 20c. Also on the work areas 593 are a series of labeled bins 594 for housing a variety of packaging containers or boxes (not shown). At one end 595 of the work areas 593, is an exit chute 596 for the cushioning pads which are produced by the cushioning conversion machine 12.

Figure 17:
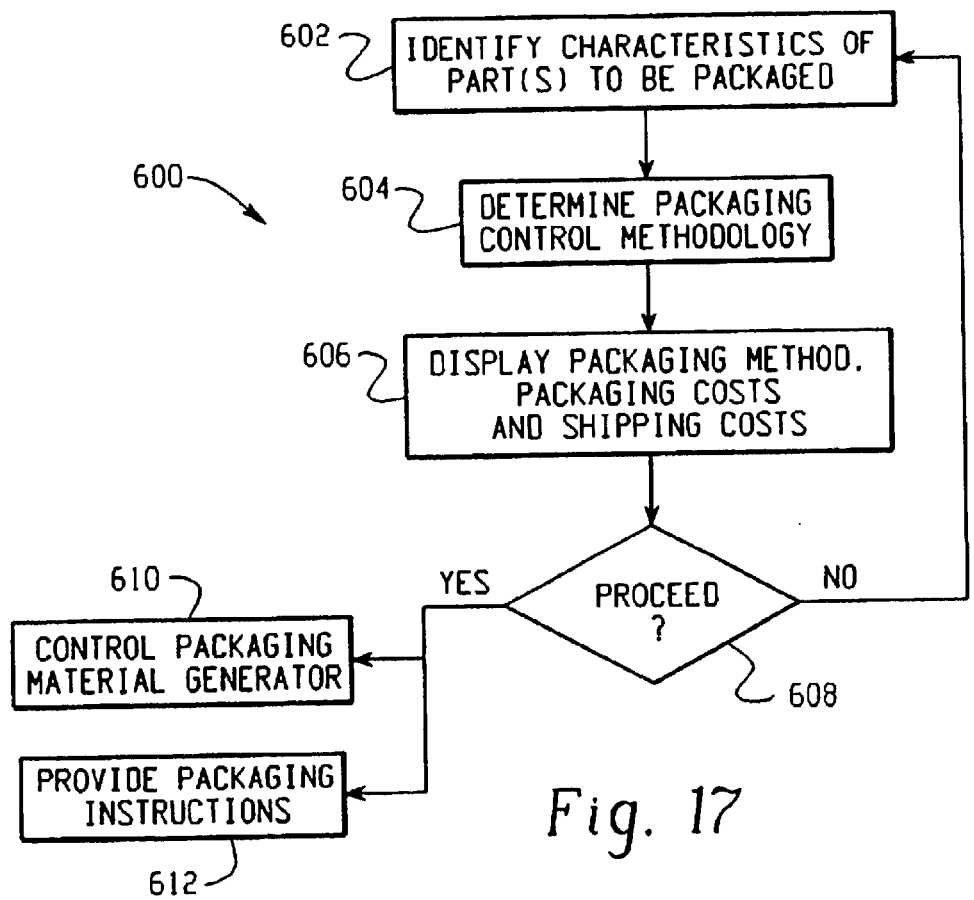
FIG. 17 is a flow chart illustrating an operational flow diagram of the packaging system according to an alternative embodiment of the present invention.

A method 600 for packaging an unknown part using, for example, the packaging system 590 of FIGS. 16a and 16b is illustrated in the flow chart diagram of FIG. 17. The method 600 begins with the step of identifying a part to be packaged at step 602. Although the word "identifying" is used to describe step 602, it should be understood that the method 600 contemplates a broad function of ascertaining one or more characteristics that characterize the part to be packaged while not necessarily identifying the part itself. Therefore, although the step 602 may in some instances be able to gather enough data to fully identify the part to be packaged, in many instances a full identification of the part will not be made, and instead the packaging methodology will be determined based on the several pieces of data which characterize the part such as the weight, size, shape and fragility.

Once the part is identified at step 602, the method 600 proceeds to step 604, wherein the packaging system controller 592 takes the data collected at step 602 and uses it to determine an optimized packaging methodology. As will be discussed in greater detail infra, the packaging system controller 592 preferably determines the optimized packaging methodology using an expert system. Alternatively, however, fuzzy logic, binary decision trees and neural networks may be utilized in the packaging determination process, and each are contemplated as falling within the scope of the present invention.

After the packaging methodology is determined at step 604, the packaging methodology is displayed along with its associated packaging and shipping costs at step 606. Step 606 is similar to steps 112 and 114 in FIG. 5 (see also FIG. 6a) since the packaging methodology may be previewed by the operator. Although the determination process of step 604 is preferably performed using an expert system, such processes are limited in that rules may not exist for every situation which may cause an incorrect conclusion. In addition, if some of the data is provided via the input peripheral 20 incorrectly, the packaging system 590 may base its conclusion on the wrong data. The packaging methodology display step 606 therefore allows the operator to provide a "sanity check" to insure that the packaging method which has been determined is correct prior to the generation of any packaging material.

In addition, the packaging system controller 592, upon determining the packaging method at step 604, calculates the packaging costs by adding together the cost of the selected container, the cost of generating the appropriate amount of packaging material and the cost of various other supplies such as packaging tape. The packaging system controller 592 also utilizes the shipping destination, the combined weight of the part and the shipping materials, and the method of shipment to calculate the shipping costs. Upon a display of the packaging costs and the shipping costs on the display 18c, the operator has the opportunity to proceed at 608 if the operator determines the costs to be acceptable. Alternatively, the operator may choose to end the process or begin again at step 608.

If the operator chooses to proceed with the packaging of the part in accordance with the determined optimized packaging methodology at step 608, the packaging system controller 592 (via the CPU 50) then sends packaging instructions which are associated with the determined packaging methodology to the cushioning conversion machine 12 at step 610 and to the output peripheral 18 at step 612. The packaging instructions sent to the cushioning conversion machine 12 at step 610 are control signals which dictate the number of cushioning pads to produce, their respective lengths and their order of manufacture, similar to the description provided earlier in conjunction with FIG. 7. Likewise, the packaging instructions sent by the packaging system controller 592 via the CPU 50 to the output peripheral 18 are control signals that automatically generate the proper amount of postage via the postage meter 18a, generate a shipping label with the appropriate address via the printer 18b and provide step by step packaging instructions on the display 18c. The packaging instructions on the display 18c preferably include graphical representations which illustrate how to utilize the generated packaging material to properly secure the part within the specified container. In addition, textual explanations are also preferably included to further aid in the proper packaging of the part. Lastly, the packaging system controller 16 via the CPU 50 may notify a shipper via a communications link (e.g., the modem 91 or the network interface 90) to pick up the packaged item.

Figure 18:
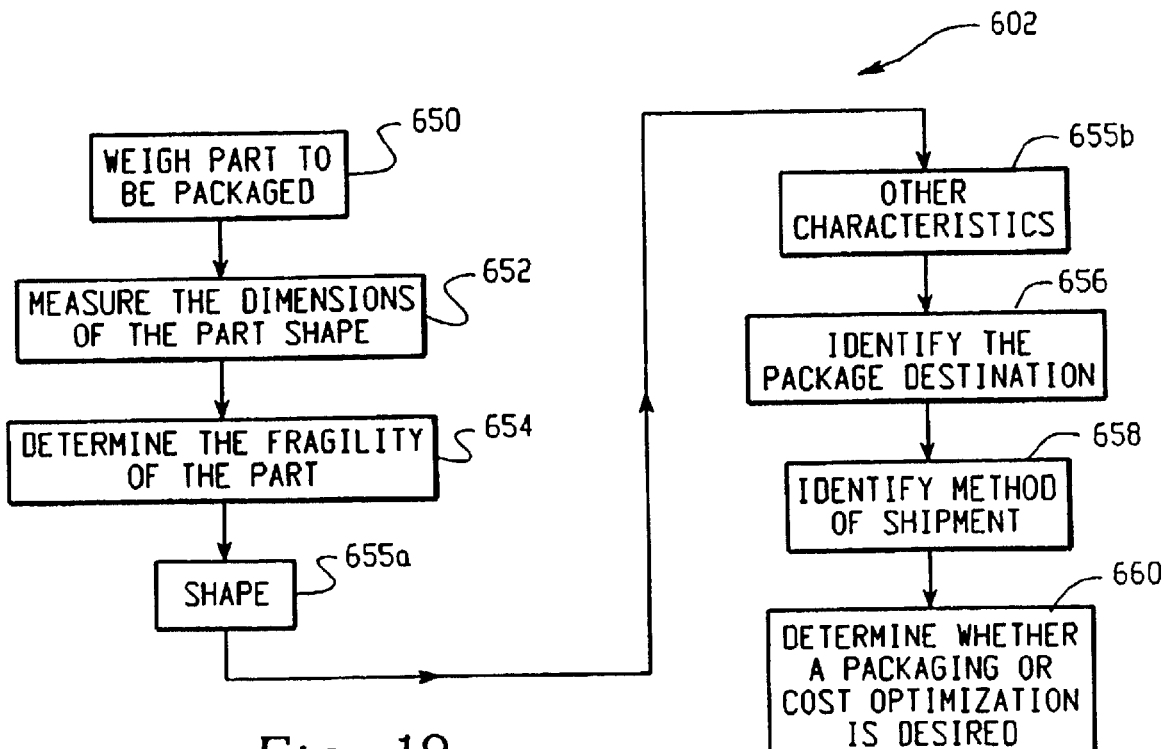
FIG. 18 is a flow chart illustrating the step of identifying the part to be packaged by providing one or more characteristics which characterize the part to be packaged.

The step of identifying the part to be packaged (step 602) is illustrated in greater detail according to an exemplary embodiment of the present invention in FIG. 18. Step 602 begins with either weighing the part to be packaged at step 650 using, for example, the scale 20a or prompting the user to input the weight via an input peripheral. The weight value is then saved in the memory associated with the CPU 50 of the packaging system controller 592, such as the RAM 60 (see FIG. 3). Next, the dimensions (i.e., the size and shape) of the part are measured and/or provided at step 652 or the operator is asked for the dimensions. This step itself may include one or more steps. For example, the packaging system 590 may automatically measure the cubic dimensions of the part using the dimension measurement apparatus 20b and then query the operator on the general shape of the object (e.g., is it a cube, a pyramid, a sphere, etc.). Alternatively, as described earlier, a robotic apparatus may be used to map the outer contour of the object. In yet another alternative, a pen-type apparatus or a mouse may be utilized to sketch the general shape of the object at step 652. Any method and apparatus to measure or ascertain the size and shape of the part is contemplated as falling within the scope of the present invention.

Figure 19A:
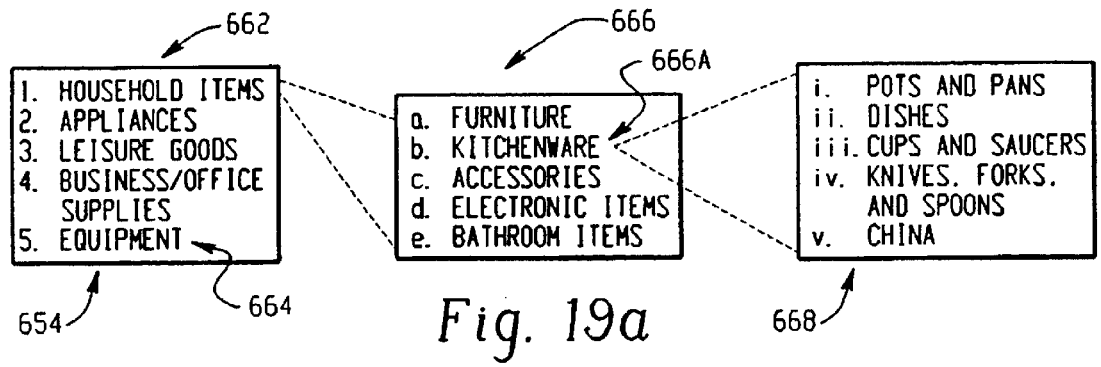
FIGS. 19a–19c illustrate various methods of determining the fragility of the part to be packaged using pull-down menus, a selection of general categories, and automated techniques such as pattern recognition, expert systems and neural networks.
Figure 19B:
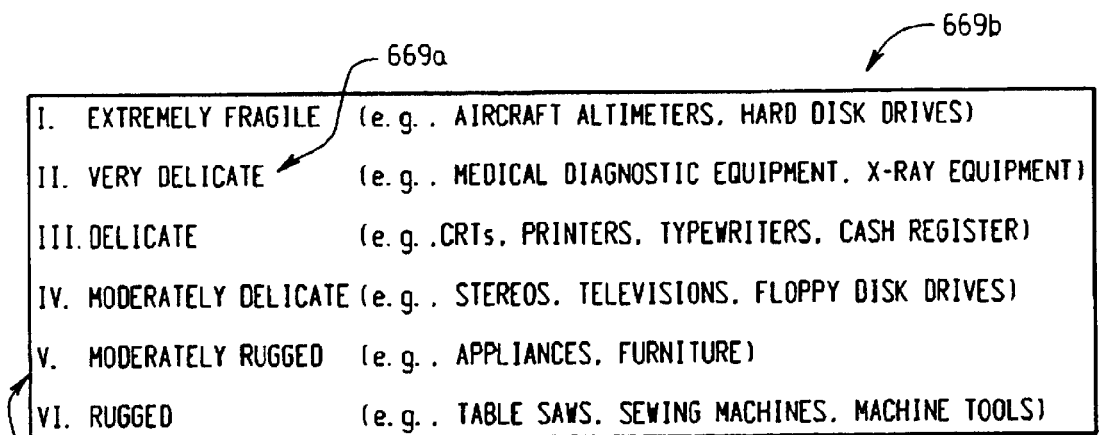
Figure 19C:
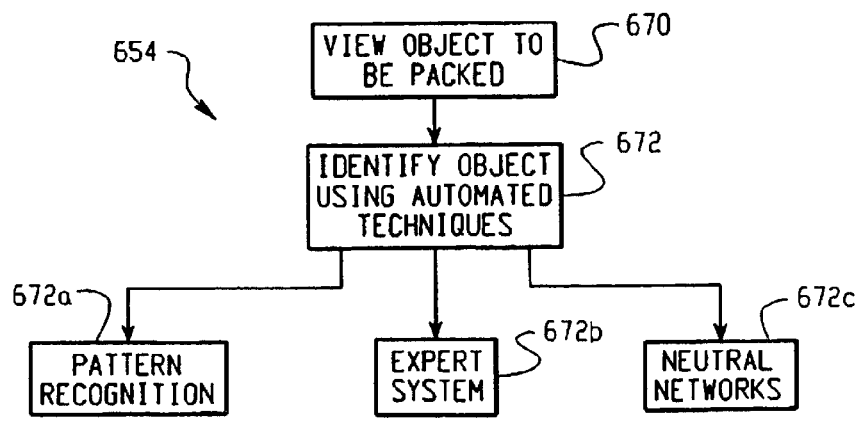

The next step in identifying the part is determining the fragility of the part at step 654. This step may be accomplished in a variety of ways, as illustrated in FIGS. 19a–19c. In FIG. 19a, the fragility of the part is identified using a plurality of pull-down menus. A first pull-down menu 662 includes a listing of general categories 664 within which the part may belong. By highlighting one of the categories 664a (e.g., household items), using, for example, the mouse 20c, a second listing of sub-categories 666 is displayed, wherein each of the sub-categories 666 are related to the earlier selected category 664a (e.g., furniture and kitchenware are both considered household items). The operator may then select one of the sub-categories 666a (i.e. kitchenware) using the mouse 20c or alternatively the touch display to reveal another more detailed list of items 668 (e.g. pots and pans, dishes, etc.). This process may be further continued until the user selects the actual part or a part which is similar to the part to be packaged in terms of fragility. Each final object which is displayed in the pull-down menus on the display 18c have a fragility rating associated with the part which is stored within a memory associated with the packaging system controller 592 (e.g., the hard drive 78) which is subsequently utilized in determining the proper packaging methodology.

According to a preferred embodiment of the present invention, the fragility of a product is measured in terms of "G's" which is a measure of the maximum acceleration (i.e., the rate of change in velocity over a measured period of time) the part can withstand without incurring damage (G is calculated as the ratio of acceleration of the packaged item to the acceleration of gravity, G=a/g). Therefore, the lower the G factor, the more delicate is the part. In one exemplary manner, the G factor for various parts is determined by subjecting the various products to a series of gradually more severe decelerations (i.e., shocks) in order to determine the lowest value at which damage occurs.

Another method of determining a part's fragility is illustrated in FIG. 19b. FIG. 19b provides a categorization of fragility from the most delicate (i.e., extremely fragile) to the least delicate (i.e., rugged), using six fragility categories 669a. An operator, by selecting one of the categories 669a will see a variety of exemplary items 669b which fall within the selected fragility category 669a. By analogizing to the exemplary items within each category, the operator can approximate the part's fragility. Once selected, the CPU 50 saves the G factor associated with the part in the memory such as the RAM 60. As illustrated in FIG. 19b, the six fragility categories may be categorized as follows: (I) extremely fragile (about 15–25 G's); (II) very delicate (about 25–40 G's); (Ill) delicate (about 40–60 G's); (IV) moderately delicate (about 60–85 G's); (V) moderately rugged (about 85–115 G's); and (VI) rugged (about 115 G's and up). Note that the categories 669a provided in FIG. 19b are merely exemplary, and fewer or greater categories may be provided as necessary. It is preferable, however, that the number of categories be sufficient to avoid excessive "educated guesses" of fragility, since an estimate G factor which is too low results in a package being over designed, and thus unnecessarily increases the packaging costs. Likewise, if a fragility G factor is estimated too high, the product packaging will be under designed, and damage to the product during shipping may result.

Yet another way to determine the fragility (step 654) of the product is illustrated in FIG. 19c, wherein automated techniques are utilized. The step 654 begins by viewing the object using a viewing apparatus such as a digital camera at step 670. The data which comprises the image of the part is then subjected to various forms of image processing using, for example, an image processor to identify attributes of the part which provide indications of fragility at step 672. Such image processing may include, for example, segmentation and filtration, as well as the passing of the entire image or image segments through trained classifiers as is well known by those skilled in the art of image analysis. Such classification, for example, may include pattern recognition (step 672a), use of an expert system (step 672b) or application of the image to one or more neural networks (step 672c). Other alternatives may include, for example, binary decision trees and use of fuzzy logic. In addition to step 672, the packaging system controller 592 may query the operator or user (not shown) for additional data to fill in the gaps in the classification/inference process. Such queries may include, for example, "Is the object solid?", "Is the object hollow?", "How thick is a piece of the object?", "Is the object made of plaster, ceramic or glass?", etc. The packaging system controller 592 then utilizes the information provided to conclude the fragility of the part. Note that the actual fragility cannot be determined without destroying the part to be packaged which is obviously undesirable. Therefore the present invention uses the above exemplary method to infer the fragility of the item. If, after the querying for additional information, the controller 592 determines that the gaps existing within the data prevent a conclusion to be drawn within a specified degree of certainty, the packaging system controller 592 sends a message to the operator via the display 18c that a conclusion regarding the fragility of the product can not be drawn and which requests the operator to contact a service representative for additional consultation.

Returning now to FIG. 18, once the fragility of the part is determined at step 654, the packaging system controller 592 queries the operator regarding the package destination at step 656. In many instances, the operator has the shipping destination information at hand and can manually input the data using, for example, the keyboard/mouse 20c or touch type display. Alternatively, if the operator does not have the shipping destination information, the user may access an address database residing in a memory such as, for example, the hard drive 78 or a CD ROM residing in the disk drive 72 (see FIG. 3). Once the appropriate destination information is established at step 656, the CPU 50 saves the data in the working memory such as the RAM 60.

Preferably, the packaging system 590 also queries the operator regarding the desired method of shipment by prompting the operator to select, for example, one of air, trucking, shipping and rail at step 658. The selection may be generic or may be further tailored to be more specific, for example, by identifying the particular freight or shipping company. The CPU 50 then saves the data in the working memory such as the RAM 60 for use in the determining of the optimum packaging methodology. The data collected at step 658 may subsequently be utilized to determine the height from which the product may be dropped during shipping as well as the vibration effects, which will be discussed in greater detail infra. Such information may then be utilized in determining the proper packaging methodology.

Lastly, the packaging system 590 allows the operator to select an optimization option at step 660. For example, as will be discussed in greater detail later, in some cases several packaging options may be available. In such cases, by selecting a packaging optimization preference or a cost optimization preference, the packaging system will select a different packaging method. For example, a selection of the cost optimization preference may allow the system to utilize a lower certainty threshold in determining the product's fragility. Alternatively, when applying a cushioning curve residing in the memory of data to a set of rules for determining the proper amount of packaging, etc., a selection of one preference may dictate a different point on the cushioning curve, as will be discussed in greater detail infra.

In still another embodiment of the present invention, the packaging system 590 may determine two packaging methodologies, wherein one is optimized to insure a high degree of certainty in preventing shipping damage while the other is optimized to provide a reasonable degree of certainty in preventing shipping damage while seeking to minimize the packaging costs. The packaging system controller 592 then displays both options on the display 18c along with their associated packaging and shipping costs to allow the user to compare and thus select one of the packaging methods. The present invention thus allows the operator substantial flexibility in selecting an optimization preference at step 660.

In addition, the packaging system 10 may also include a variable, user defined (or alternatively fixed) safety margin which takes the determined fragility and increases the amount by a predetermined amount (e.g., 20%). With this feature, a safety margin may be achieved for package insurance purposes, for example. This safety margin may be fixed by the packaging system owner or alternatively by the user through an interactive type menu, as may be desired.

Once the various characteristics of the part and the shipping information is ascertained and saved in the memory associated with the CPU 50 at step 602 of FIG. 18, the CPU 50 (alternatively a specialized processor (not shown) which operates in conjunction with the CPU 50) determines the optimized packaging methodology at step 604 of FIG. 17. According to a preferred embodiment of the present invention, the optimized packaging methodology is determined using an expert system.

An expert system is an information system that supports or automates decision making in well-defined situations requiring expert knowledge. Thus, an expert system supports or automates decision making in an area where recognized experts do better than nonexperts. Consequently, expert systems are well-suited to packaging design since an optimized packaging design requires a substantial amount of technical expertise and experience. For example, in designing an appropriate packaging methodology, one does not merely find a box which is large enough to contain the part, and then wrap or surround the part with an arbitrary amount of packaging material and subsequently fill in any remaining voids. Instead, an efficient packaging design takes into account the fragility of the part to be packaged as well as its size, shape and weight and tailors the packaging method to ensure that expected shocks are sufficiently absorbed by the packaging material (e.g., the cushioning pads). In addition, a packaging design may take additional factors into consideration such as the compressive creep of the packaging material, the impact of expected temperature conditions on the cushioning ability of the packaging material, the possibility of buckling and vibration effects. The present invention takes the expert knowledge and data provided by experienced packaging designers and distills the information into a set of rules with accompanying data in conjunction with the data provided by the operator in step 602 of FIG. 17 (which characterize the part to be packaged) to determine the optimized packaging methodology.

The expert system of the present invention produces conclusions which dictate a packaging methodology based on the data it receives from the operator. The conclusions follow from the application of the set of rules and accompanying data provided within the expert system (which is often called the knowledge base) to the data or information provided by the operator. Thus, knowledge in the expert system is a combination of instincts, ideas, rules and procedures that guide actions and decisions. According to one aspect of the present invention, the knowledge base may be constructed within an expert system shell which is commercial software product that allows for the efficient creation of an expert system. The expert system shell provides pre-programmed modules for entering rules and data as well as modules for performing calculations and presenting various pieces of information to the user or operator.

The expert system may represent knowledge in a variety of ways. Preferably the knowledge is represented in the form of "if-then" rules. If-then rules are stated in the form: IF one or more particular conditions are true, THEN certain conclusions should be drawn. An exemplary rule of the expert system of the present invention may be illustrated as follows:

IF the part occupies a volume V,

THEN no packaging containers having a volume less than V should be considered.

The above rule is used in determining the appropriate packaging container for the part to be packaged. In the present example, all the data needed to draw the conclusion is provided by the operator at step 652 of FIG. 18. In many cases, however, the expert system of the present invention will use several approaches for determining whether a given condition is true. As shown above, the data may be already provided by the operator and therefore reside in a database. Alternatively, the system might ascertain whether the condition is true by using data within the database plus other rules. Lastly, the expert system may actively seek additional data by asking the operator questions and/or use other rules to draw a conclusion.

Preferably, the expert system of the present invention is like a human expert working on a problem. The expert system uses the knowledge within the knowledge base to draw interim conclusions based on whatever information is currently available, even if the information is incomplete. When a conclusion cannot be reached, it uses the knowledge in the knowledge base to figure out questions to ask or determines what data to retrieve in order to make more progress in reaching a packaging conclusion.

As stated above, if-then rules may be used to represent knowledge in the knowledge base. Not only may if-then rules take on the form provided above (i.e., naming conditions and conclusions) the rule may contain a certainty factor (e.g., 0.75) which indicates that a conclusion has a particular likelihood, but nevertheless is uncertain. The certainty factor may then be used as another fact and may be applied in additional rules to arrive at a conclusion and thus mimic the uncertainty which is oftentimes inherent in much of the work that experts do.

Another type of knowledge representation may also be used to construct a knowledge base for determining an optimized packaging methodology. This type of knowledge representation is often called "frames" which organizes information to make sense of the information and identify any unexpected features that are present. Frames provide a way to organize data about specific situations. For example, when you enter a room your mind processes the visual data and compares it to what your mind expects. Further, your expectations are different in different types of rooms. For example, when you walk into a kitchen you expect to see a refrigerator, stove, sink and cabinets. You do not, however, expect to see a computer or filing cabinet in the kitchen although either might exist in some limited circumstances.

A frame is therefore a data structure which represents an entity such as a concept, item or class. The frame consists of fields which identify the attributes for that kind of entity. Each field has an entry or value for each attribute which is being considered. Frames can be used in determining the fragility of an unknown part by finding a frame which most closely approximates the part. That is, a fragility value may be assigned to an unknown part if a substantial number of attributes are similar to a part having a known fragility value. Similarly, frames which comprise pre-designed packaging methodologies for parts having specified attributes may be utilized as a starting point for designing an optimized packaging methodology. Although if-then rules and frames have been described as exemplary rules and structures for representing knowledge within a knowledge base, it is understood that other structures or methods for representing expert knowledge may also be utilized and such structures and methods are contemplated as falling within the scope of the present invention.

Figure 20:
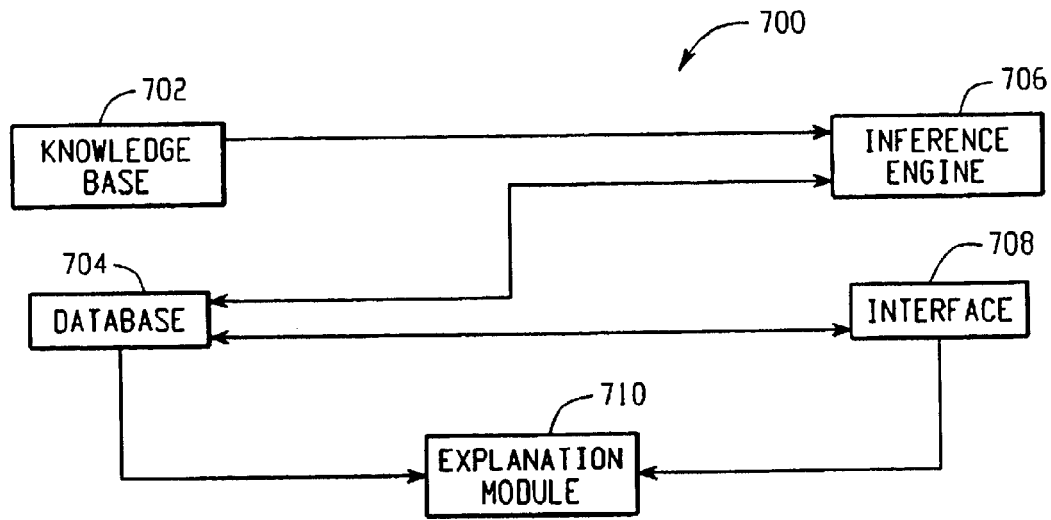
FIG. 20 is a block diagram illustrating an expert system associated with the packaging system controller according to the present invention.

An exemplary structure for the expert system 700 of the present invention is illustrated in FIG. 20. As briefly discussed earlier, the expert system 700 may reside within the CPU 50 of FIG. 3 or may exist as a separate processing component within the packaging system controller 592 of FIG. 16. The expert system 700 may include a knowledge base 702, a database 704, an inference engine 706, an interface 708 and an explanation module 710. Although FIG. 20 suggests that the components are physically separate components, it is not required. Instead, the components of the expert system 700 may be considered as functional components within a processor. In still another alternative embodiment, the expert system may be remote and be accessed via the network interface 90 or other communication means of FIG. 3, thus making the input/output peripheral a dummy-type terminal.

Figure 21:
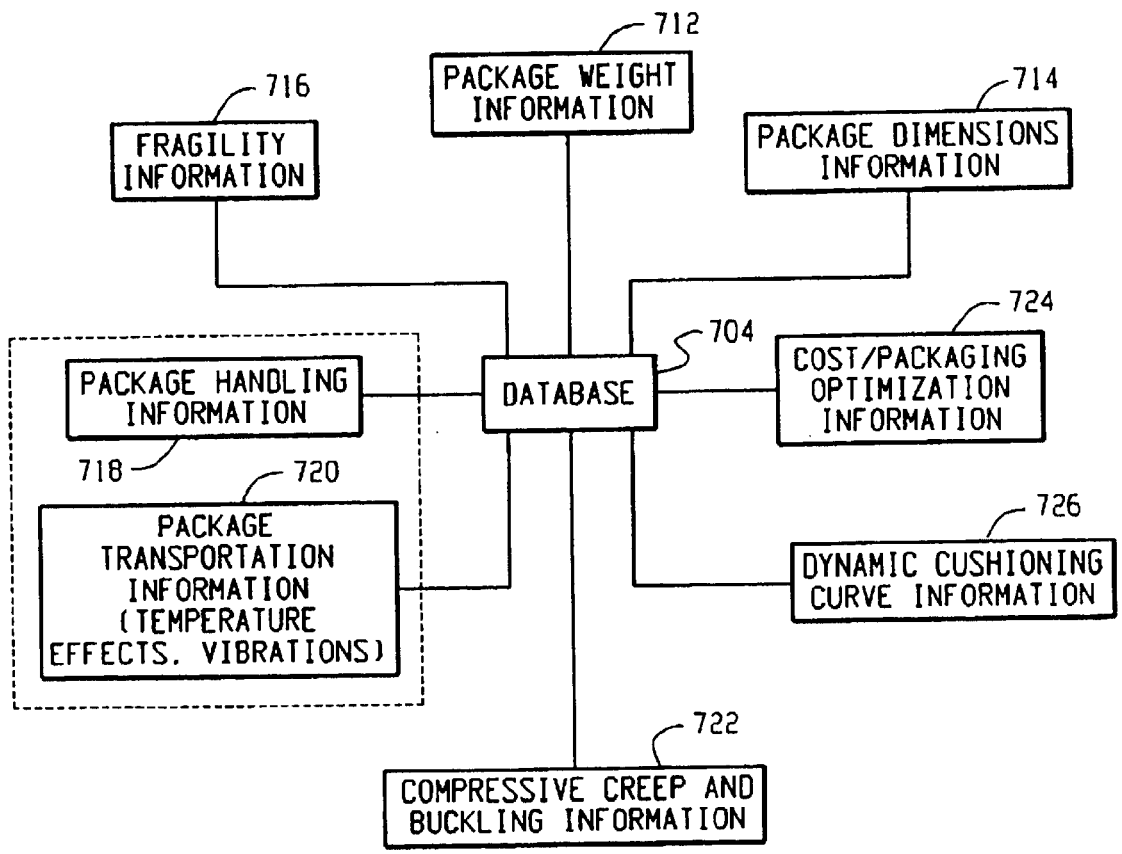
FIG. 21 is a block diagram illustrating various pieces of data residing within the data base of the expert system according to the present invention.

The knowledge base 702 is a section of memory containing one or more sets of data relating to the packaging material such as the cushioning pads and a plurality of rules and/or frames which are supplied by an expert. The database 704 is another section of memory used to store facts and/or characteristics of the part to be packaged provided by the operator via any one of the input peripherals 20a–20c. In accordance with the present invention, the database 704 may contain the various pieces of data collected at step 602 of FIG. 18, as illustrated in FIG. 21. The various pieces of data within the database 704 include, but are not limited to, package weight data 712, package dimension data (size and shape) 714, fragility information 716, package handling information 718, package transportation information 720, and other miscellaneous packaging data 722 such as compressive creep data, temperature effects (thermal coefficient) data, buckling data and vibration information. In addition, the data characterizing the part to be packaged may include a cost/packaging optimization preference 724 and dynamic cushioning curve data 726 for one or more types of packaging material and packaging material configurations.

The inference engine 706 applies the rules and data within the knowledge base 702 to whatever facts are provided in the database 704 to decide what question to ask next, either to the operator or back to the database 704 and the knowledge base 702. Which questions are asked next by the inference engine 706 depend upon the current goal of the inference engine 706. For example, if the inference engine 706 has identified five different facts that all must be true in order to confirm a current working hypothesis, the inference engine 706 may ask those five questions in turn. If any one of the responses is negative, the inference engine 706 may then abandon the current line of reasoning for another.

The interface 708 may consist of the display 18c and the keyboard mouse 20c and represents functionally the way in which the expert system 700 interacts with the operator, if such action is necessary. The interface 708 may operate as a set of text questions and answers or may be graphical (or a combination) as may desired. The explanation module 710 is optional and is not included in the preferred embodiment of the present invention. The explanation module 710 is made available to the operator via the display 18c as a way for the operator to know how a particular conclusion or fact was inferred or why a particular question is being asked in order to explain the sequence of inferences that produced a resulting conclusion.

Figure 22:
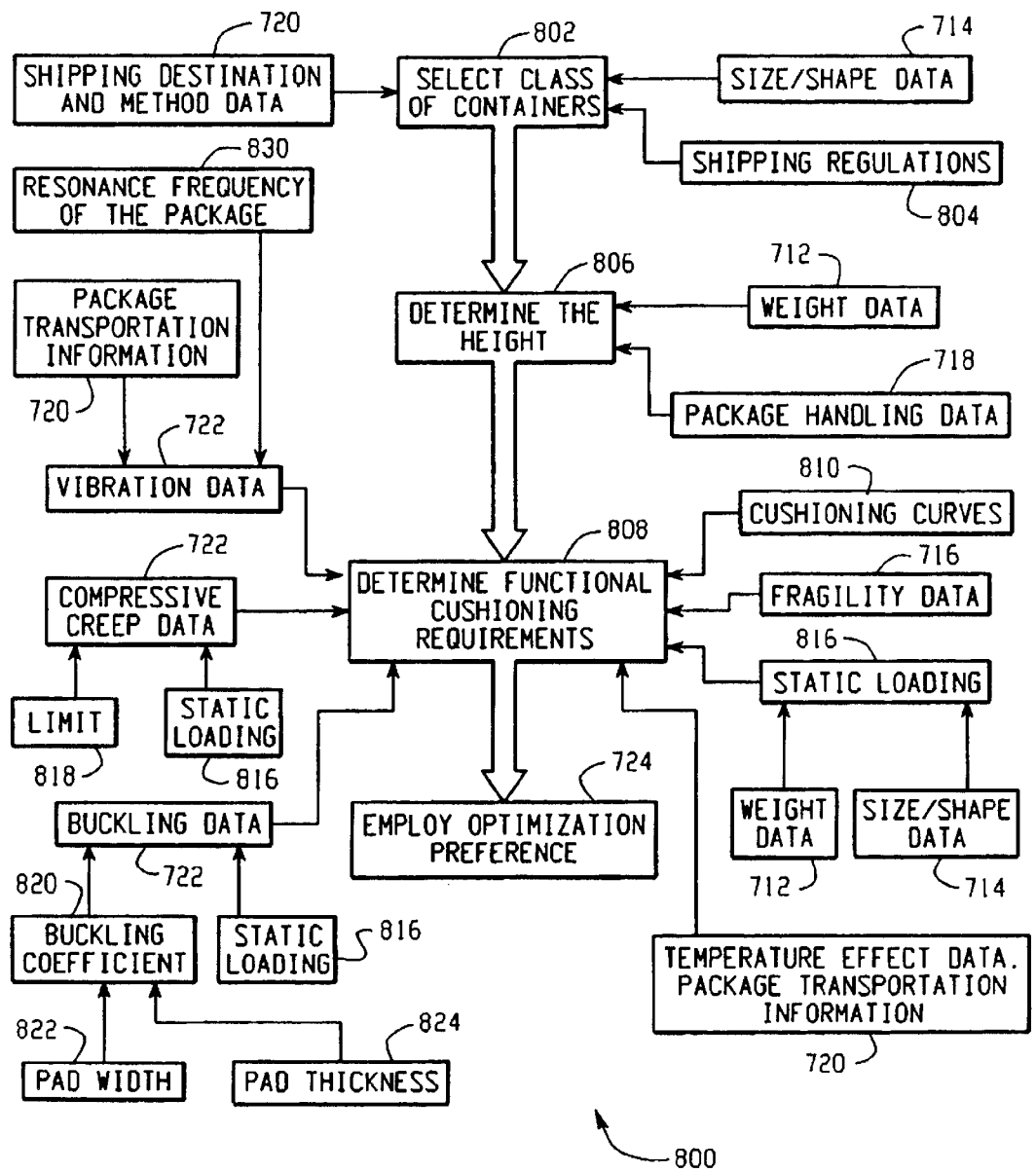
FIG. 22 is a decision diagram illustrating an exemplary method of determining the packaging control methodology using an expert system according to the present invention.

FIG. 22 is an exemplary expert system determination flow diagram 800 which illustrates one method in which the expert system 700 of the present invention determines an optimized packaging methodology using packaging material generated by the cushioning conversion machine 12 of FIG. 2 (cushioning pads) for an unknown part. As discussed previously in connection with FIGS. 16–21, the packaging system 590 identifies the part to be packaged (step 602) by obtaining a variety of pieces of information relating to the part to be packaged (see FIG. 21). Using the data of FIG. 21 (i.e., the database 704), the expert system 700 applies the data to various rules within the knowledge base 702 as illustrated in FIGS. 20 and 22.

Initially, the inference engine 706 eliminates one or more packaging containers 802 from further consideration using the size and shape data 714 within the database 704. For example, if the part is 24" long, 12" wide and 12" deep, then any packaging container having a volume (V) less than 24"×12"×12" (3,456 cubic inches) could not contain the part and thus is eliminated from further consideration. In addition, given the desired method of shipment and the shipping destination data 720, the inference engine 706 searches the knowledge base 702 for any shipping regulation data 804 which may either preclude or require certain classes of shipping containers, thus further reducing the remaining available containers. The inference engine 706 then moves on to another analysis since additional information is needed in order to make further progress in the selecting the proper packaging container. The above step 802 is merely exemplary and may include additional rules, as may be desired.

Next, the expert system 700 determines the drop height that the part may encounter during shipping 806 so that substantive analysis may proceed regarding what amounts, styles, etc. of cushioning pads will be needed to properly protect the part. The drop height is calculated by the inference engine 706 using the weight information 712 within the database 704 and the package handling information 718. Using the packaging handling information 718, the inference engine 706 can determine whether one or more individuals will be carrying or throwing the package and, in conjunction with the weight information 712, can identify the probable drop height the packaged part would experience if the part were inadvertently dropped during shipping. For example, if one person is carrying the package and the package is light (e.g., about 10–20 pounds) the height at which the package may inadvertently be dropped is high (e.g., about 36"). However, if two individuals are carrying the package and it is more heavy (e.g., about 50–100 pounds) the height in which the package may be inadvertently dropped is less (e.g., about 24"). In the above manner, the inference engine 706 using data within the knowledge base 702 and the data provided by the user in the database 704 determines the potential drop height the part may experience in shipping. The drop height data may then be used by the inference engine 706 in selecting the proper dynamic cushioning curve data 726 in the knowledge base 702 when determining the functional cushioning requirements data weight at step 808.

The determination of which class and configuration of cushioning materials will functionally be appropriate (step 808) is preferably performed by the inference engine 706 using a variety of pieces of information. According to an exemplary embodiment of the present invention, a plurality of cushioning curves (shown graphically as FIGS. 23a–23n with the reference numeral 810) consist of data 726 residing in the knowledge base 702. The cushioning curves 810 are evaluated and if any of the curves contain drop heights that do not match the determined drop height of step 806, they are removed from further consideration by the inference engine 706. A plurality of exemplary dynamic cushioning curves 810 are provided in FIGS. 23*a*–23*n*. Typically, many more cushioning curves 810 will exist, however, in this example the determined drop height is 30" and therefore only the cushioning curves 810 having data at drop heights of 30" are considered in the subsequent analysis undertaken by the inference engine 706.

A dynamic cushioning curve 810 illustrates how a packaging material (for a particular packaging material configuration) behaves at different impact levels. The curves of FIGS. 23*a*–23*n* were generated by dropping a series of known weights onto a cushioning pad configuration sample (not shown) and measuring the amount of shock the sample allowed to be transferred (i.e., transferred to the part to be packaged). In other words, the drop tests simulate the part being dropped from its expected drop height (step 806). Each point in the curve represents how much loading a part of known weight will apply to the cushioning pad configuration, and how much shock the cushion will allow to be transferred to the product. The inference engine 706 utilizes the fragility data 716 and calculates the static loading data 816 using the packaged dimension data 714 in the database 704 to evaluate what cushioning pad configuration is sufficient for each orientation part (since each side of the part may provide a different static loading value).

Figure 23A:
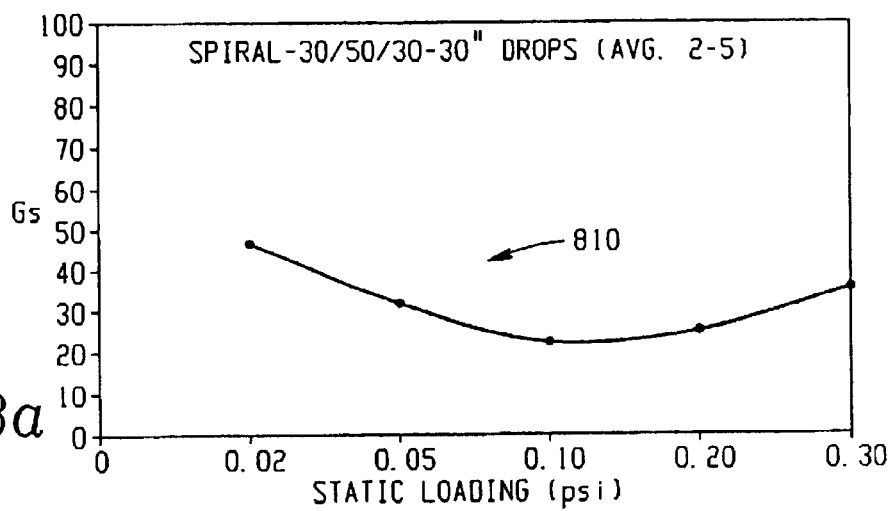
FIGS. 23a–23n are graphs illustrating dynamic cushioning conversion curves used in the determination of the functional cushioning requirements by the expert system according to the present invention.
Figure 23B:
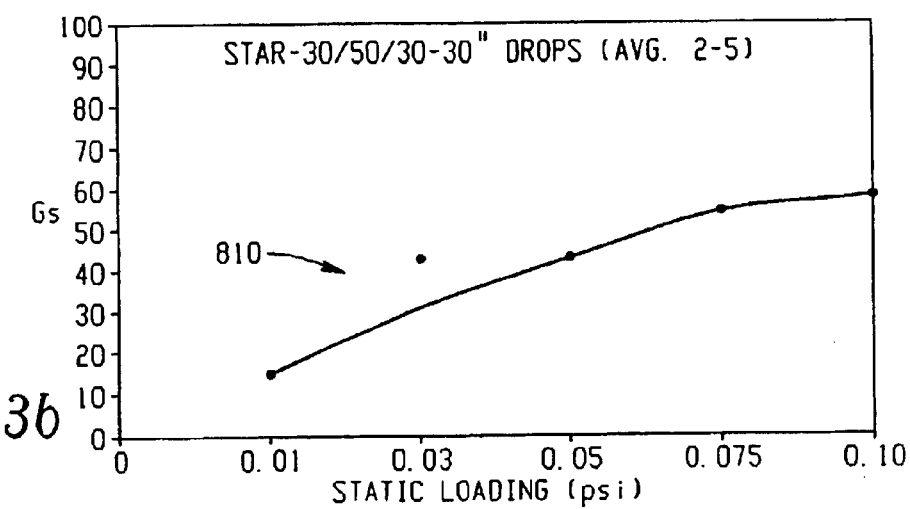
Figure 23C:
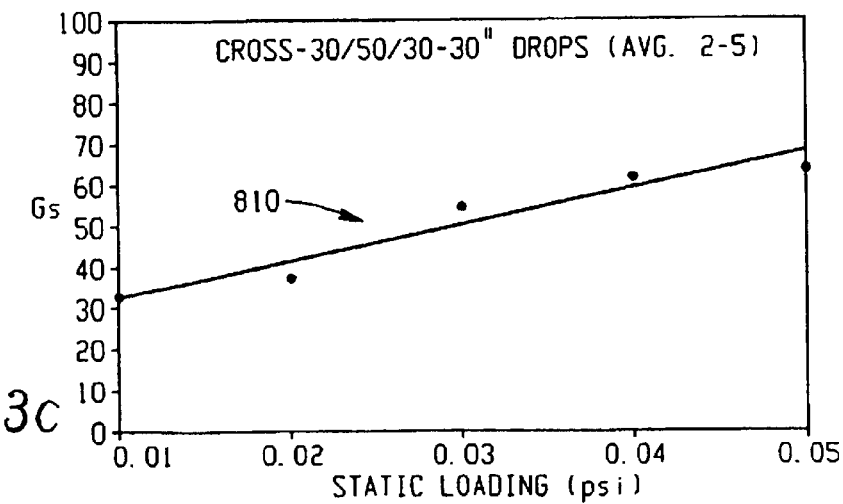
Figure 23D:
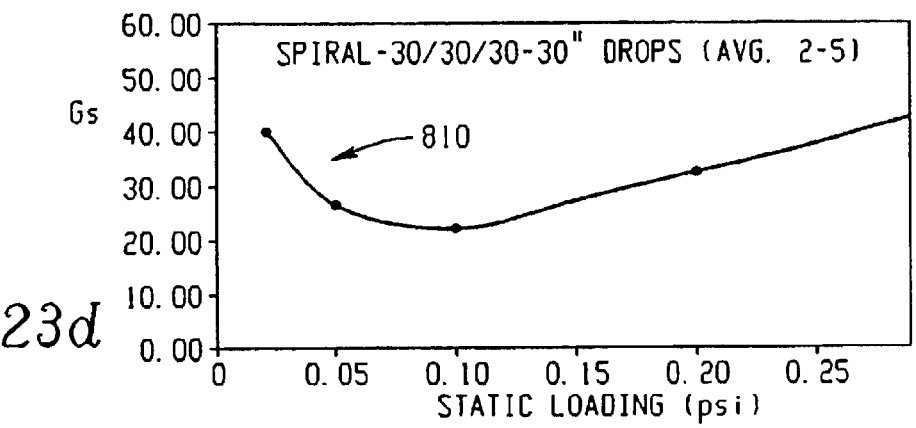
Figure 23E:
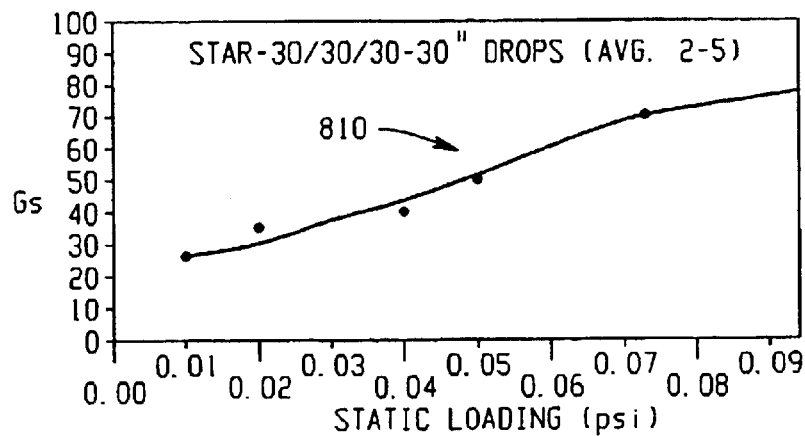
Figure 23F:
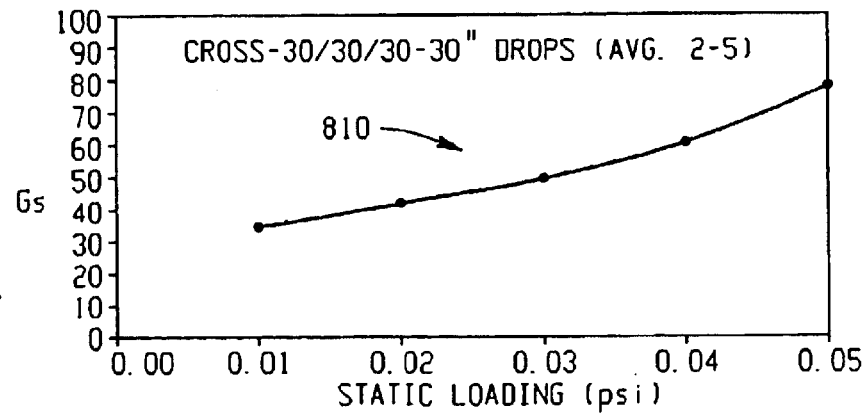
Figure 23G:
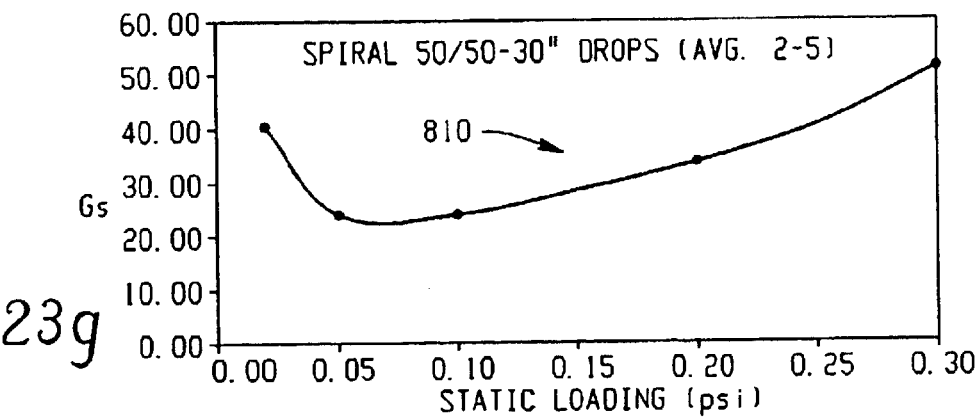
Figure 23H:
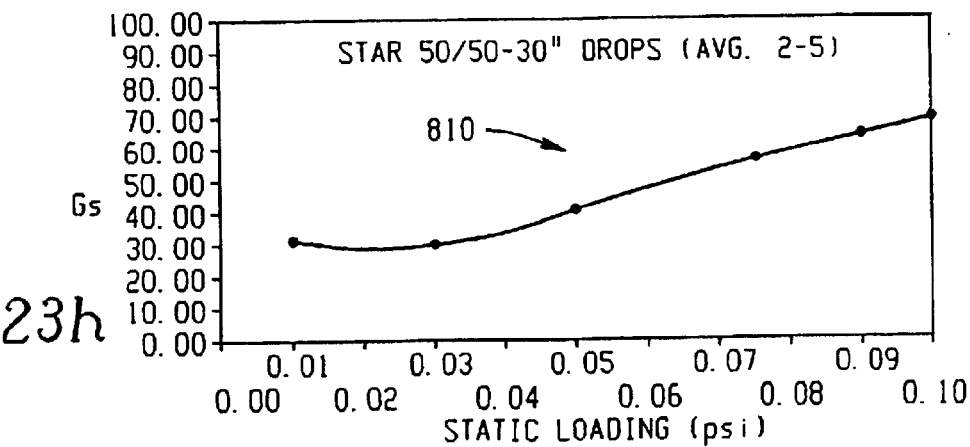
Figure 23I:
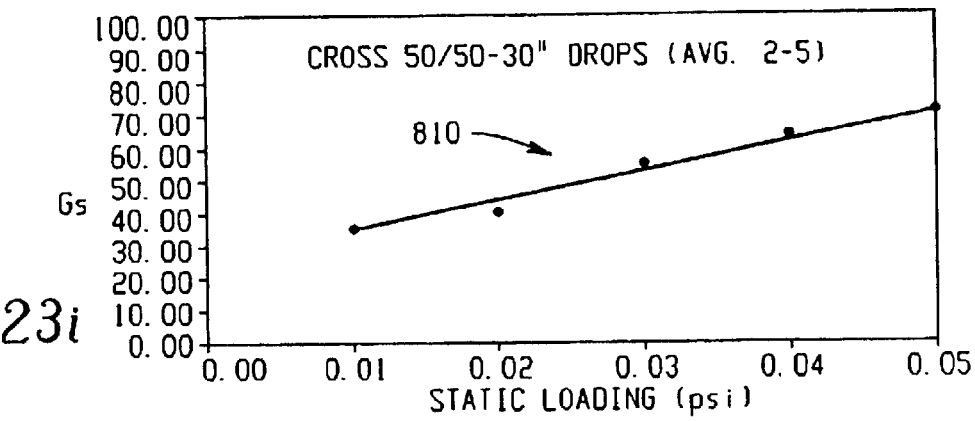
Figure 23J:
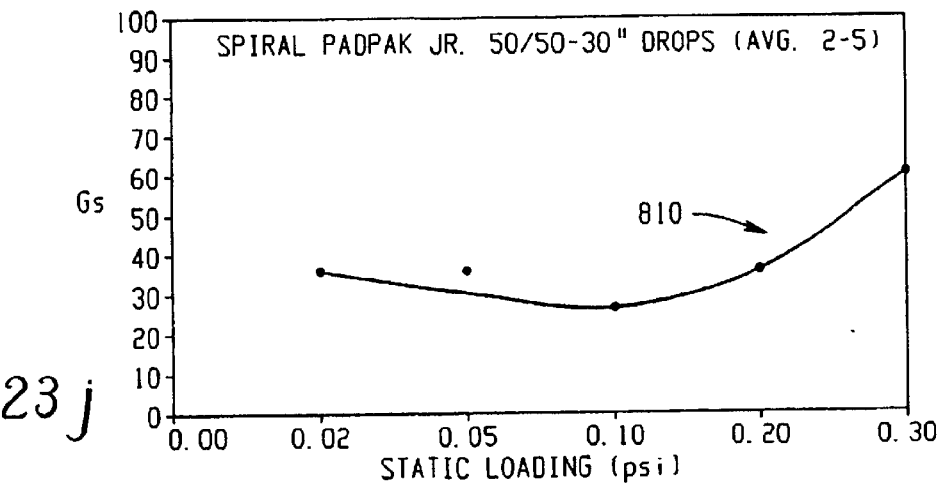
Figure 23K:
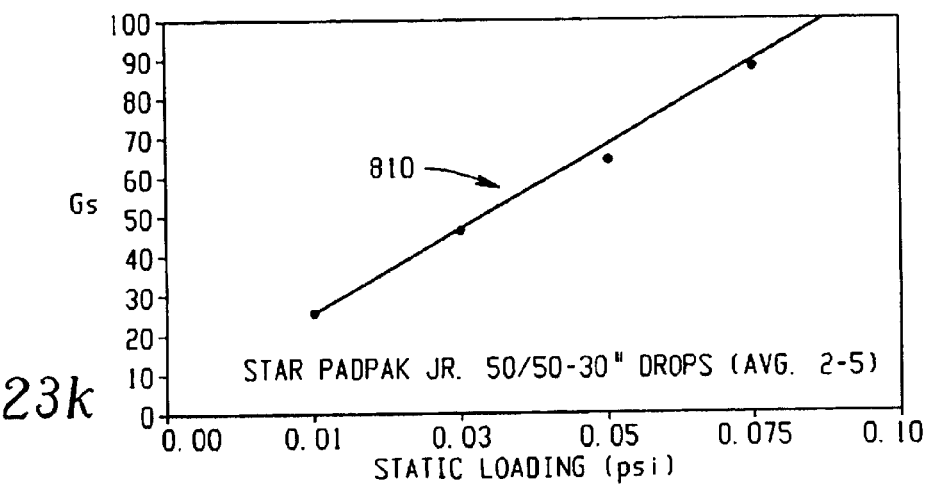
Figure 23L:
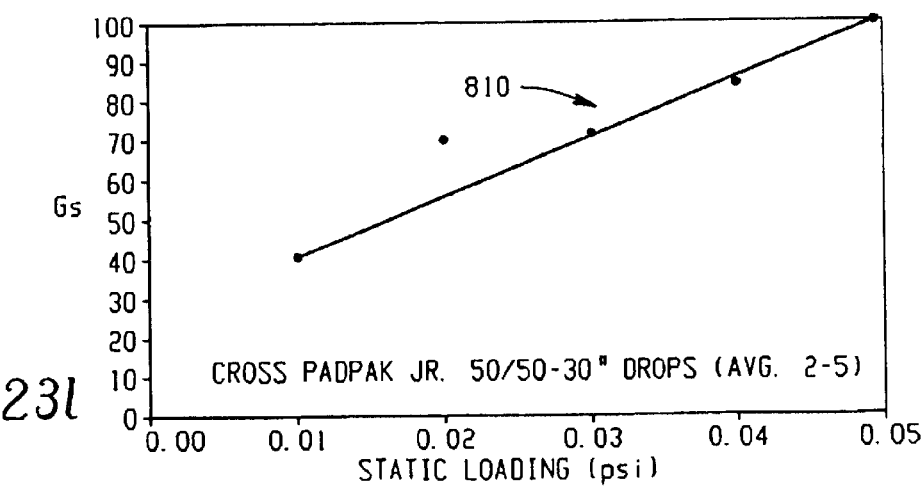
Figure 23M:
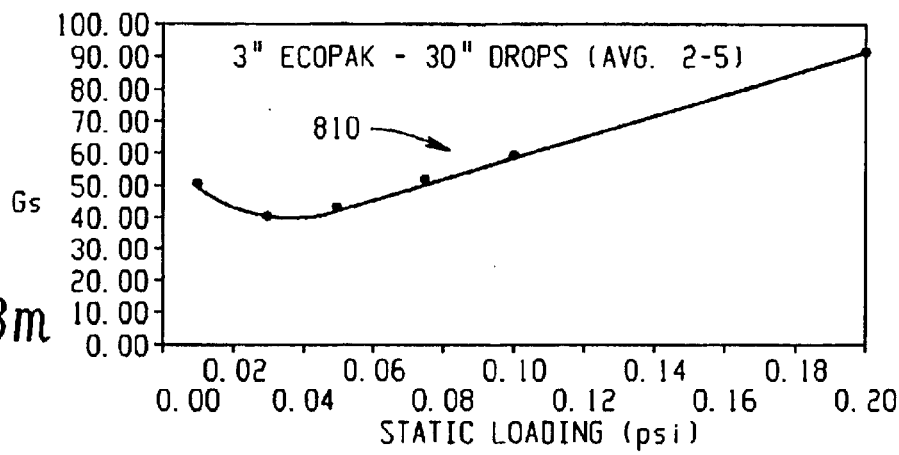
Figure 23N:
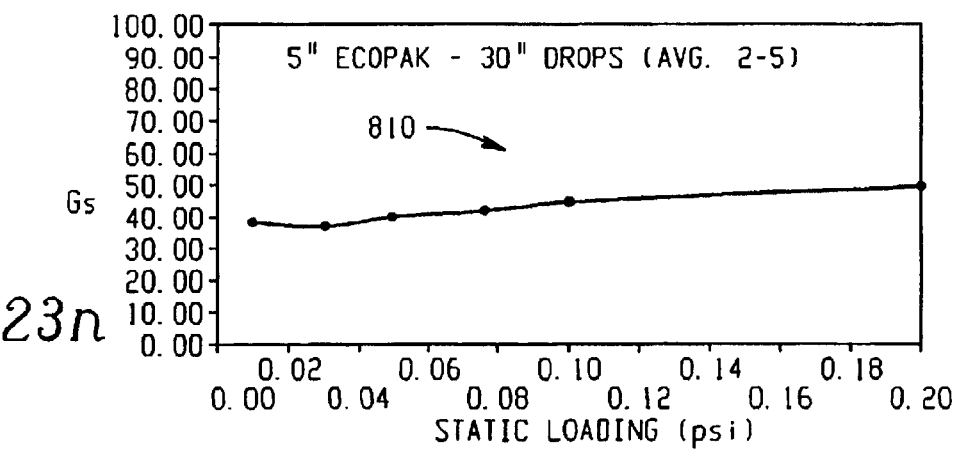

The cushioning curves of FIGS. 23*a*–23*n* were developed in the following exemplary manner. A 10" by 10" by 4" weighted plywood box was utilized to simulate the part to be packaged and was packed inside a 12" by 12" by 12" corrugated container. Various cushioning pad configurations were placed in the bottom of the corrugated container and the weighted product was then placed on top of the configured cushioning pad. Such exemplary cushioning pad configuration include a spiral/coil configuration which is a length of cushioning material which is coiled into a spiral shape, a cross configuration which includes two lengths of cushioning material crossing each other and a star configuration which includes a plurality of lengths of cushioning material crossing each other. In addition, other type configurations and individual pad lengths are also anticipated as falling within the scope of the present invention and dynamic cushioning curves may be generated for each of those configurations. Further still, the cushioning conversion material itself can be modified by using, for example, differing types of paper weight. For example, a three ply paper stock 30/50/30 consists of outside sheets consisting of 30 weight paper and a inner sheet consisting of 50 weight paper, respectively. The product box was then weighted to simulate the products from one pound (0.01 pounds per square inch (PSI)) to 30 pounds (0.30 PSI), thus providing data at different static loading values. An accelerometer was attached to the product box to record the acceleration levels (in G's) for each drop. The corrugated container was then dropped five times from a height of 30" (the drop height) for each simulated product weight. A minimum of five different product weights (static loading) were used to generate each curve (using known curve fitting techniques) and the results of the last four drops for each product weight were recorded and averaged. The peak accelerations (G's) versus the static loadings (PSI) were then plotted to generate the dynamic cushioning curves 810.

Figure 24:
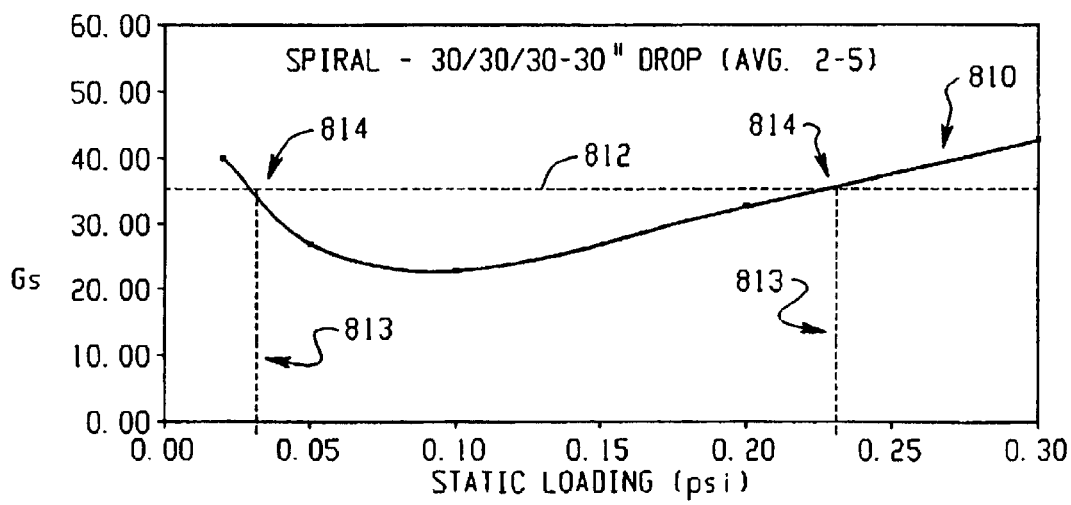
FIG. 24 is a graph illustrating a dynamic cushioning conversion curve in greater detail, wherein use of the curve in determining whether a particular cushioning product configuration is capable of meeting the functional cushioning requirements determined by the expert system.

Using the fragility data 716 within the database 704, each of the cushioning curves 810 are evaluated to see if the cushioning pad configuration provides sufficient cushioning to absorb the potential shock for an identified fragility. One exemplary manner of making such an evaluation is illustrated in FIG. 24 which illustrates a spiral/coil cushioning pad configuration for a 30" drop height. The fragility data 716 within the database 704 indicates, for example, that the part can only withstand up to 35 G's without incurring damage. Thus, a horizontal line 812 is drawn at 35 G's across the cushioning curve 810. If the curve 810 passes through or below the horizontal line 812, then it is confirmed that the cushioning product (the spiral configuration) may not transfer more shock to the part than the product can withstand under certain static loading conditions. Then, one or more vertical lines 813 are drawn from the point or points 814 where the horizontal fragility threshold 812 intersects the cushioning curve 810. The vertical lines 813 establish the highest and the lowest static loading values at which the cushion pad configuration will provide adequate protection. In the example of FIG. 24, the static loading values are 0.03 and 0.24, respectively. Note that the static loading is defined as the force exerted by the part to be packaged on the cushioning pad configuration and is determined by dividing the weight of the part by the surface of the side of the part which is engaging the packaging material. Note that since products often have different surface areas depending upon their orientation, their static loadings may also differ depending upon their orientation. Using the calculated static loading data from the weight and data 712 and the size/shape data 714, the inference engine 706 eliminates from further consideration any cushioning pad configurations that cannot provide adequate protection for the determined static loading 816.

The inference engine 706 then uses the data collected from the cushioning conversion curve 810 to calculate the cushion bearing area which is the weight of the part divided by the static loading (which in this case is some value between 0.03 and 0.24). To optimize costs, the inference engine 706 will select configurations which exhibit greater static loading (and thus the lowest cushion bearing area) because less cushioning product will be adequate for protection and thus reduce the packaging costs. However, since the present invention allows for a cost/packaging optimization preference to be selected, a higher cushion bearing area may be selected using a lower static loading value which increases the packaging protection. Note that in FIG. 24, the least amount of shock is transferred to the part at a static loading of about 0.1; therefore an orientation of the part on the spiral configuration which produces such a static loading value may be selected by the inference engine 706 if a packaging optimization preference has been selected.

The task of determining the functional cushioning requirements (step 808) further includes considering the impact of compressive creep of the packaging material using the compressive creep data 722. Compressive creep is defined as the loss of thickness of the cushioning pad under a constant loading over a period of time. If the amount of creep is too large (in this exemplary embodiment taken to be about 10 percent) the ability to properly cushion the part is impaired. The compressive creep data is uniquely associated with the packaging material and is maintained in the knowledge base 702. The inference engine 706 compares the compressive creep of the cushioning material to a predefined limit 818 and if the compressive creep data 722 exceeds the limit 818, the packaging option using the maximum static loading 816 (and thus the least amount of packaging material) is eliminated and the cushioning curves using a lower static loading 816 are maintained.

The packaging system 590 via the expert system 700, and more particularly the inference engine 706, also takes into account the temperature effects in determining the functional cushioning requirements. The inference engine 706 uses temperature effects data 722 which is a function of the packaging material used (in this particular example, the cushioning pads are made of paper stock). The knowledge base 702 provides thermal coefficients which characterize the dependence of the pad's cushioning properties over temperature. If the inference engine 706 determines that the thermal coefficient is too large (positive or negative), then the inference engine 706 evaluates the package transportation information 720 provided by the operator which resides in the database 704. The package transportation information 720 includes, for example, the shipping destination and the shipping method (e.g., rail or truck). The inference engine 706 then uses the package transportation information 720 to eliminate any cushioning curves that will not provide adequate protection.

For example, if the packaging location is in Arizona and the destination location is Alaska, and the packaging material has a strong thermal coefficient such that the material loses its cushioning capability as the temperature drops and the method of shipment is by truck without any thermal controls, the inference engine 706 will eliminate cushioning options that are near the maximum static load limits and require adjustments to the amount of cushioning material to optimize the packaging design.

Figure 25:
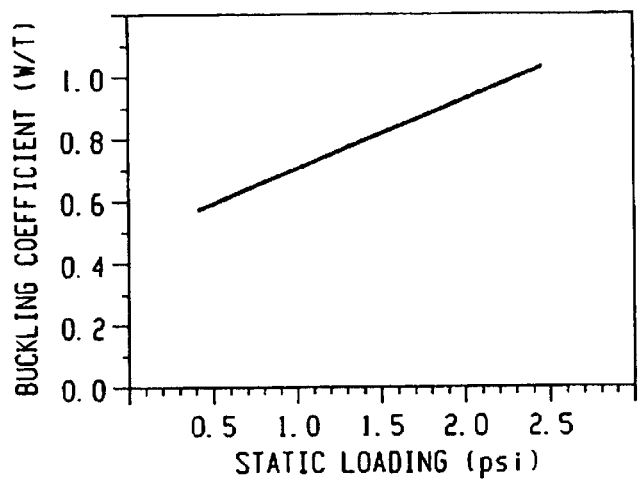
FIG. 25 is a graph illustrating the buckling coefficient dependence upon static loading for one type of packaging material.

The expert system 700 also considers buckling using the buckling data 722 within the database 704 of FIG. 21. Buckling is defined as the non-uniform compression of the cushioning material. When buckling occurs, the energy or shock of an impact is not distributed evenly throughout the cushioning pad, thus resulting in the potential for a greater amount of shock being transferred to the part. Buckling occurs most often when the shape of the cushions or cushion configuration is too tall and thin. The inference engine 706 analyzes whether buckling is an issue by evaluating the buckling coefficient 820 of each remaining cushioning pad configuration with respect to the expected static loading exhibited by the product. The buckling coefficient 820 is a ratio of the area 822 of the cushioning product configuration and its thickness 824. The inference engine 706 uses the graph data of FIG. 25 which resides in the knowledge base 702. Since the inference engine 706 knows the static loading, the engine 706 determines the buckling coefficient 820 graphically and then multiples the coefficient by the thickness 824 of the cushioning product configuration (which is known) to determine how wide and how long the pad must be to avoid the undesired buckling. The inference engine 706 then further removes any remaining packaging configurations that pose a significant risk of buckling (i.e., those configurations which fail to provide the minimum desired pad width).

Figure 26A:
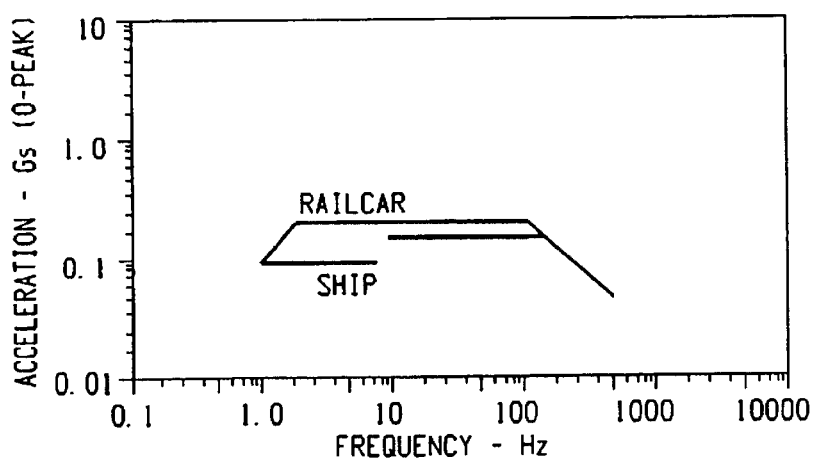
FIGS. 26a–26b are graphs illustrating the impact of vibration upon the packaged product according to the present invention, in particular, typical vibration frequencies for differing types of transportation.
Figure 26B:
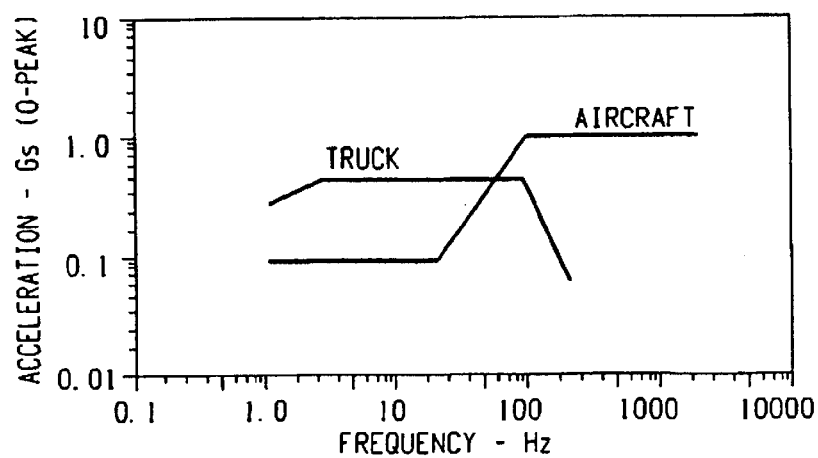

The expert system 700 may further evaluate the impact of vibration using the vibration data 722 within the database 704 using data such as that shown in FIGS. 26a and 26b.

As illustrated in FIGS. 20 and 22, the inference engine 706 uses the data within the database 704 along with rules and data within the knowledge base 702 to draw conclusions regarding which packaging methodologies are acceptable and which are not. After determining the functional cushioning requirements at step 808, a variety of packaging options will most likely still exist and the inference engine 706 will need to apply additional rules to further focus upon a single solution. For example, the number of available containers at step 802 may be further reduced by determining whether each of the remaining containers available could facilitate the remaining packaging options.

In addition, the inference engines 706 uses the optimization preference data 724 of FIG. 21 to select a smaller subset of packaging methods that either provide optimized packaging security (i.e., a minimal amount of damage uncertainty) or optimized cost (i.e., the methods using the least amount of packaging materials while providing an acceptable amount of damage uncertainty). If an optimization preference is not provided, the expert system 700 of the present invention selects an optimized cost preference as a default. In addition, other rules may also be used to select the best remaining packaging solution. For example, the inference engine 706 may select the packaging methodology that will result in the least amount of wear on the cushioning conversion machine (e.g., which results in the fewest number of packaging material generation steps) or the method that requires the least amount of effort by the operator in executing the packaging method. Other rules may also be utilized and are contemplated as falling within the scope of the present invention.

Although the preferred embodiment of the present invention utilizes an expert system 700, other types of intelligent systems may alternatively be utilized and are contemplated as falling within the scope of the present invention. For example, the expert system 700 may be replaced with a neural network type intelligent system. A neural network is an information system that recognizes objects or patterns based on examples that have been used to train the neural network. Each training example is described in terms of a number of characteristics, each of which are input into a separate neuron or "node". The neural network then combines these inputs in a way that distinguishes between different objects included in the training examples. The neural network performs identification and discriminates between various available packaging methodologies by assigning numerical weights to many characteristics. Thus, neural networks may operate well even when some information is missing.

Thus according to the alternative embodiment, the neural network is trained, wherein an expert packer designs optimum packaging methodologies while internally applying many of the expert rules discussed above in conjunction with the expert system 700. The expert packer therefore communicates a number of system inputs to the neural network which represent the characteristics of the part to be packaged and provides the neural network the proper output (the resulting optimized packaging methodology) for the given inputs. The neural network then successively updates its numerical weights at its various nodes to more closely approximate the proper output for the provided input. After a significant amount of training, the neural network provides a function of determining the appropriate packaging instructions, but in a manner which is different than the expert system. The neural network system does not use defined rules (e.g., if-then rules) to generate conclusions, but the neural network blindly acts on the provided inputs to generate ("determine") an optimized packaging methodology.

In addition, an inventory monitoring system may be included with the packaging system 590 of FIG. 16a. The inventory monitoring system may operate in a manner similar to the inventory monitoring system of FIG. 12, for example. As each operator provides a part to be packaged and proceeds with packaging, the inventory monitoring system accounts for the consumption of the various packaging materials utilized in the packaging process by updating a packaging materials list. The inventory monitoring system then compares the packaging materials list with one or more appropriate re-order thresholds and automatically generates a re-order request using the CPU 50 to replenish the depleted inventories in a timely manner.

As discussed above, the packaging system 590 of FIG. 16*a* determines an optimized packaging methodology for a part to be packaged. The optimized packaging methodology includes a set of packaging instructions which serve as control signals to the cushioning conversion machine 12 and explanation instructions to the operator via the display 18*c*. In addition to the control signals to control the operation of the cushioning conversion machine 12, the determining packaging methodology may also include cushioning material manipulation control instructions similar to those discussed earlier in conjunction with FIGS. 8–10*c*. The manipulation control signals may be used to activate and control either a coiler 250 or an automated insertion device such as a pick-and-place system 302 as may be dictated by the determined optimized packaging methodology.

In the description of the above preferred embodiment of the present invention, a cushioning conversion machine 12 was disclosed. The packaging system 590 of the present invention, however, may also be utilized in conjunction with other types of packaging material generators such as loose fill packaging material generators and dispensers, bubble wrap, air pillow generators and dispensers, shredded material generators, and pulp molded generators and dispensers. It is understood that any form of packaging material generator may be incorporated into the packaging system and is contemplated as falling within the scope of the present invention.

In addition, in the preferred embodiment of the present invention, the determined packaging instructions are utilized to provide automated control of the packaging material generator 12. Alternatively, the present invention may transmit the determined packaging instructions solely to the user or operator who then uses the instructions to manually control the packaging material generator 12.

In the previous embodiments of the present invention highlighted above, the packaging systems primarily addressed the packaging of a single part. For example, for a single known part to be packaged, the packaging system retrieves a pre-determined set of packaging instructions associated with the part which is used to generate appropriate amounts of packaging material. In addition, for an unknown part to be packaged, the packaging system identifies one or more characteristics which characterize the part. Using the characteristics and an expert system having a knowledge base, the packaging system determines the packaging instructions and uses the determined instructions to control the packaging material generator.

According to another alternative embodiment of the present invention, a packaging system is used to package together a plurality of known parts. The packaging system identifies the parts to be packaged and retrieves data associated with the parts from a database. Using the data and an expert system having a knowledge base, the packaging system determines the packaging instructions which represent an optimized packaging methodology for packaging the plurality of parts.

According to the alternative embodiment of the present invention, the packaging system is utilized, for example, in conjunction with a mail-order company or a warehouse distribution facility. A shipping order is created by a customer requesting a plurality of items (i.e., parts). A warehouse management system arranges the shipping order to facilitate an efficient retrieval of the various items. When the retrieved items arrive at a packaging station, the packer implements a pick list verification in which a check occurs to ensure that all the retrieved items match with items on the shipping order. Preferably, a tote in which the items are retrieved contains a bar code which reflects the shipping order. The packer, using a bar code reader, reads the tote bar code and a bar code on each of the retrieved items to verify that each item on the shipping order has been properly retrieved.

Once the pick list verification step is complete, the packaging system uses the shipping order to retrieve data associated with each of the items in the shipping order, such as the weight, size, shape and fragility of each of the items. The shipping order itself also contains additional data which may be used by the packaging system such as the shipping destination and the method of shipment. The packaging system then applies the retrieved data to a set of rules and packaging material data in an expert system knowledge base to determine packaging instructions which represent an optimized or preferred packaging methodology for the plurality of parts.

Note that the expert system of the present invention may use the data such as the parts' size, shape, weight and fragility in determining the optimized or preferred packaging methodology. In addition, the expert system may use additional information such as the cushioning properties of the various parts to determine the appropriate orientation of the various parts with respect to one another within the packaging container. Thus, according to the present invention the expert system uses or considers the cushioning properties of the parts themselves along with the cushioning properties of the packaging material in determining the packaging methodology.

The packaging system then uses the determined packaging instructions to control the packaging material generator (e.g., the cushioning conversion machine) and thereby produce appropriate lengths of packaging material in the proper sequence to effectuate the optimized packaging methodology. The packaging system also uses the packaging instructions to provide graphical and/or textual guidance to the packer via a display to aid in the proper packaging of the various items. For example, the display will illustrate the order of packaging of the various items and their proper orientation in the specified container along with the way the generated packaging material is to be used, thus making the packaging process simple and clear.

Once packaging of the items into the proper container is complete, the container is weighed and compared to an expected weight which includes the expected weight of the parts, the container and the packaging material. If the measured weight is outside a pre-selected tolerance, a warning message is provided to the packer which allows the packer to evaluate the situation and make a judgement as to whether an error in the packaging process has occurred. If acceptable, the container is sealed using, for example, packaging tape and the packaging system prints out a mailing label in accordance with the destination data supplied on the shipping order and prints out a bill-of-lading which contains information which identifies, for example, the shipper, the ship to address, the number of containers in the shipping order, and the total weight of the shipment. The packaging system also sends the bill-of-lading data to a manifest system.

According to an alternative embodiment of the present invention, the parts to be packaged are placed directly into the container selected by the packaging system. In the alternative embodiment, the determined packaging methodology determines the order of the pick list and the packaging material generator generates (in advance) all the packaging material needed to package the parts. The packer then takes the generated packaging material and the selected container along the pick route (using, for example, a cart) and, after selecting a part according to the pick list, packages the part in the container using one or more of the pieces of generated packaging material. In the above manner, the packaging process is made more efficient by eliminating the step of placing the parts into the tote and subsequently removing the items from the tote and packaging them in the selected container.

According to yet another embodiment of the present invention, the packaging system is portable (e.g., on wheels or on a portable cart). The packaging system determines the packaging methodology and thus dictates the order of the pick list. The packaging system produces the appropriate amount of packaging material at the location for the picking of the appropriate part along the pick list route. The packer then uses the packaging instructions provided by the output peripheral to then package the part in the selected container. In the above manner, the packaging material is provided when needed and the part is selected and immediately packaged without being placed into an intermediate tote.

The packaging system includes an inventory management system which accounts for the receipt of material into inventory and accounts for inventory consumption by updating a packaging materials list. The inventory management system compares the updated packaging materials list to one or more re-order thresholds. If any of the re-order thresholds are satisfied, the packaging system generates a re-order request directed toward the depleted item to ensure that inventories are replenished in a timely manner. Alternatively, the system may periodically check the inventory and re-order at predetermined times.

The packaging system of the present invention also includes a productivity monitoring system which collects and summarizes various productivity statistics. For example, the productivity monitoring system collects data for various productivity criteria such as, but not limited to, the number of orders packed, the number of items packed, the total weight packed, the average time per order and the average amount of packaging material generated per order. In addition, various time frames of data may be collected and additional processing may be employed to normalize various productivity criteria, provide trending analysis, etc.

Figure 27:
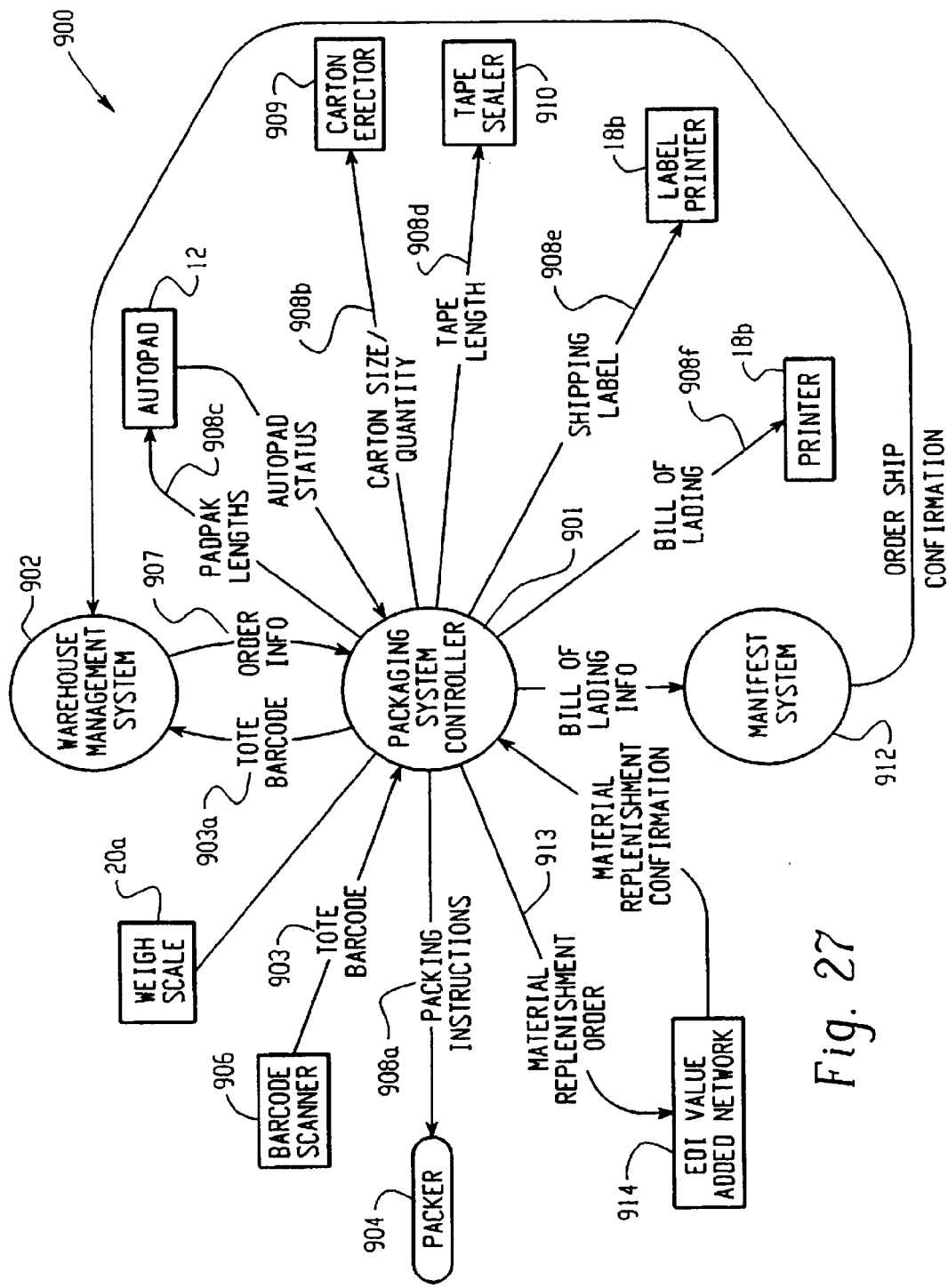
FIG. 27 is an operational flow diagram of the packaging system for packaging a plurality of known parts according to another aspect of the present invention.

Turning now to FIG. 27, an operational flow diagram of the packaging system 900 according to the present invention is illustrated. The system 900 includes a packaging system controller 901 operationally coupled (preferably via an electronic data link) to a warehouse management system 902. The packaging system controller 901 transmits a tote bar code number 903 (or RF tag reader) which represents a shipping order to the warehouse management system 902 when a packer 904 receives a retrieved number of items to be packaged. The license plate is read from the tote and the shipping order is determined from the license plate using a look up table, for example. The tote contains the retrieved items and the license plate is read with a bar code scanner or reader 906, however, any type of reading device is contemplated by the present invention. The warehouse management system 902, in response to receiving the tote bar code 903, provides the packaging system controller 901 with order information 907 which includes a list of the parts in the shipping order and information relating to each item such as the weight, size, shape and fragility of the item. Using the information 907 provided by the warehouse management system 902, the packaging system controller 901 determines packaging instructions 908 which represent an optimized packaging methodology.

The packaging instructions determined by the packaging system controller 901 have several components. Some of the packaging instructions 980a are provided to the packer 904 as graphical/textual instructions which illustrate how to use the generated packaging material to properly package the various items. The packaging instructions 908 also include instructions 980b identifying the size and quantity of the specified packaging containers and are transmitted to a carton erector 909 for construction of the specified containers. The packaging instructions 908 are also communicated to the packaging material generator 12 (e.g., the cushioning and conversion machine) as control signals 980c which dictate the number and length of cushioning pads to produce as well as their sequence of generation. The instructions 908 also include the specification of the necessary tape length 980d to a tape sealer 910, instructions 980e for generation of a shipping label to the label printer 18b, and instructions 980f for generation of a bill-of-lading to the printer 18b. Lastly, the packaging system controller 901 sends the bill-of-lading data to a manifest system 912 and monitors inventory consumption. If any inventories drop below a predetermined threshold, the packaging system controller 901 transmits a re-order request 913 to a distributor via a communication link 914 such as an EDI value added network.

According to one embodiment of the present invention, the manifest system 912 may be used to keep track of the destination of the packaged parts for tax or other purposes. For example, in certain European countries some tax provisions exist which relate to taxes on waste materials. The manifest system 912 records the destination of the package (container) and the amount of packaging material used in packaging the parts so that such information may be efficiently used, for example, for compliance with the appropriate tax provisions.

Figure 28:
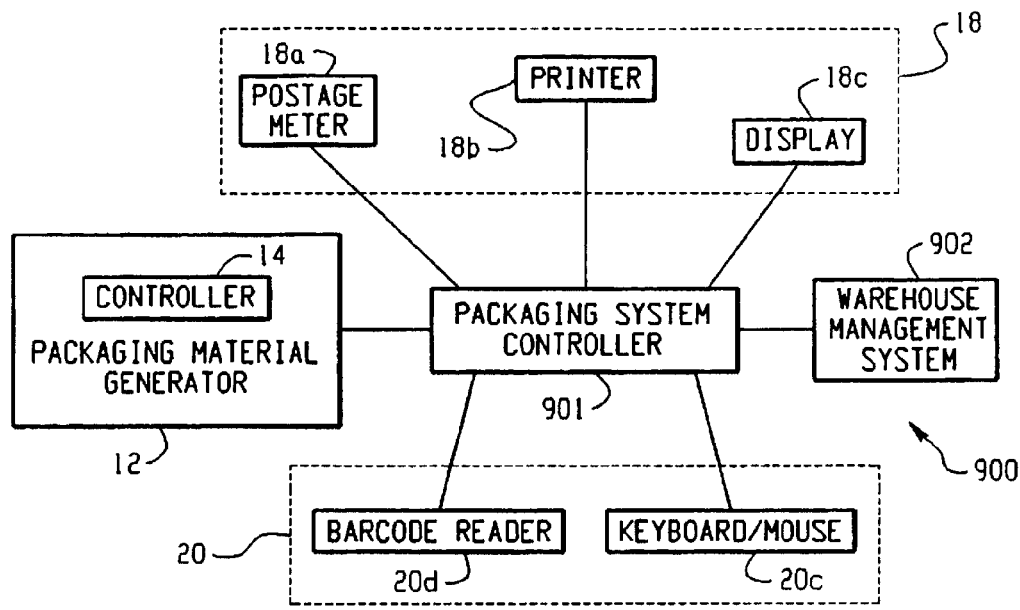
FIG. 28 is a block diagram illustrating the packaging system according to the present invention.

A block diagram of the packaging system 900 is illustrated in FIG. 28. The packaging system 900 includes the packaging system controller 901 coupled to the warehouse management system 902 and the packaging material generator 12. In addition, an output peripheral 18 is coupled to the controller 901 and may include one or more of a postage meter 18a, a printer 18b and a display 18c and an input peripheral 20 may include a keyboard/mouse 20c and a bar code reader 20d. Other input/output peripherals may be included and are contemplated by the present invention.

Figure 29:
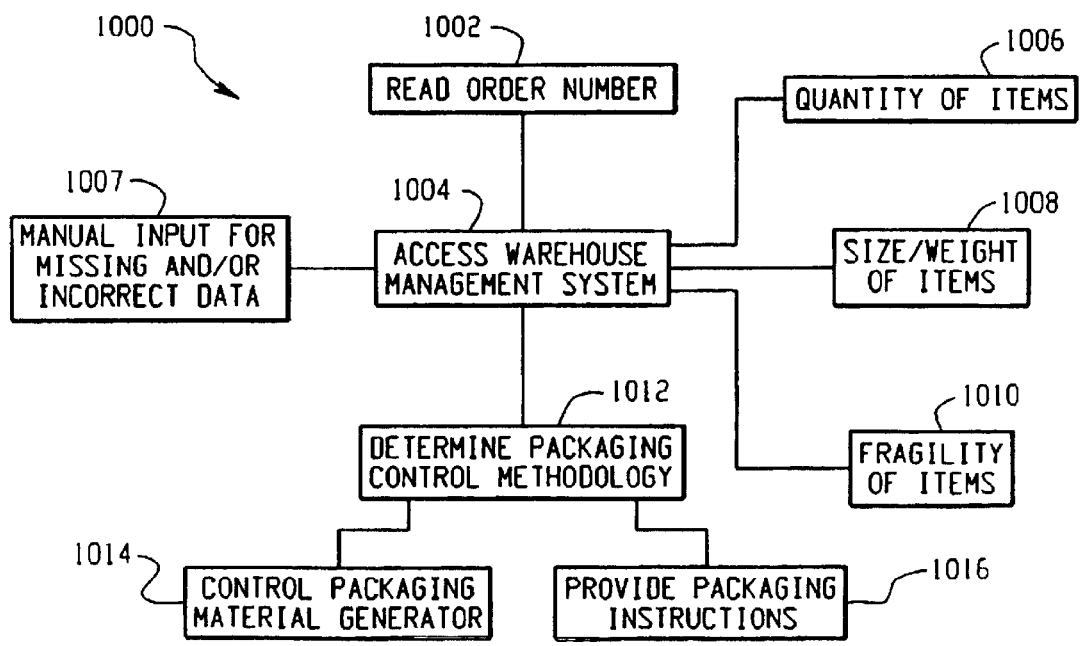
FIG. 29 is a flow chart illustrating a method of identifying parts to be packaged and determining packaging instructions for the identified parts.

A method 1000 of packaging a plurality of items in one or more containers according to the present invention is illustrated in FIG. 29. When a tote containing a plurality of items to be packaged is received at the packaging station, the packer reads an order number associated with the items at step 1002 using, for example, the bar code reader 20b. The packaging system controller 901 of FIG. 28 then uses the order number at step 1004 to access the warehouse management system which contains a database containing all the items in the warehouse as well as various pieces of data associated with the items such as the number of items in inventory 1006, the size, shape and weight of the item 1008 and the item's fragility 1010.

The packaging system controller 901 then uses the data (e.g., data 1008 and 1010) along with, for example, shipping destination data from the shipping order to determine packaging instructions which result in an optimized packaging control methodology at step 1012. Once the packaging instructions have been determined, the packaging system controller 901 uses the packaging instructions to control the packaging material generator 12 at step 1014 and provides instructions to the packer 904 via the display 18*c* at step 1016.

Figure 30:
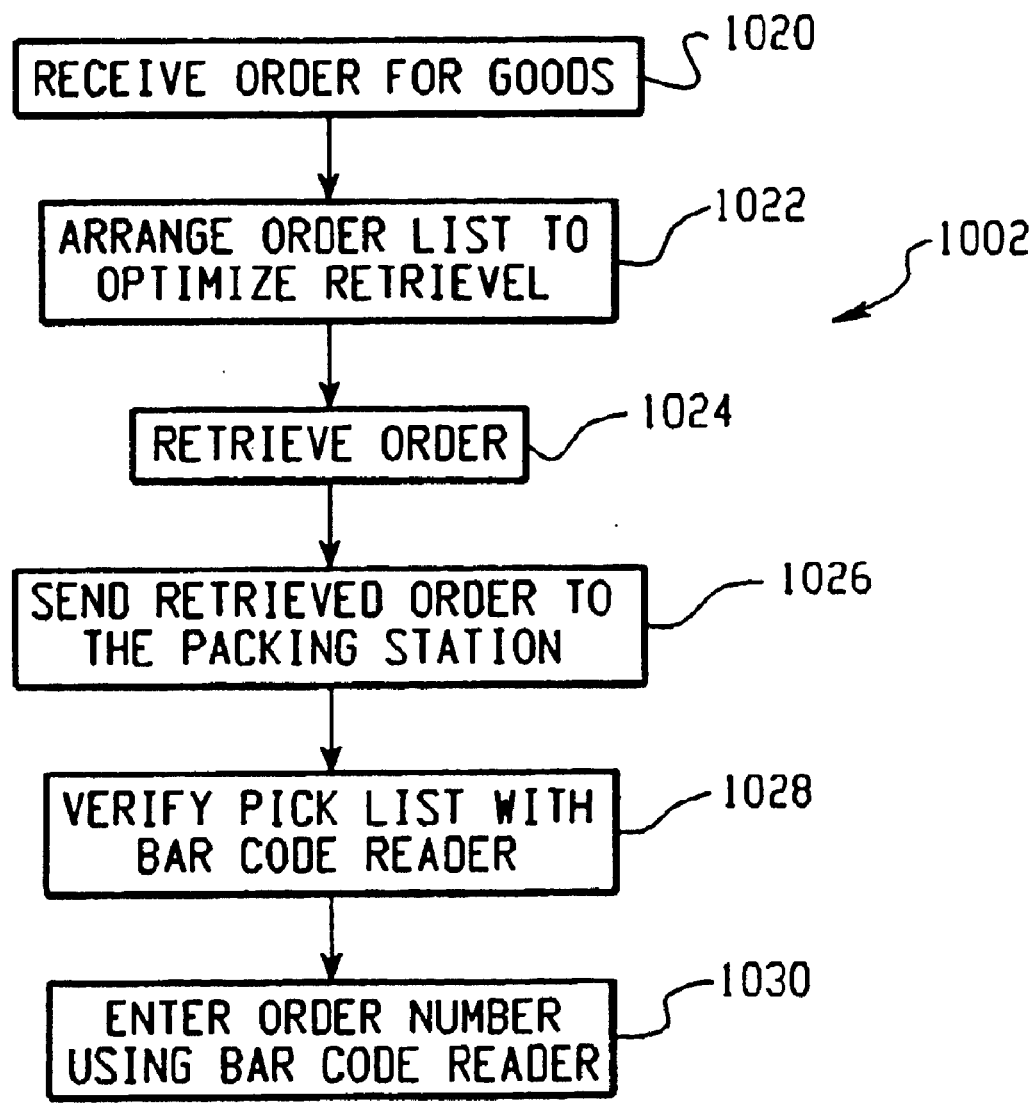
FIG. 30 is a flow chart illustrating in a step of reading an order number for a shipment of items.
Figure 31A:
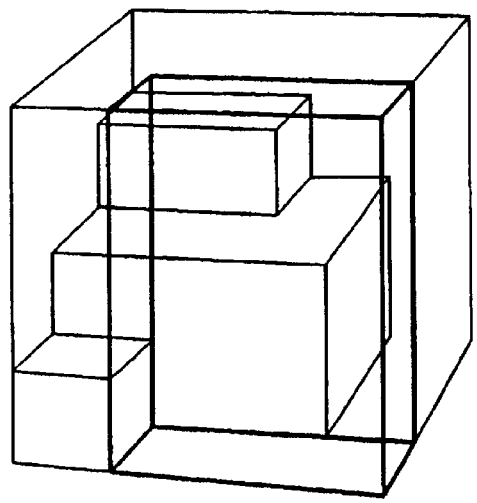
FIGS. 31a–31d are block diagrams illustrating exemplary cubing configurations according to the present invention.
Figure 31B:
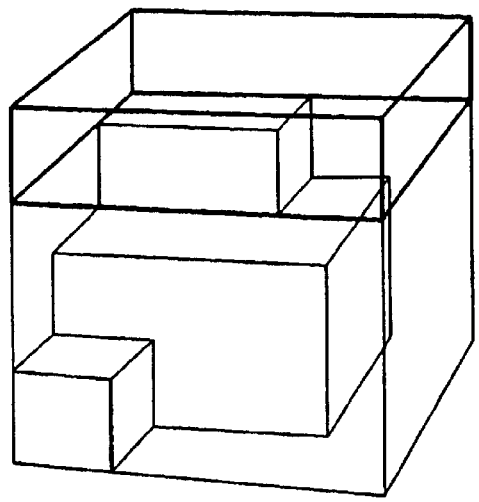
Figure 31C:
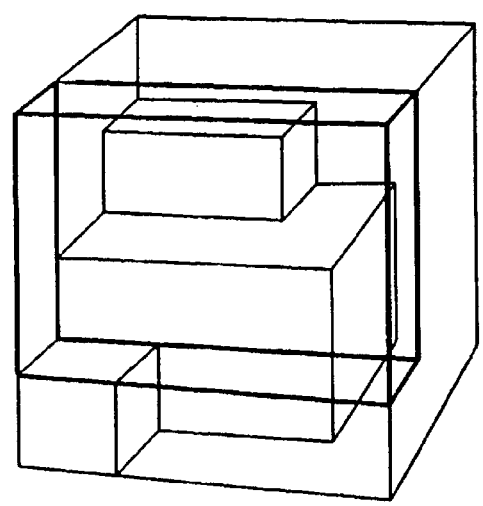
Figure 31D:
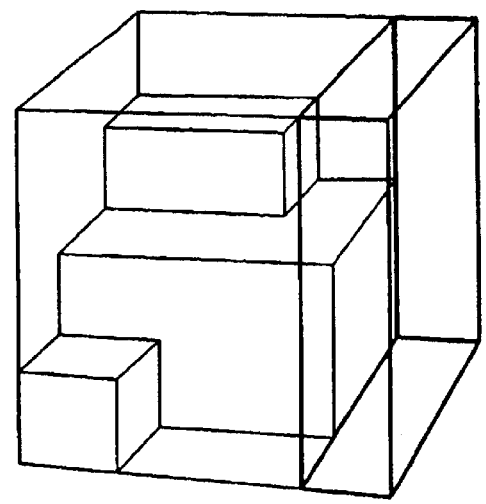

The step of reading the order number (step 1002 of FIG. 29) is illustrated in greater detail in FIG. 30. The process begins at step 1020 when the warehouse facility receives an order for a variety of items and the warehouse management system 902 assigns an order number to the order. The order is then arranged at step 1022 by the warehouse management system 902 to optimize the retrieval of the various items in the shipping order. A large warehouse has many items located in various, diverse areas in the warehouse. To minimize the amount of backtracking, etc., the warehouse management system 902 contains location data for each of the items and uses the data to arrange the items on the shipping form to generate and optimize a pick list which minimizes the time required to retrieve the various items. The various items corresponding to the arranged pick list are then retrieved at step 1024 and brought to the packaging station at step 1026.

The pick list generated by the warehouse management system 902 is then verified in the following exemplary manner at step 1028. A bar code reader 20*d* reads the order number (or license plate number) from the bar code 903 on the tote which contains the retrieved items. The packer then reads the bar code of each of the retrieved item and matches them with the items on the shipping order using the CPU 50 of the packaging system controller 901. If a match is not found, or if an item is missing, the CPU 50 or warehouse management system 902 generates a warning message which is provided to the packer on the display 18*c*. Once the pick list is verified at step 1028, the packaging system controller 901 sends the order number back to the warehouse management system 902 at step 1030 with a request to retrieve all the data residing in the warehouse management system database that relates to the parts on the shipping order. Such data includes, but is not limited to, the weight, size, shape and fragility of the items.

The step of determining the packaging instructions (step 1012 of FIG. 29) is preferably provided in the same manner to the steps illustrated in FIGS. 20–26*b*, wherein an expert system uses a knowledge base and data relating to the packaging material and the parts to be packaged to determined an optimized packaging solution. In addition, alternative intelligent type systems may be utilized, such as binary decision trees, fuzzy logic and a trained neural network.

The packaging system 900 of FIG. 28 of the present invention may alternatively, or in addition to the use of if-then rules, incorporate cubing rules in the knowledge base. Generally, using the cubing concept, the packaging system controller 901 ascertains the cubic volume of each item will occupy when properly packaged. The expert system then utilizes the various cubic volumes to determine their location and orientation within a selected packaging container to maximize the packaging efficiency and thus reduce the need for void fill and extra boxes. One exemplary method for implementing such an optimized cubing concept is taught in U.S. Pat. No. 5,430,831 entitled "Method of Packing Rectangular Objects in a Rectangular Area or Space by Determination of Free Subareas or Subspaces", which is hereby incorporated by reference. The manner in which various cubes (i.e., parallelepiped volumes) are arranged in different ways to maximize the packaging efficiency is illustrated in FIGS. 31*a*–31*d*. In addition, cubing optimization products are commercially available such as OPTI-PAK™ by Advanced Logistics Systems, Inc., Roche Harbor Wash. 98250. Such a cubing product may be incorporated into the packaging system controller 901. Therefore in the above manner the packaging system utilizes the parts data from the warehouse management system 902 and determines the packaging instructions that represent an optimized packaging methodology.

Figure 32:
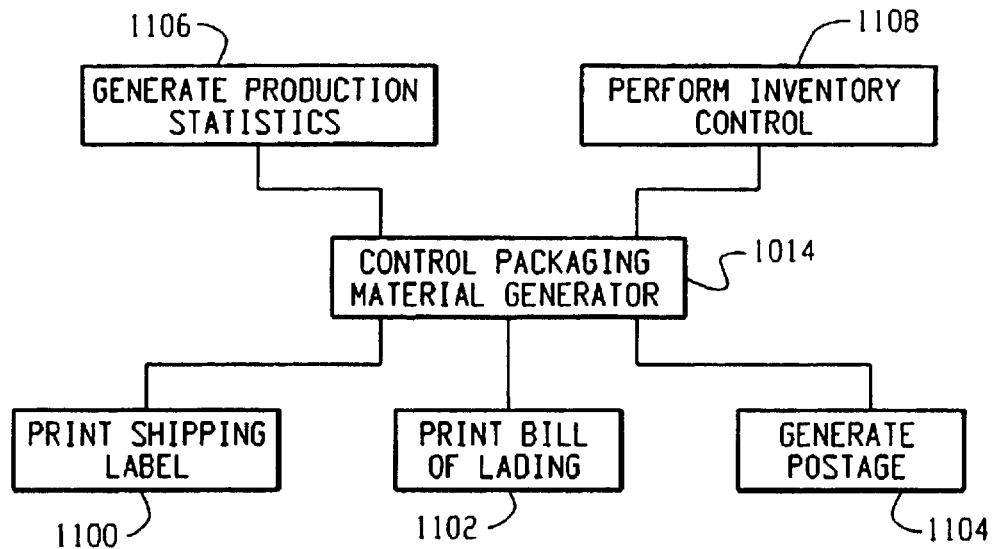
FIG. 32 is a flow chart diagram illustrating the functions controlled by the determined packaging instructions according to the present invention.

FIG. 32 is a functional block diagram illustrating additional packaging system functions. After using the determined instructions to control the packaging material generator (step 1014 of FIG. 29), the packaging system controller 901, using data from the shipping order prints a shipping label at step 1100 using the printer 18*b* of FIG. 28. Likewise, the packaging system controller 901 uses the shipping order data to print out a bill-of-lading at step 1102 using the printer 18*b*. Using the shipping destination and the expected weight as dictated by the determined packaging instructions, the packaging system controller 901 also generates the proper postage using the postage meter 18*a* of FIG. 28 at step 1104. The packaging system controller 901 also generates production statistics and performs inventory control at steps 1106 and 1108, respectively.

Figure 33:
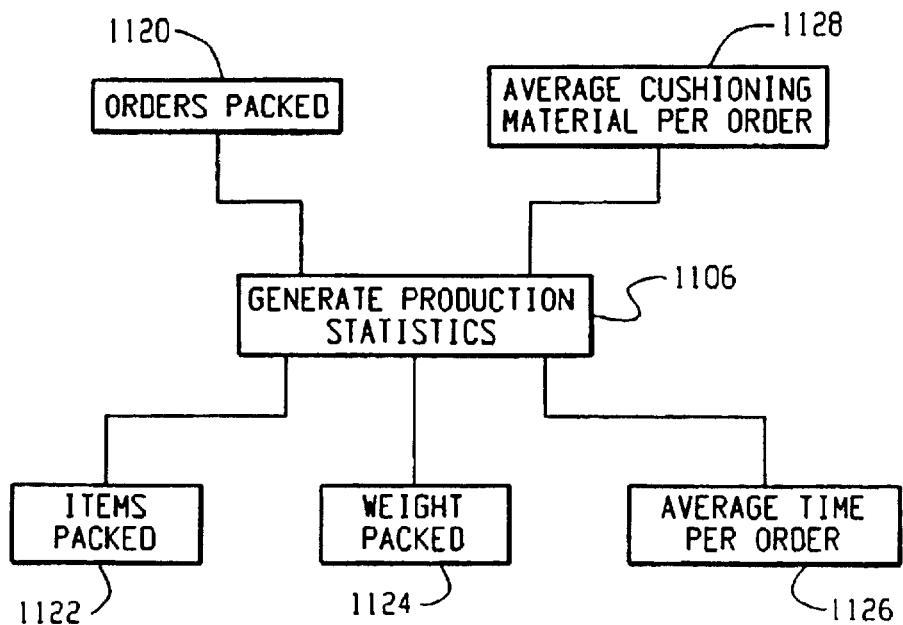
FIG. 33 illustrates the collection of data for generating productivity statistics.

The inventory control of step 1108 is similar to the inventory control of FIGS. 11 and 12 and may be performed for each packaging station individually or centrally for all the packaging stations through communication of inventory consumption data from each packaging system controller 901 to the warehouse management system 902. Similarly, the packaging system 900 may provide productivity monitoring as illustrated previously in FIG. 13 and which is briefly summarized in FIG. 33. The generation of production statistics (step 1106) includes the counting of the number of order packed per unit time at step 1120 and the counting of the items packed per unit time at step 1122. In addition, the packaging system controller 901 also monitors the total weight of items packed at step 1124 and calculates the average time required to complete an order and the average amount of packaging material consumed per order at steps 1126 and 1128, respectively.

The present invention provides for the effective and efficient packaging of parts. Since the packaging system provides packaging instructions for one or more parts, an inexperienced packer may efficiently package the one or more parts without wasting packaging materials, thus providing cost savings of about 25–50%.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of the several embodiments, such feature may be combined with one or more other features of the other embodiments as may be desired and advantageous for any given or particular application.

What is claimed is:

1. A packaging system for presenting packaging information for packaging a part to an operator, comprising:

an input device used to identify a part and generate a signal indicative of the identified part;

a controller coupled to the input device to receive the signal indicative of the identified part, the controller programmed to retrieve a predetermined set of packaging instructions associated with the identified part from a memory, the packaging instructions including a step to be completed by the operator, which step contains an instruction for packaging the identified part; and an output device coupled to the controller to receive an output signal from the controller, the output device being operative to communicate the step to be completed by the operator based on the output signal, the output device being operative to communicate to the operator at least one of an audible and a visual output of the instruction for packaging the identified part.

2. The packaging system of claim 1, wherein the packaging instructions:

identify a container for accommodating the part;

identify one or more pieces of cushioning material to be utilized for securing the part within the container;

illustrate an order in which the cushioning material and the part are placed within the container; and illustrate an orientation in which the part and the cushioning material are placed and secured within the container.

3. The packaging system of claim 1, wherein the packaging instructions indicate a particular container for packaging the part.

4. The packaging system of claim 1, wherein the packaging instructions indicate an orientation of one or more pieces of cushioning material within a container.

5. The packaging system of claim 1, wherein the packaging instructions indicate an orientation of the part within a container.

6. The packaging system of claim 1, wherein the packaging instructions indicate an order for packaging the part using a plurality of pieces of cushioning material.

7. The packaging system of claim 1, wherein the input device is at least one of a keyboard, a touch screen or a mouse.

8. The packaging system of claim 7, wherein the input device is operative for use with a menu displayed on the display.

9. The packaging system of claim 1, wherein the input device is operative for use with a menu displayed on the display.

10. The packaging system of claim 1, wherein the input device is a bar code reader.

11. The packaging system of claim 1, wherein the input device is an RF tag reader.

12. The packaging system of claim 1, wherein the input device is a microphone.

13. The packaging system of claim 1, wherein the output device includes a display for providing a visual display of the step to be completed by the operator.

14. The packaging system of claim 1, wherein the output device includes a speaker for providing an audio description of the step to be completed by the operator.

* * * * *